United States Patent
Chaudhri et al.

(10) Patent No.: US 11,126,348 B2
(45) Date of Patent: Sep. 21, 2021

(54) DEVICES, METHODS, AND GRAPHICAL USER INTERFACES FOR MESSAGING

(71) Applicant: Apple Inc., Cupertino, CA (US)

(72) Inventors: Imran A. Chaudhri, San Francisco, CA (US); Freddy A. Anzures, San Francisco, CA (US); Chanaka G. Karunamuni, San Jose, CA (US); Nicholas V. King, San Jose, CA (US); Daamun Mohseni, San Jose, CA (US); Hoan Pham, San Jose, CA (US); Wan Si Wan, Sunnyvale, CA (US); Giancarlo Yerkes, Menlo Park, CA (US); Darin B. Adler, Los Gatos, CA (US); Bethany Bongiorno, San Francisco, CA (US); Justin N. Wood, Los Altos, CA (US); Roberto Garcia, Santa Clara, CA (US); Soin Shedlosky, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/789,335

(22) Filed: Feb. 12, 2020

(65) Prior Publication Data

US 2020/0183577 A1   Jun. 11, 2020

Related U.S. Application Data

(63) Continuation of application No. 16/544,787, filed on Aug. 19, 2019, which is a continuation of application
(Continued)

(51) Int. Cl.
*G06F 3/0488* (2013.01)
*G06F 3/0481* (2013.01)
(Continued)

(52) U.S. Cl.
CPC ........ *G06F 3/04883* (2013.01); *G06F 3/0412* (2013.01); *G06F 3/0481* (2013.01);
(Continued)

(58) Field of Classification Search
None
See application file for complete search history.

(56) References Cited

U.S. PATENT DOCUMENTS

| 5,784,001 A | 7/1998 | DeLuca et al. |
| 5,903,728 A | 5/1999 | Semenzato |

(Continued)

FOREIGN PATENT DOCUMENTS

| CN | 101198948 A | 6/2008 |
| CN | 101611398 A | 12/2009 |

(Continued)

OTHER PUBLICATIONS

Notice of Allowance, dated Apr. 9, 2020, received in Korean Patent Application No. 2019-7003574, which corresponds with U.S. Appl. No. 15/272,402, 5 pages.
(Continued)

*Primary Examiner* — Amy M Levy
(74) *Attorney, Agent, or Firm* — Morgan, Lewis & Bockius LLP

(57) ABSTRACT

An electronic device displays a messaging user interface of a message application, including a conversation transcript of a messaging session between a user of the electronic device and a plurality of other users, a message-input area, and a plurality of avatars corresponding to the plurality of other users. The plurality of avatars are displayed as a stack of avatars, with a first avatar of avatars displayed on the top of the stack of avatars. In response to detecting an input by a first contact on the touch-sensitive surface while a focus selector is at a first location in the messaging user interface
(Continued)

that corresponds to the first avatar, if the input meets menu-activation-criteria, a menu that contains activatable menu items associated with the first avatar overlaid on the messaging user interface is displayed, and if the input meets avatar-spreading-criteria the plurality of avatars are displayed in an array.

24 Claims, 56 Drawing Sheets

Related U.S. Application Data

No. 16/194,237, filed on Nov. 16, 2018, now Pat. No. 10,949,081, which is a continuation of application No. PCT/US2017/033396, filed on May 18, 2017, which is a continuation of application No. 15/272,399, filed on Sep. 21, 2016, now Pat. No. 9,959,037.

(60) Provisional application No. 62/506,614, filed on May 16, 2017, provisional application No. 62/349,116, filed on Jun. 12, 2016, provisional application No. 62/349,114, filed on Jun. 12, 2016, provisional application No. 62/339,078, filed on May 19, 2016, provisional application No. 62/338,502, filed on May 18, 2016.

(51) Int. Cl.

| | | |
|---|---|---|
| *G06Q 10/10* | (2012.01) | |
| *H04L 12/58* | (2006.01) | |
| *H04M 1/725* | (2021.01) | |
| *G06F 3/041* | (2006.01) | |
| *G06F 3/0484* | (2013.01) | |
| *G06F 40/197* | (2020.01) | |
| *H04N 5/232* | (2006.01) | |
| *G06F 3/0482* | (2013.01) | |
| *G06F 3/0485* | (2013.01) | |
| *G06T 11/60* | (2006.01) | |
| *G06T 13/00* | (2011.01) | |
| *H04M 1/7243* | (2021.01) | |
| *G06Q 10/02* | (2012.01) | |
| *G06F 3/16* | (2006.01) | |
| *G06T 3/40* | (2006.01) | |
| *H04M 1/72436* | (2021.01) | |

(52) U.S. Cl.
CPC .......... *G06F 3/0482* (2013.01); *G06F 3/0485* (2013.01); *G06F 3/04817* (2013.01); *G06F 3/04842* (2013.01); *G06F 3/04845* (2013.01); *G06F 3/04847* (2013.01); *G06F 3/04886* (2013.01); *G06F 40/197* (2020.01); *G06Q 10/107* (2013.01); *G06T 11/60* (2013.01); *G06T 13/00* (2013.01); *H04L 51/04* (2013.01); *H04L 51/046* (2013.01); *H04L 51/16* (2013.01); *H04L 51/18* (2013.01); *H04L 51/22* (2013.01); *H04M 1/7243* (2021.01); *H04N 5/23216* (2013.01); *H04N 5/232933* (2018.08); *G06F 3/16* (2013.01); *G06F 2203/04105* (2013.01); *G06F 2203/04803* (2013.01); *G06F 2203/04808* (2013.01); *G06Q 10/02* (2013.01); *G06T 3/40* (2013.01); *H04M 1/72436* (2021.01); *H04M 2250/22* (2013.01)

(56) References Cited

U.S. PATENT DOCUMENTS

| | | |
|---|---|---|
| 6,054,990 A | 4/2000 | Tran |
| 6,539,421 B1 | 3/2003 | Appelman et al. |
| 6,869,018 B2 | 3/2005 | Fifield et al. |
| 7,130,885 B2 | 10/2006 | Chandra et al. |
| 7,343,561 B1 | 3/2008 | Stochosky et al. |
| 7,353,466 B2 | 4/2008 | Crane et al. |
| 7,571,213 B2 | 8/2009 | Walkush et al. |
| 7,669,134 B1 | 2/2010 | Christie et al. |
| 7,856,469 B2 | 12/2010 | Chen et al. |
| 8,271,900 B2 | 9/2012 | Wakizaka et al. |
| 8,375,320 B2 | 2/2013 | Kotler et al. |
| 8,464,167 B2 | 7/2013 | Saund et al. |
| 8,584,031 B2 | 11/2013 | Moore et al. |
| 8,621,585 B2 | 12/2013 | Danieli et al. |
| 8,667,418 B2 * | 3/2014 | Chaudhri ............ G06F 3/04817 715/835 |
| 8,677,250 B2 | 3/2014 | Wormald et al. |
| 8,751,572 B1 | 6/2014 | Behforooz et al. |
| 8,881,051 B2 | 11/2014 | Frey et al. |
| 8,957,915 B1 | 2/2015 | Chalasani et al. |
| 9,003,306 B2 | 4/2015 | Mehin et al. |
| 9,244,601 B2 | 1/2016 | Kim et al. |
| 9,272,217 B1 | 3/2016 | Holme et al. |
| 9,298,355 B1 | 3/2016 | Beausoleil et al. |
| 9,477,375 B1 | 10/2016 | Lewis et al. |
| 9,533,217 B2 | 1/2017 | Naik et al. |
| 9,596,200 B1 | 3/2017 | Chen et al. |
| 9,654,222 B1 | 5/2017 | Shatz et al. |
| 9,904,469 B2 | 2/2018 | Gnedin et al. |
| 9,911,222 B2 | 3/2018 | Setton et al. |
| 9,948,589 B2 | 4/2018 | Gonnen et al. |
| 10,126,927 B1 | 11/2018 | Fieldman |
| 10,129,321 B2 | 11/2018 | Mayya et al. |
| 10,558,329 B2 | 2/2020 | Lewis et al. |
| 2003/0110450 A1 | 6/2003 | Sakai |
| 2004/0054740 A1 | 3/2004 | Daigle et al. |
| 2004/0137884 A1 | 7/2004 | Engstrom et al. |
| 2004/0179039 A1 | 9/2004 | Blattner et al. |
| 2004/0224772 A1 | 11/2004 | Canessa et al. |
| 2005/0021834 A1 | 1/2005 | Coulombe |
| 2005/0116956 A1 | 6/2005 | Beardow |
| 2005/0156873 A1 | 7/2005 | Walter et al. |
| 2005/0198124 A1 | 9/2005 | McCarthy |
| 2005/0204309 A1 | 9/2005 | Szeto |
| 2005/0210114 A1 | 9/2005 | Washburn |
| 2006/0022955 A1 | 2/2006 | Kennedy |
| 2006/0041629 A1 | 2/2006 | Lira |
| 2006/0041848 A1 | 2/2006 | Lira |
| 2006/0132457 A1 | 6/2006 | Rimas-Ribikauskas et al. |
| 2006/0161868 A1 | 7/2006 | Van Dok et al. |
| 2006/0294189 A1 | 12/2006 | Natarajan et al. |
| 2007/0207782 A1 | 9/2007 | Tran |
| 2008/0055269 A1 | 3/2008 | Lemay et al. |
| 2008/0081698 A1 | 4/2008 | Wormald et al. |
| 2008/0091692 A1 * | 4/2008 | Keith ................... G06F 16/958 |
| 2008/0141150 A1 | 6/2008 | Kalaboukis et al. |
| 2008/0235285 A1 | 9/2008 | Della Pasqua |
| 2008/0280633 A1 | 11/2008 | Agiv |
| 2008/0303799 A1 | 12/2008 | Schwesig et al. |
| 2009/0006333 A1 | 1/2009 | Jones et al. |
| 2009/0013265 A1 | 1/2009 | Cole et al. |
| 2009/0094288 A1 | 4/2009 | Berry et al. |
| 2009/0150397 A1 | 6/2009 | Chen et al. |
| 2009/0193088 A1 | 7/2009 | Cervantes et al. |
| 2009/0262087 A1 | 10/2009 | Kim |
| 2009/0300540 A1 | 12/2009 | Russell |
| 2010/0017759 A1 | 1/2010 | Birnbaum et al. |
| 2010/0058244 A1 | 3/2010 | Wang |
| 2010/0153844 A1 | 6/2010 | Hwang et al. |
| 2010/0158097 A1 | 6/2010 | Pascal et al. |
| 2010/0235746 A1 | 9/2010 | Ansures |
| 2010/0241968 A1 | 9/2010 | Tarara et al. |
| 2010/0262666 A1 | 10/2010 | Kalu |
| 2010/0271366 A1 | 10/2010 | Sung et al. |
| 2010/0287241 A1 | 11/2010 | Swanburg et al. |
| 2011/0041086 A1 | 2/2011 | Kim et al. |
| 2011/0276904 A1 | 11/2011 | Mehin et al. |
| 2012/0059787 A1 | 3/2012 | Brown et al. |
| 2012/0072856 A1 | 3/2012 | Park et al. |
| 2012/0110477 A1 | 5/2012 | Gaume |
| 2012/0185542 A1 | 7/2012 | Vyrros et al. |

(56) References Cited

U.S. PATENT DOCUMENTS

| | | |
|---|---|---|
| 2012/0190388 A1 | 7/2012 | Castleman et al. |
| 2012/0270578 A1 | 10/2012 | Feghali |
| 2012/0297348 A1 | 11/2012 | Santoro |
| 2012/0323878 A1 | 12/2012 | Jing et al. |
| 2013/0055112 A1 | 2/2013 | Joseph et al. |
| 2013/0069969 A1 | 3/2013 | Chang et al. |
| 2013/0093833 A1 | 4/2013 | Al-Asaaed et al. |
| 2013/0151603 A1* | 6/2013 | Lobb .................. A63F 13/795 709/204 |
| 2013/0190081 A1 | 7/2013 | Naik et al. |
| 2013/0225087 A1 | 8/2013 | Uhm |
| 2013/0254710 A1* | 9/2013 | Banti .................. G06Q 10/10 715/810 |
| 2013/0297317 A1 | 11/2013 | Lee et al. |
| 2013/0329114 A1 | 12/2013 | Kim et al. |
| 2013/0332543 A1 | 12/2013 | Shin et al. |
| 2014/0006343 A1 | 1/2014 | Allison |
| 2014/0015782 A1 | 1/2014 | Kim et al. |
| 2014/0041056 A1 | 2/2014 | Stoop et al. |
| 2014/0047358 A1 | 2/2014 | Park et al. |
| 2014/0058939 A1 | 2/2014 | Savla |
| 2014/0082520 A1 | 3/2014 | Mamoun |
| 2014/0085487 A1 | 3/2014 | Park et al. |
| 2014/0122605 A1* | 5/2014 | Merom ............... G06Q 10/10 709/204 |
| 2014/0136990 A1 | 5/2014 | Gonnen et al. |
| 2014/0143355 A1 | 5/2014 | Berdis et al. |
| 2014/0173460 A1 | 6/2014 | Kim |
| 2014/0196026 A1 | 7/2014 | Seo et al. |
| 2014/0229165 A1 | 8/2014 | Lee |
| 2014/0279068 A1 | 9/2014 | Systrom et al. |
| 2014/0279418 A1 | 9/2014 | Rubinstein et al. |
| 2014/0297254 A1 | 10/2014 | Yeo et al. |
| 2014/0331149 A1* | 11/2014 | Labey ............... H04M 1/72544 715/757 |
| 2014/0340470 A1 | 11/2014 | Perez et al. |
| 2014/0351350 A1 | 11/2014 | Lee et al. |
| 2014/0365923 A1 | 12/2014 | Lee et al. |
| 2014/0372540 A1 | 12/2014 | Libin |
| 2014/0372541 A1 | 12/2014 | Feghali |
| 2015/0038235 A1 | 2/2015 | Kamekawa |
| 2015/0042852 A1 | 2/2015 | Lee et al. |
| 2015/0050993 A1 | 2/2015 | Blayer et al. |
| 2015/0058754 A1 | 2/2015 | Rauh |
| 2015/0062052 A1* | 3/2015 | Bernstein ............ G06F 3/0482 345/173 |
| 2015/0067496 A1 | 3/2015 | Missig et al. |
| 2015/0067519 A1 | 3/2015 | Missig et al. |
| 2015/0067596 A1 | 3/2015 | Brown et al. |
| 2015/0074209 A1 | 3/2015 | Liu et al. |
| 2015/0082201 A1 | 3/2015 | Sung et al. |
| 2015/0088699 A1 | 3/2015 | Rubinstein et al. |
| 2015/0089389 A1 | 3/2015 | Cohen-Zur et al. |
| 2015/0094106 A1 | 4/2015 | Grossman et al. |
| 2015/0095801 A1 | 4/2015 | Kim |
| 2015/0121190 A1 | 4/2015 | Miyamoto et al. |
| 2015/0121255 A1 | 4/2015 | Lee |
| 2015/0160832 A1* | 6/2015 | Walkin ............... G06F 3/04883 715/765 |
| 2015/0172584 A1 | 6/2015 | Park et al. |
| 2015/0188861 A1 | 7/2015 | Esplin et al. |
| 2015/0220774 A1 | 8/2015 | Ebersman et al. |
| 2015/0222586 A1 | 8/2015 | Ebersman et al. |
| 2015/0268766 A1 | 9/2015 | Kim et al. |
| 2015/0268780 A1 | 9/2015 | Kim et al. |
| 2015/0268826 A1 | 9/2015 | Langholz |
| 2015/0281145 A1 | 10/2015 | Ji |
| 2015/0309720 A1 | 10/2015 | Fisher |
| 2015/0312176 A1 | 10/2015 | Jones et al. |
| 2015/0312182 A1 | 10/2015 | Langholz |
| 2015/0312184 A1 | 10/2015 | Langholz et al. |
| 2015/0312185 A1 | 10/2015 | Langholz et al. |
| 2015/0319569 A1 | 11/2015 | Chen et al. |
| 2015/0324858 A1 | 11/2015 | DeMattei |
| 2015/0331550 A1 | 11/2015 | Wang et al. |
| 2015/0334075 A1 | 11/2015 | Wang et al. |
| 2015/0347748 A1 | 12/2015 | Krstic et al. |
| 2015/0350141 A1 | 12/2015 | Yang et al. |
| 2015/0350147 A1 | 12/2015 | Shepherd et al. |
| 2015/0379336 A1 | 12/2015 | Hoshi et al. |
| 2016/0006856 A1 | 1/2016 | Bruno |
| 2016/0014059 A1 | 1/2016 | Rathod |
| 2016/0027443 A1 | 1/2016 | Terrell, II et al. |
| 2016/0034977 A1 | 2/2016 | Bhaowal et al. |
| 2016/0035123 A1 | 2/2016 | Bonansea |
| 2016/0043974 A1 | 2/2016 | Purcell et al. |
| 2016/0050165 A1 | 2/2016 | Thomas et al. |
| 2016/0062574 A1 | 3/2016 | Anzures et al. |
| 2016/0077793 A1 | 3/2016 | Disano et al. |
| 2016/0080296 A1 | 3/2016 | Lewis et al. |
| 2016/0080297 A1 | 3/2016 | Le Huerou et al. |
| 2016/0092035 A1 | 3/2016 | Crocker et al. |
| 2016/0094504 A1 | 3/2016 | Cinar et al. |
| 2016/0103564 A1 | 4/2016 | Chao |
| 2016/0110714 A1 | 4/2016 | Norland |
| 2016/0110907 A1 | 4/2016 | Kelly et al. |
| 2016/0117299 A1 | 4/2016 | Hynes |
| 2016/0117665 A1 | 4/2016 | Davis |
| 2016/0117670 A1 | 4/2016 | Davis |
| 2016/0149838 A1 | 5/2016 | Jeong et al. |
| 2016/0164811 A1 | 6/2016 | Guthery et al. |
| 2016/0202889 A1 | 7/2016 | Shin et al. |
| 2016/0259526 A1 | 9/2016 | Lee et al. |
| 2016/0259528 A1 | 9/2016 | Foss et al. |
| 2016/0274720 A1 | 9/2016 | Shin |
| 2016/0279523 A1 | 9/2016 | Altagar et al. |
| 2016/0283984 A1 | 9/2016 | Rabbat et al. |
| 2016/0286028 A1 | 9/2016 | Ahuja et al. |
| 2016/0291822 A1 | 10/2016 | Ahuja et al. |
| 2016/0334972 A1 | 11/2016 | Cheng et al. |
| 2017/0050114 A1 | 2/2017 | Luo et al. |
| 2017/0054662 A1 | 2/2017 | Crocker et al. |
| 2017/0060354 A1 | 3/2017 | Luo et al. |
| 2017/0064207 A1 | 3/2017 | Kim et al. |
| 2017/0083174 A1 | 3/2017 | Tobens, III et al. |
| 2017/0083210 A1* | 3/2017 | Parker ................ H04L 12/1822 |
| 2017/0102912 A1 | 4/2017 | Jambulingam et al. |
| 2017/0109013 A1* | 4/2017 | Hong .................. G06F 3/04817 |
| 2017/0286913 A1 | 10/2017 | Liu et al. |
| 2017/0308289 A1 | 10/2017 | Kim |
| 2017/0322693 A1* | 11/2017 | Zhang ................ G06F 3/0484 |
| 2017/0339085 A1 | 11/2017 | Judd et al. |
| 2018/0124190 A1* | 5/2018 | Ji ........................ H04L 67/10 |
| 2018/0295092 A1* | 10/2018 | Peiris ................. H04L 51/36 |
| 2018/0351903 A1* | 12/2018 | Allen ................. H04L 51/04 |
| 2018/0373683 A1 | 12/2018 | Hullette et al. |
| 2019/0087082 A1 | 3/2019 | Chaudhri et al. |
| 2020/0034033 A1 | 1/2020 | Chaudhri et al. |
| 2020/0133478 A1 | 4/2020 | Chaudhri et al. |
| 2021/0096736 A9 | 4/2021 | Chaudhri et al. |

FOREIGN PATENT DOCUMENTS

| | | | |
|---|---|---|---|
| CN | 101853132 A * | 10/2010 | .............. H04W 4/21 |
| CN | 101931621 A | 12/2010 | |
| CN | 102170442 A | 8/2011 | |
| CN | 102664832 A | 9/2012 | |
| CN | 102970213 A | 3/2013 | |
| CN | 103748610 A | 4/2014 | |
| CN | 103914261 A | 7/2014 | |
| CN | 103918290 A | 7/2014 | |
| CN | 104462128 A | 3/2015 | |
| CN | 104487929 A | 4/2015 | |
| CN | 104601812 A | 5/2015 | |
| CN | 104699378 A | 6/2015 | |
| CN | 105119812 A | 12/2015 | |
| CN | 105407033 A | 3/2016 | |
| CN | 105407273 A | 3/2016 | |
| CN | 105427087 A | 3/2016 | |
| CN | 105791536 A | 7/2016 | |
| CN | 106255989 A | 12/2016 | |
| CN | 107924256 A | 4/2018 | |
| CN | 108762862 A | 11/2018 | |

(56) References Cited

FOREIGN PATENT DOCUMENTS

| | | |
|---|---|---|
| DE | 202015003860 | 10/2015 |
| EP | 1 475 939 A1 | 11/2004 |
| EP | 2 475 137 A2 | 7/2012 |
| EP | 2 544 431 A1 | 1/2013 |
| EP | 2 667 339 A1 | 11/2013 |
| EP | 2 712 165 A1 | 3/2014 |
| EP | 2 713 323 A1 | 4/2014 |
| EP | 2 779 580 A1 | 9/2014 |
| EP | 2 779 708 A1 | 9/2014 |
| EP | 2 806 620 A1 | 11/2014 |
| EP | 2 879 037 A1 | 6/2015 |
| EP | 2 940 570 A1 | 11/2015 |
| EP | 2 988 568 A1 | 2/2016 |
| JP | 2004-503004 A | 1/2004 |
| JP | 2010-277588 A | 12/2010 |
| JP | 2015-534664 A | 12/2015 |
| KR | 20090065098 A | 6/2009 |
| KR | 20110131941 A | 12/2011 |
| KR | 101130381 B1 | 3/2012 |
| KR | 20120107836 A | 10/2012 |
| KR | 20130050871 A | 5/2013 |
| KR | 20130125274 A | 11/2013 |
| KR | 20140000931 A | 1/2014 |
| KR | 20140035160 A | 3/2014 |
| KR | 20140078031 A | 6/2014 |
| KR | 20150010436 A | 1/2015 |
| KR | 101567555 B1 | 11/2015 |
| KR | 20160050599 A | 5/2016 |
| WO | WO 2004/079530 A2 | 9/2004 |
| WO | WO 2009/039758 A1 | 4/2009 |
| WO | WO 2011/085248 A1 | 7/2011 |
| WO | WO 2011/150860 A1 | 12/2011 |
| WO | WO 2012/061318 A1 | 5/2012 |
| WO | WO 2012/178121 A1 | 12/2012 |
| WO | WO 2014038790 A1 | 3/2014 |
| WO | WO 2015/032284 A1 | 3/2015 |
| WO | WO 2015/050966 A1 | 4/2015 |
| WO | WO 2015/090137 A1 | 6/2015 |
| WO | WO 2015/139528 A1 | 9/2015 |
| WO | WO 2015/162072 A2 | 10/2015 |
| WO | WO 2015/167589 A1 | 11/2015 |
| WO | WO 2015/175240 A1 | 11/2015 |
| WO | WO 2015/183456 A1 | 12/2015 |
| WO | WO 2015/183699 A1 | 12/2015 |
| WO | WO 2015/183756 A1 | 12/2015 |
| WO | WO 2015/186534 A1 | 4/2017 |

OTHER PUBLICATIONS

Office Action, dated Apr. 8, 2020, received in U.S. Appl. No. 15/272,411, 35 pages.
Patent, dated Mar. 13, 2020, received in Korean Patent Application No. 2019-7019197, which corresponds with U.S. Appl. No. 15/272,411, 5 pages.
Office Action, dated Mar. 20, 2020, received in U.S. Appl. No. 16/194,237, 11 pages.
Office Action, dated Mar. 25, 2020, received in Chinese Patent Application No. 2019106076346, dated Mar. 25, 2020, 5 pages.
Extended European Search Report, dated Mar. 30, 2020, received in 19218201.2, which corresponds with U.S. Appl. No. 16/732,184, 5 pages.
Office Action, dated Apr. 27, 2020, received in Danish Patent Application No. 201670652, which corresponds with U.S. Appl. No. 15/272,399, 5 pages.
Office Action, dated Apr. 16, 2020, received in U.S. Appl. No. 15/272,402, 42 pages.
Notice of Allowance, dated Apr. 26, 2020, received in Chinese Patent Application No. 201810396354.0, which corresponds with U.S. Appl. No. 15/272,429, 3 pages.
Office Action, dated Apr. 14, 2020, received in European Patent Application No. 19218201.2, which corresponds with U.S. Appl. No. 16/732,184, 6 pages.
Notice of Allowance, dated Apr. 27, 2020, received in Japanese Patent Application No. 2019-218615, which corresponds with U.S. Appl. No. 16/732,184, 5 pages.
Aube, "No UI Is the New UI", 24. http://techcrunch.com/2015/11/11/no-ui-is-the-new-ui/#.uqjfwxj:bXE2, Nov. 11, 2015, 13 pages.
Benjamin, "How to Use Facebook Sticker in iMessage Conversations," https://www.youtube.com/watch?v=XKCbtPEOIVc, Feb. 20, 2015, 6 pages.
Bolluyt, "What We Hate (and Love) About Chat Apps", https://www.cheatsheet.com/technlogy/why-new-features-make-us-love-and-hate-messaging-app.html, Apr. 16, 2015, 6 pages.
Buhr et al., "You Can Now Order Ubers (and Soon Lyfts) in Facebook Messenger to Prove You're on Your Way", http://techcrunch.com/2015/12/16/facebook-messenger-transportation/#.yzzjjr:g3wc, Dec. 16, 2015, 10 pages.
Chan, "When One App Rules Them All: The Case of WeChat and Mobile in China", https://modernmoneynetwork.org/resourse/when-one-app-rules-them-all-case-wechat-and-mobile-in-china, Aug. 6, 2015, 11 pages.
Chaykowski, "Facebook and Uber Team Up to Bring Ride-Hailing to Messenger", https://www.forbes.com/sites/kathleenchaykowski/2015/12/16/facebook-and-uber-team-up-to-bring-ride-hailing-to-messenger/#35a69d174905, Dec. 16, 2015, 6 pages.
Clark, "Emoji Now Has an Autocomplete to Get Annoyed With", http://www.adweek.com/socialtimes/now-emoji-autocomplete-get-annoyed/204764.
Constine, "Facebook Messenger Hits 800M Users: 2016 Strategy and Predictions", 25. http://techcrunch.com/2016/01/07/beyond-messaging/#.fu0nsbh:hTbz, Jan. 7, 2016, 12 pages.
Constine, "Facebook Payments in Messenger Demo Video", https://www.youtube.com/watch?v=0czclezYB_8, Mar. 17, 2015, 2 pages.
Eadicicco, "Google's New iPhone Keyboard Solves a Big Problem With Texting", http://fortune.com/2016/05/12/googlei-phone-keyboard-texting/, May 12, 2016, 2 pages.
Facebook Messenger 2013, "How to Send Stickers on Facebook Messenger?", https://www.youtube.com/watch?v=r8FsDQQxjHk, Jan. 20, 2016, 2 pages.
Facebook Messenger 2013, "How to Send Stickers and Photos in Messages," https://www.youtube.com/watch?v=qJz82aTrICg Sep. 7, 2013, 3 pages.
Funny Status, "I Wish I Could Just 'Like' a Text So I Don't Have to Respond", Feb. 17, 2013, 5 pages.
Goel, "Facebook Announces a Payments Feature for Its Messenger App", https://www.nytimes.com/2015/03/18/technology/facebook-announces-a-payments-feature-for-its-messenger-app.html?_r=0, Mar. 17, 2015, 4 pages.
Gonzalez, "10 Third-Party Apps for Facebook Messenger You Should Install Right now", https://smartphones.gadgethacks.com/how-to/10-third-party-apps-for-facebook- messenger-you-should-install-right-now, Mar. 27, 2015, 16 pages.
Google, "Quick Search", 27. https://play.google.com/store/apps/details?id=com.startapp.quicksearchbox&hl=en, Jun. 7, 2017, 4 pages.
Heath, "Snapshot Now Let's You Add Fun Stickers to Photos and Videos", https://www.businessinsider.com/how-to-add-stickers-to-snap-2016, May 23, 2016, 4 pages.
ImTranslator, "Translate Facebook", http://aboutimtranslator.net/translate-facebook/, Sep. 5, 2014, 6 pages.
ImTranslator, "Translate Facebook with Pop-up Bubble", http://aboutimtranslator.net/translate-facebook-with-pop-up-bubble/, Sep. 5, 2014, 9 pages.
Isaac et al., "Facebook and Uber Follow Asian Rivals in Plan to Enhance Messenger App", https://www.nytimes.com/2015/12/17/technology/facebook-and-uber-follow-asian-rivals-in-plan-to-enhance-mesenger-app.html?-r=0 Dec. 16, 2015, , 4 pages.
King, "Google Launches Time-Saving Keyboard for iPhones", https://money.cnn.com/2016/05/12/technology/google-board/index.html, May 12, 2016, 2 pages.
Kleeman, "How to Play Secret Chess Game in Facebook Messenger", https://www.mic.com/articles/1344476/how-to-play-the-secret-game-of-chess-in-facebook-messenger, Feb. 5, 2016, 6 pages.

(56) References Cited

OTHER PUBLICATIONS

Krug, "News Feed FYI: What the Reactions Launch Means for News Feed", 30. http://newsroom.fb.com/news/2016/02/news-feed-fyi-what-the-reactions-launch-means-for-news-feed/, Feb. 24, 2016, 2 pages.
Krug, "Reactions Now Available Globally", 31. http://newsroom.fb.com/news/2016/02/reactions-now-available-globally/, Feb. 24, 2016, 3 pages.
Larson, "How to Customize Facebook Messenger with Chat Colors and Emoji", https://www.dailydot.com/debug/customize-messenger-color-bubbles/, Dec. 24, 2015, 6 pages.
Lim, "14 Google Rangouts Hidden Animated Emojis", http://www.hongkiat.com/blog/google-hangout-animated-emoijs/, 2017, 8 pages.
Literati Labs, Inc., "Keymoji: Emoji Keyboard", 21. https://itunes.apple.com/us/app/keymoji-emoji-chat/id886476394?mt=8, Apr. 13, 2017, 2 pages.
Marcus, "Here's to 2016 with Messenger", 26. http://newsroom.fb.com/news/2016/01/heres-to-2016-with-messenger/, Jan. 7, 2016, 5 pages.
McAlone, "Epic Slide Deck from Former Yahoo Board Member Lays Out the Future of Tech and Media", 7. http://www.businessinsider.com/michael-wolf-predicts-what-will-happen-in-the-tech-industry-in-2016-2015-10?op=1, Oct. 21, 2015, 138 pages.
Messenger Platform, "Complete Guide—Technical Implementation", https://developers.facebook.com/docs/messenger-platform/implementation, downloaded May 27, 2016, 18 pages.
Messenger Platform, "Getting Started", http://developers.facebook.com/docs/messenger-platform/getting-started/quick-start, downloaded May 27, 2016, 6 pages.
"Minuum for iPhone", http://minuum.com/minuum-for-iPhone/, 2015, 4 pages.
Newton, "Facebook Rolls Out Expanded Like Button Reactions Around the World", https://www.theverge.com/2016/2/24/11094374/facebook-reactions-like-button, Feb. 24, 2016, 5 pages.
OSXDaily, "Access and Use Emoji in Mac OS X," https://web.archive.org/web/20160415075948/http://osxdaily.com/2011/08/20/emoji-mac-os-x-lion, Aug. 20, 2011, 10 pages.
Singh, "Introducing Emoji Autocomplete", Venmo, http://blog.venmo.com/hf2t3h4x98p5e13z82p18j66ngcmry/2015/5/14/introducing-emoji-autocomplete, May 14, 2015, 2 pages.
Skype Messenger, "7 Skype Tips for Power Users," http://web.archive.org/web/20131008122153/http://www.howtogeek.com/173448/7-skype-tips-for-power-users, Oct. 8, 2013, 5 pages.
Smith (GottaBeMobile): "Facebook Reactions: Meet the New Facebook Like Button", YouTube, https://www.youtube.com/watch?v=Wn5571R8u0g, Feb. 24, 2016, 2 pages.
Snapchat App 2014, "How to Resize and Rotate Emojis/Text on Snapchat," https://www.youtube.com/watch?v=OErPIFWY3W0, Dec. 23, 2014, 3 pages.
Sullivan, "Slash's Mobile Keyboard Makes It an Interesting Player in the Messaging Wars", https://www.fastcompany.com/3055205/slashs-mobile-keyboard-makes-it-an-interesting-player-in-the-messaging-wars, Jan. 7, 2016, 10 pages.
Tabuchi, "No Time to Text? Say It With Stickers", https://wwwnytimes.com/2014/05/26/technology/no-time-to-text-apps-turn-to-stickers.html?r=0, May 25, 2014, 6 pages.
Tek, "Draw & Guess for Messenger", https://web.archive.org/web/2017113114451/https://itunes.apple.com/gb/app/draw-guess-for-messenger/id999812010?mt=8, 2 pages.
Viber Media S.a.r.l., "Viber for IOS", https://www.viber.com/products/iphone, 2017, 3 pages.
Viticci, "Facebook Messenger's "Optimized " Approach and App Discovery", https:///www.macstories.net/ios/facebook-messenger-optimized-approach-and-app-discovery, Mar. 25, 2015, 6 pages.
Walker, "The Six Stages of Facebook Reaction Grief", http://gizmodo.com/the-six-stages-of-facebook-reaction-grief-1761086520, Feb. 24, 2016, 7 pages.
Weinberger, "The Next Big Thing in Computing is Called 'ChatOps,' and it's Already Happening Inside Slack", http://www.businessinsider.com/chatops-blockspring-atlassian-and-ibm-push-theapi-market-2015-11, Nov. 9, 2015, 5 pages.
Weinberger, "Why Apple Should be Scared of Facebook's and Google's Messaging Apps", 32. http://www.businessinsider.com/apple-versus-google-and-facebook-messaging-2015-12, Dec. 22, 2015, 4 pages.
Wiki, "How to Resize Emoji on Snapchat," https://web.archive.org/web/20160505072758/http://www.wikihow.com/Resize-Emoji-on-Snapchat, May 5, 2016, 3 pages.
Wikipedia, "WeChat", https://en.wikipedia.org/wiki/WeChat, Jan. 21, 2011, 7 pages.
Wood, "Messaging Apps Offer Do-It-All Services in Bid for Higher Profits", https://www.nytimes.com/2015/03/26/technology/personaltech/messging-apps-offer-do-it, Mar. 25, 2015, 3 pages.
Wortham, "What Silicon Valley Can Learn From Seoul", https://www.nytimes.com/2015/06/07/magazine/what-silicon-valley-can-learn-from-seoul.html?_r=0, Jun. 2, 2015, 6 pages.
YouTube, "How to Install or Add Other Apps to Facebook Messenger", https://www.bing.com/videos/search?q=how+to+install+or+add+apps+to+facebook+messenger, Jan. 19, 2016, 8 pages.
Office Action, dated May 1, 2019, received in Taiwanese Patent Application No. 106118670, 6 pages.
Office Action, dated Feb. 17, 2017, received in U.S. Appl. No. 15/272,399, 13 pages.
Final Office Action, dated Jul. 28, 2017, received in U.S. Appl. No. 15/272,399, 19 pages.
Notice of Allowance, dated Dec. 20, 2017, received in U.S. Appl. No. 15/272,399, 8 pages.
Office Action, dated Sep. 6, 2016, received in Danish Patent Application No. 201670636, which corresponds with U.S. Appl. No. 15/272,399, 1 page.
Office Action dated Jan. 27, 2017, received in Danish Patent Application No. 201670636, which corresponds with U.S. Appl. No. 15/272,399, 9 pages.
Office Action dated Jun. 23, 2017, received in Danish Patent Application No. 201670636, which corresponds with U.S. Appl. No. 15/272,399, 4 pages.
Office Action, dated Nov. 22, 2018, received in Danish Patent Application No. 201670636, which corresponds with U.S. Appl. No. 15/272,399, 3 pages.
Intention to Grant, dated Oct. 1, 2019, received in Danish Patent Application No. 201670636, which corresponds with U.S. Appl. No. 15/272,399, 2 pages.
Decision to Grant, dated Jan. 20, 2020, received in Danish Patent Application No. 201670636, which corresponds with U.S. Appl. No. 15/272,399, 3 pages.
Office Action, dated Jan. 12, 2017, received in Danish Patent Application No. 201670641, which corresponds with U.S. Appl. No. 15/272,399, 7 pages.
Office Action dated Jun. 27, 2016, received in Danish Patent Application No. 201670641, which corresponds with U.S. Appl. No. 15/272,399, 4 pages.
Office Action, dated Jun. 6, 2018, received in Danish Patent Application No. 201670641, which corresponds with U.S. Appl. No. 15/272,399, 5 pages.
Office Action, dated Jan. 9, 2019, received in Danish Patent Application No. 201670641, which corresponds with U.S. Appl. No. 15/272,399, 5 pages.
Office Action, dated Oct. 29, 2019, received in Danish Patent Application No. 201670641, which corresponds with U.S. Appl. No. 15/272,399, 5 pages.
Office Action, dated Jan. 27, 2017, received in Danish Patent Application No. 201670642, which corresponds with U.S. Appl. No. 15/272,399, 10 pages.
Office Action, dated Aug. 31, 2017, received in Danish Patent Application No. 201670642, which corresponds with U.S. Appl. No. 15/272,399, 4 pages.
Office Action, dated Jun. 13, 2018, received in Danish Patent Application No. 201670642, which corresponds with U.S. Appl. No. 15/272,399, 3 pages.

(56) References Cited

OTHER PUBLICATIONS

Intent to Grant, dated Jan. 24, 2019, received in Danish Patent Application No. 201670642, which corresponds with U.S. Appl. No. 15/272,399, 3 pages.
Intent to Grant, dated Mar. 21, 2019, received in received Danish Patent Application No. 201670642, which corresponds with U.S. Appl. No. 15/272,399, 2 pages.
Notice of Allowance, dated May 2, 2019, received in Danish Patent Application No. 201670642, which corresponds with U.S. Appl. No. 15/272,399, 2 pages.
Patent, dated Jul. 22, 2019, received in Danish Patent Application No. 201670642, which corresponds with U.S. Appl. No. 15/272,399, 4 pages.
Office Action, dated Jan. 16, 2017, received in Danish Patent Application No. 201670647, which corresponds with U.S. Appl. No. 15/272,399, 9 pages.
Office Action, dated Sep. 14, 2017, 2017, received in Danish Patent Application No. 201670647, which corresponds with U.S. Appl. No. 15/272,399, 4 pages.
Office Action, dated Jul. 5, 2018, received in Danish Patent Application No. 201670647, which corresponds with U.S. Appl. No. 15/272,399, 4 pages.
Office Action, dated Feb. 15, 2019, received in Danish Patent Application No. 201670647, which corresponds with U.S. Appl. No. 15/272,399, 2 pages.
Notice of Allowance, dated May 2, 2019, received in Danish Patent Application No. 201670647, which corresponds with U.S. Appl. No. 15/272,399, 2 pages.
Patent, dated Jul. 22, 2019, received in Danish Patent Application No. 201670647, which corresponds with U.S. Appl. No. 15/272,399, 6 pages.
Office Action, dated Oct. 20, 2016, received in Danish Patent Application No. 201670648, which corresponds with U.S. Appl. No. 15/272,399, 8 pages.
Office Action, dated May 15, 2017, received in Danish Patent Application No. 201670648, which corresponds with U.S. Appl. No. 15/272,399, 2 pages.
Office Action, dated Aug. 24, 2017, received in Danish Patent Application No. 201670648, which corresponds with U.S. Appl. No. 15/272,399, 3 pages.
Office Action, dated Feb. 20, 2018, received in Danish Patent Application No. 201670648, which corresponds with U.S. Appl. No. 15/271,399, 2 pages.
Notice of Allowance, dated Mar. 26, 2018, received in Danish Patent Application No. 201670648, which corresponds with U.S. Appl. No. 15/272,399, 2 pages.
Patent, dated May 22, 2018, received in Danish Paient Application No. 201670648, which corresponds with U.S. Appl. No. 15/272,399, 3 pages.
Office Action, dated Oct. 28, 2016, received in Danish Patent Application No. 201670649, which corresponds with U.S. Appl. No. 15/272,399, 8 pages.
Office Action, dated Dec. 16, 2016, received in Danish Patent Application No. 201670649, which corresponds with U.S. Appl. No. 15/272,399, 2 pages.
Office Action, dated Mar. 13, 2017, received in Danish Patent Application No. 201670649, which corresponds with U.S. Appl. No. 15/272,399, 2 pages.
Office Action, dated Apr. 21, 2017, received in Danish Patent Application No. 201670649, which corresponds with U.S. Appl. No. 15/272,399, 2 pages.
Grant, dated Jul. 13, 2017, received in Danish Patent Application No. 201670649, which corresponds with U.S. Appl. No. 15/272,399, 2 pages.
Patent, dated Jan. 2, 2018, received in Danish Patent Application No. 201670649, which corresponds with U.S. Appl. No. 15/272,399, 4 pages.
Office Action, dated Oct. 14, 2016, received in Danish Patent Application No. 201670650, which corresponds with U.S. Appl. No. 15/272,399, 11 pages.
Office Action, dated Mar. 7, 2017, received in Danish Patent Application No, 201670650, which corresponds with U.S. Appl. No. 15/272,399, 3 pages.
Office Action, dated Aug. 23, 2017, received in Danish Patent Application No. 201670650, which corresponds with U.S. Appl. No. 15/272,399, 3 pages.
Office Action, dated Feb. 27, 2018, received in Danish Patent Application No. 201670650, which corresponds with U.S. Appl. No. 15/272,399, 2 pages.
Notice of Allowance, dated Jun. 7, 2018, received in Danish Patent Application No. 201670650, which corresponds with U.S. Appl. No. 15/272,399, 2 pages.
Patent, dated Dec. 7, 2018, received in Danish Patent Application No. 201670650, which corresponds with U.S. Appl. No. 15/272,399, 5 pages.
Office Action, dated Jan. 17, 2017, received in Danish Patent Application No. 201670651, which corresponds with U.S. Appl. No. 15/272.399, 9 pages.
Office Action, dated Feb. 14, 2018, received in Danish Patent Application No. 201670651, which corresponds with U.S. Appl. No. 15/272,399, 3 pages.
Office Action, dated Oct. 12, 2018, received in Danish Patent Application No. 201670651, which corresponds with U.S. Appl. No. 15/272,399, 2 pages.
Grant Decision, dated Feb. 20, 2019, received in received in Danish Patent Application No. 201670651, which corresponds with U.S. Appl. No. 15/272,399, 2 pages.
Office Action, dated Dec. 14, 2016, received in Danish Patent Application No, 201670652, which corresponds with U.S. Appl. No. 15/272,399, 7 pages.
Office Action, dated Jul. 11, 2017, received in Danish Patent Application No. 201670652, which corresponds with U.S. Appl. No. 15/272,399, 4 pages.
Office Action, dated Oct. 31, 2018, received in Danish Patent Application No. 201670652, which corresponds with U.S. Appl. No. 15/272,399, 5 pages.
Office Action, dated Sep. 6, 2019, received in Danish Patent Application No. 201670652, which corresponds with U.S. Appl. No. 15/272,399, 4 pages.
Office Action, dated Dec. 14, 2016, received in Danish Patent Application No. 201670653, which corresponds with U.S. Appl. No. 15/272,399, 6 pages.
Office Action, dated Jul. 6, 2017, received in Danish Patent Application No. 201670653, which corresponds with U.S. Appl. No. 15/272,399, 5 pages.
Office Action, dated Feb. 26, 2018, received in Danish Patent Application No. 201670653, which corresponds with U.S. Appl. No. 15/272,399, 4 pages.
Office Action, dated Dec. 20, 2018, received in Danish Patent Application No. 201670653, which corresponds with U.S. Appl. No. 15/272,399, 3 pages.
Intention to Grant, dated Dec. 4, 2019, received in Danish Patent Application No. 201670653, which corresponds with U.S. Appl. No. 15/272,399, 2 pages.
Office Action, dated Dec. 19, 2016, received in Danish Patent Application No. 201670654, which corresponds with U.S. Appl. No. 15/272,399, 9 pages.
Office Action, dated Nov. 26, 2018, received in Danish Patent Application No. 201670654, which corresponds with U.S. Appl. No. 15/272,399, 2 pages.
Decision to Grant, dated Mar. 20, 2019, received in Danish Patent Application No. 201670654, which corresponds with U.S. Appl. No. 15/272,399, 3 pages.
Patent, dated May 8, 2019, received in Danish Patent Application No. 201670654, which corresponds with U.S. Appl. No. 15/272,399, 4 pages.
Office Action, dated Feb. 1, 2017, received in Danish Patent Application No. 201670655, which corresponds with U.S. Appl. No. 15/272,399, 9 pages.
Office Action, dated Apr. 18, 2018, received in Danish Patent Application No. 201670655, which corresponds with U.S. Appl. No. 15/272,399, 4 pages.

(56) References Cited

OTHER PUBLICATIONS

Intention to Grant, dated Feb. 21, 2019, received in Danish Patent Application No. 201670655, which corresponds with U.S. Appl. No. 15/272,399, 2 pages.
Decision to Grant, dated May 3, 2019, received in Danish Patent Application No. 201670655, which corresponds with U.S. Appl. No. 15/272,399, 2 pages.
Patent, dated Jul. 22, 2019, received in Danish Patent Application No. 201670655, which corresponds with U.S. Appl. No. 15/272,399, 6 pages.
Office Action, dated Jul. 11, 2019, received in U.S. Appl. No. 15/272,402, 40 pages.
Final Office Action, dated Jan. 24, 2020, received in U.S. Appl. No. 15/272,402, 39 pages.
Office Action, dated Jul. 25, 2019, received in Korean Patent Application No. 2019-7003574, which corresponds with U.S. Appl. No. 15/272,402, 5 pages.
Office Action, dated Jul. 22, 2019, received in U.S. Appl. No. 15/272,411, 25 pages.
Final Office Action, dated Feb. 3, 2020, received in U.S. Appl. No. 15/272,411, 30 pages.
Notice of Acceptance, dated Jul. 15, 2019, received in Australian Patent Application No. 2019204403, which corresponds with U.S. Appl. No. 15/272,411, 3 pages.
Certificate of Grant, dated Nov. 14, 2019, received in Australian Patent Application No. 2019204403, which corresponds with U.S. Appl. No. 15/272,411, 3 pages.
Office Action, dated Jan. 9, 2020, received in European Patent Application No. 19181254.4, which corresponds with U.S. Appl. No. 15/272,411, 6 pages.
Office Action, dated Oct. 7, 2019, received in Korean Patent Application No. 2019-7019197, which corresponds with U.S. Appl. No. 15/272,411, 4 pages.
Office Action, dated Mar. 7, 2019, received in U.S. Appl. No. 15/272,416, 29 pages.
Final Office Action, dated Aug. 7, 2019, received in U.S. Appl. No. 15/272,416, 25 pages.
Office Action, dated Jan. 10, 2020, received in U.S. Appl. No. 15/272,416, 27 pages.
Office Action, dated Jul. 22, 2019, received in U.S. Appl. No. 15/272,419, 21 pages.
Office Action, dated May 7, 2019, received in Chinese Patent Application No. 201810396354.0, which corresponds with U.S. Appl. No. 15/272,429, 6 pages.
Office Action, dated Dec. 20, 2019, received in Chinese Patent Application No. 201810396354.0, which corresponds with U.S. Appl. No. 15/272,429, 4 pages.
Office Action, dated Sep. 6, 2018, received in European Patent Application No. 18167254.4, which corresponds with U.S. Appl. No. 15/272,419, 6 pages.
Office Action, dated Feb. 6, 2020, received in European Patent Application No. 18167254.4, which corresponds with U.S. Appl. No. 15/272,419, 9 pages.
Office Action, dated May 8, 2019, received in U.S. Appl. No. 15/272,421, 13 pages.
Notice of Allowance, dated Nov. 6, 2019, received in U.S. Appl. No. 15/272,421, 15 pages.
Office Action, dated May 10, 2019, received in Australian Patent Application No. 2017266930, which corresponds with U.S. Appl. No. 15/272,421, 2 pages.
Office Action, dated Feb. 11, 2019, received in Chinese Patent Application No. 201780002856.4, which correspond with U.S. Appl. No. 15/272,421, 7 pages.
Office Action, dated Oct. 15, 2019, received in Chinese Patent Application No. 201780002856.4, which corresponds with U.S. Appl. No. 15/272,421, 4 pages.
Office Action, dated May 24, 2018, received in European Application No. 17728317.3, which corresponds with U.S. Appl. No. 15/272,421, 3 pages.

Office Action, dated Dec. 17, 2018, received in European Patent Application No. 17728317.3, which corresponds with U.S. Appl. No. 15/272,421, 11 pages.
Office Action, dated Jun. 27, 2019, received in European Patent Application No. 17728317.3, which corresponds with U.S. Appl. No. 15/272,421, 6 pages.
Oral Summons, dated Jan. 27, 2020, received in European Patent Application No. 17728317.3, which corresponds with U.S. Appl. No. 15/272,421, 10 pages.
Office Action, dated May 13, 2019, received in Japanese Patent Application No. 2018510791, which corresponds with U.S. Appl. No. 15/272,421, 4 pages.
Patent, dated Jun. 14, 2019, received in Japanese Patent Application No. 2018510791, which corresponds with U.S. Appl. No. 15/272,421, 3 pages.
Office Action, dated Mar. 13, 2018, received in Korean Patent Application No. 2018-7003537, which corresponds with U.S. Appl. No. 15/272,421, 2 pages.
Patent, dated Feb. 1, 2019, received in Korean Patent Application No. 2018-7003537, which corresponds with U.S. Appl. No. 15/272,421, 5 pages.
Office Action, dated Aug. 15, 2019, received in U.S. Appl. No. 15/272,424, 12 pages.
Final Office Action, dated Jan. 8, 2020, received in U.S. Appl. No. 15/272,424, 7 pages.
Office Action, dated Jul. 2, 2018, received in Chinese Patent Application No. 201810396289.1, which corresponds with U.S. Appl. No. 15/272,424, 3 pages.
Office Action, dated Jan. 30, 2020, received in European Patent Application No. 19180887.2, which corresponds with U.S. Appl. No. 15/227,424, 5 pages.
Office Action, dated Jul. 3, 2018, received in U.S. Appl. No. 15/272,429, 25 pages.
Notice of Allowance, dated Jan. 14, 2019, received in U.S. Appl. No. 15/272,429, 8 pages.
Office Action, dated Jul. 10, 2018, received in U.S. Appl. No. 15/272,430, 16 pages.
Notice of Allowance, dated Nov. 7, 2018, received in U.S. Appl. No. 15/272,430, 7 pages.
Office Action, dated Jan. 22, 2020, received in Australian Patent Application No. 2019283863, which corresponds with U.S. Appl. No. 16/732,184, 3 pages.
ESR, dated Jul. 26, 2017, received in European Patent Application No. 17174969.0, 13 pages.
ISR and Written Opinion, dated Jul. 19, 2017, received in International Patent Application No. PCT/US2017/034340, 10 pages.
International Search Report and Written Opinion, dated Sep. 15, 2017, received in International Patent Application No. PCT/US2017/033396, which corresponds with U.S. Appl. No. 15/272,399, 16 pages.
European Search Report, dated Jul. 27, 2018, received in European Patent Application No. 18167254.4, which corresponds with U.S. Appl. No. 15/272,419, 6 pages.
European Search Report, dated Jan. 13, 2020, received in European Patent Application No. 19180887.2, which corresponds with U.S. Appl. No. 15/272,424, 4 pages.
Decision to Grant, dated Mar. 10, 2020, received in Danish Patent Application No, 201670653, which corresponds with U.S. Appl. No. 15/272,399, 2 pages.
Office Action, dated Feb. 26, 2020, received in Korean Patent Application No. 2019-7003574, which corresponds with U.S. Appl. No. 15/272,402, 3 pages.
Notice of Allowance, dated Feb. 25, 2020, received in Korean Patent Application No. 2019-7019197, which corresponds with U.S. Appl. No. 15/272,411, 5 pages.
Final Office Action, dated Mar. 3, 2020, received in U.S. Appl. No. 15/272,419, 21 pages.
Office Action, dated Mar. 3, 2020, received in Chinese Patent Application No. 201780002856.4, which corresponds with U.S. Appl. No. 15/272,421, 3 pages.
Office Action, dated Feb. 17, 2020, received in Korean Patent Application No. 2019-7036410, which corresponds with U.S. Appl. No. 16/732,184, 3 pages.

(56) References Cited

OTHER PUBLICATIONS

D'Onfro, "Facebook Built a Basketball Game Directly into Messenger—Here's How to Play", Business Insider, Mar. 17, 2016, 3 pages.
Hall, "Thanks for the Memory", Linux, Apr. 12, 2009, 12 pages.
Haslam, "Enable and Play Facebook Messenger's Hidden Basketball Game—Here's How", Redmond Pie, Mar. 30, 2016, 3 pages.
Office Action, dated May 11, 2020, received in Chinese Patent Application No. 201910607635.0, which corresponds with U.S. Appl. No. 15/272,411, 13 pages.
Final Office Action, dated May 14, 2020, received in U.S. Appl. No. 15/272,416, 30 pages.
Office Action, dated May 10, 2019, received in Australian Patent Application No. 2017266930, which corresponds with U.S. Appl. No. 15/272,421, 3 pages.
Office Action, dated May 12, 2020, received in U.S. Appl. No. 15/272,424, 15 Pages.
Patent, dated Jun. 19, 2020, received in Chinese Patent Application No. 201810396354.0, which corresponds with U.S. Appl. No. 15/272,429, 8 pages.
Office Action, dated Jun. 19, 2020, received in Chinese Patent Application No. 2019106074478, which corresponds with U.S. Appl. No. 16/544,787, 5 pages.
Certificate of Grant, dated May 21, 2020, received in Australian Patent Application No. 2019283863, which corresponds with U.S. Appl. No. 16/732,184, 3 pages.
Patent, dated May 29, 2020, received in Japanese Patent Application No. 2019-218615, which corresponds with U.S. Appl. No. 16/732,184, 4 pages.
Patent, dated Jul. 13, 2020, received in Danish Patent Application No. 201670636, which corresponds with U.S. Appl. No. 15/272,399, 4 pages.
Patent, dated Jul. 14, 2020, received in Danish Patent Application No. 201670653, which corresponds with U.S. Appl. No. 15/272,399, 4 pages.
Patent, dated Jul. 9, 2020, received in Korean Patent Application No. 2019-7003574, which corresponds with U.S. Appl. No. 15/272,402, 5 pages.
Office Action, dated Jul. 15, 2020, received in European Patent Application No. 19181254.4, which corresponds with U.S. Appl. No. 15/272,411, 7 pages.
Office Action, dated Jul. 15, 2020, received in U.S. Appl. No. 15/272,419, 28 pages.
Notice of Allowance, dated Jul. 28, 2020, received in Korean Patent Application No. 2019-7036410, which corresponds with U.S. Appl. No. 16/732,184, 5 pages.
Notice of Allowance, dated Oct. 8, 2020, received in U.S. Appl. No. 15/272,402, 42 pages.
Final Office Action, dated Oct. 29, 2020, received in U.S. Appl. No. 15/272,411, 30 pages.
Office Action, dated Sep. 3, 2020, received in U.S. Appl. No. 15/272,416, 31 pages.
Certificate of Grant, dated Aug. 27, 2020, received in Australian Patent Application No. 2017266930, which corresponds with U.S. Appl. No. 15/272,421, 4 pages.
Notice of Allowance, dated Sep. 3, 2020, received in Chinese Patent Application No. 201780002856.4, which corresponds with U.S. Appl. No. 15/272,421, 8 pages.
Intention to Grant, dated Oct. 21, 2020, received in European Patent Application No. 17728317.3, which corresponds with U.S. Appl. No. 15/272,421, 10 pages.
Notice of Allowance, dated Sep. 18, 2020, received in U.S. Appl. No. 15/272,424, 8 pages.
Office Action, dated Sep. 9, 2020, received in U.S. Appl. No. 16/194,237, 7 pages.
Patent, dated Oct. 27, 2020, received in Korean Patent Application No. 2019-7036410, which corresponds with U.S. Appl. No. 16/732,184, 5 pages.
Office Action, dated Oct. 27, 2020, received in Korean Patent Application No. 2020-7019976, which corresponds with U.S. Appl. No. 16/403,329, 4 pages.
Office Action, dated Dec. 10, 2020, received in Chinese Patent Application No. 201910607635.0, which corresponds with U.S. Appl. No. 15/272,411, 10 pages.
Patent, dated Nov. 10, 2020, received in Chinese Patent Application No. 201780002856.4, which corresponds with U.S. Appl. No. 15/272,421, 7 pages.
Notice of Allowance, dated Dec. 28, 2020, received in Chinese Patent Application No. 201910607633.1, which corresponds with U.S. Appl. No. 15/272,424, 6 pages.
Office Action, dated Dec. 14, 2020, received in Chinese Patent Application No. 201810396289.1, which corresponds with U.S. Appl. No. 15/272,429, 5 Pages.
Office Action, dated Jan. 11, 2021, received in Chinese Patent Application No. 2019106074478, which corresponds with U.S. Appl. No. 16/544,787, 2 pages, letter about action, not action itself.
Office Action, dated Jan. 18, 2021, received in Australian Patent Application No. 202002396, which corresponds with U.S. Appl. No. 16/789,335, 3 pages.
Office Action, dated Dec. 4, 2020, received in Danish Patent Application No. 2020-70483, which corresponds with U.S. Appl. No. 16/403,329, 9 pages.
Office Action, dated Jan. 25, 2021, received in U.S. Appl. No. 15/272,411, 46 pages.
Final Office Action, dated Jan. 25, 2021, received in U.S. Appl. No. 15/272,419, 32 pages.
Intention to Grant, dated Feb. 9, 2021, received in Danish Patent Application No. 201670652, which corresponds with U.S. Appl. No. 15/272,399, 2 pages.
Office Action, dated Mar. 29, 2021, received in Chinese Patent Application No. 201910607635.0, which corresponds with U.S. Appl. No. 15/272,411, 1 page.
Notice of Allowance, dated Feb. 5, 2021, received in Japanese Patent Application No. 2019-106495, which corresponds with U.S. Appl. No. 15/272,411, 2 pages.
Patent, dated Mar. 11, 2021, received in Japanese Patent Application No. 6851115, which corresponds with U.S. Appl. No. 15/272,411, 3 pages.
Final Office Action, dated Mar. 3, 2021, received in U.S. Appl. No. 15/272,416, 42 pages.
Patent, dated Mar. 12, 2021, received in Chinese Patent Application No. 2019106076633.1, which corresponds with U.S. Appl. No. 15/272,424, 7 pages.
Office Action, dated Feb. 11, 2021, received in U.S. Appl. No. 16/544,787, 18 pages.
Office Action, dated Apr. 2, 2021, received in Chinese Patent Application No. 2019106076346, 2 pages.
Office Action, dated May 5, 2021, received in Patent Application No. 201670652, which corresponds with U.S. Appl. No. 15/272,399, 2 pages.
Office Action, dated Apr. 29, 2021, received in European Patent Application No. 19180887.2, which corresponds with U.S. Appl. No. 15/2727,424, 6 pages.
Office Action, dated Feb. 19, 2021, received in U.S. Appl. No. 16/525,377, 27 pages.
Notice of Allowance, dated May 5, 2021, received in U.S. Appl. No. 15/272,411, 5 pages.

\* cited by examiner

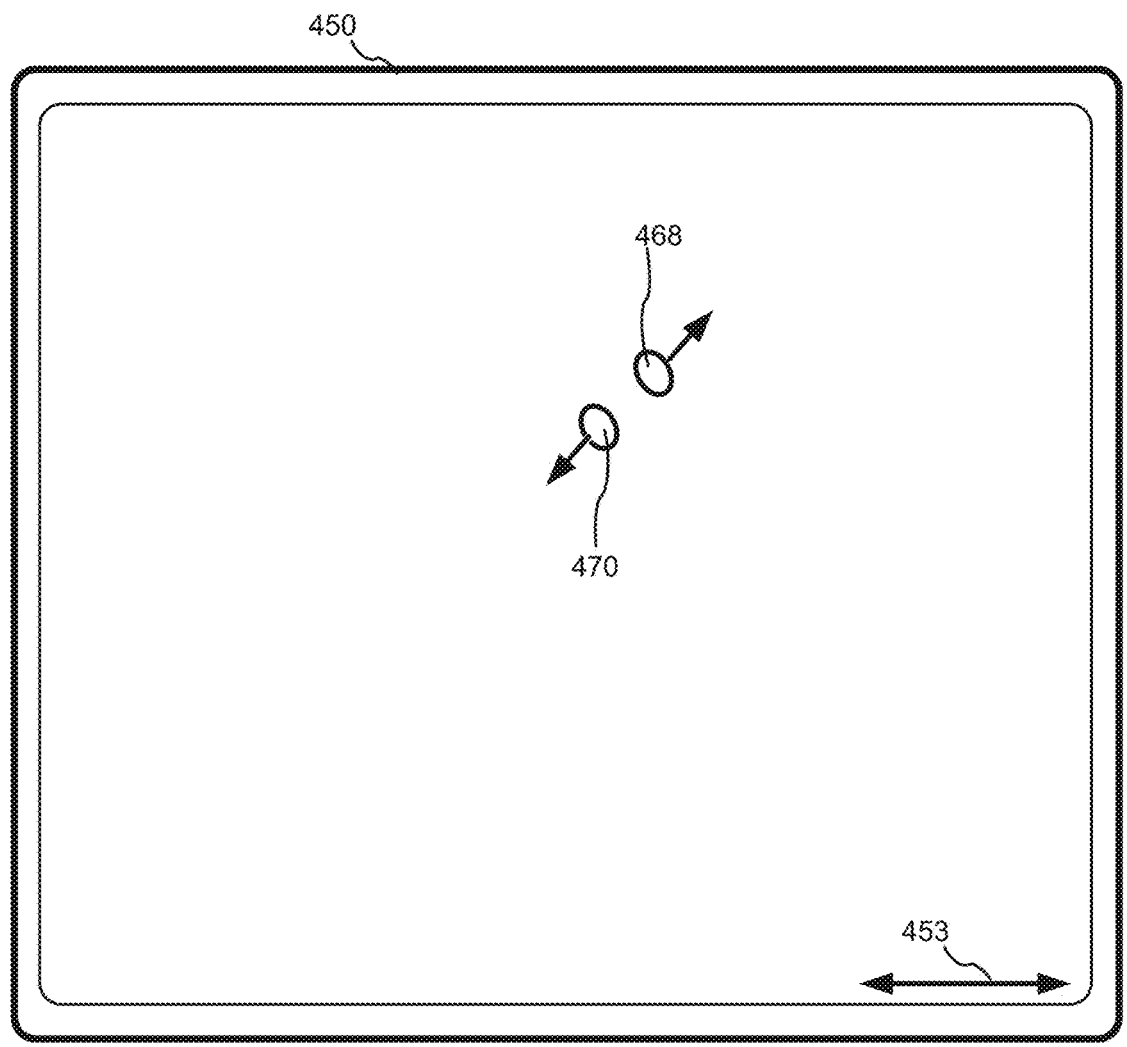
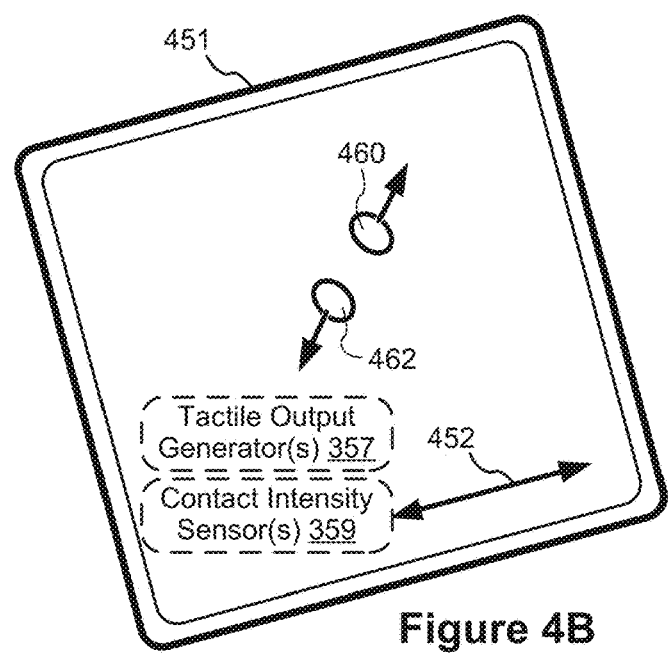
Figure 4B

6600

```
┌─────────────────────────────────────────────────────────────────────┐
│                                6602                                 │
│ Display a messaging user interface of a messaging application on a  │
│ display, the messaging user interface including a conversation      │
│ transcript of a messaging session between a user of the electronic  │
│ device and at least one other user and a message-input area,        │
│ wherein each of the other users included in the messaging session   │
│ has a corresponding avatar                                          │
└─────────────────────────────────────────────────────────────────────┘
                                  │
                                  ▼
┌─────────────────────────────────────────────────────────────────────┐
│                                6604                                 │
│ While displaying the messaging user interface, detect a first user  │
│ input while a focus selector is at a first location in the          │
│ messaging user interface that corresponds to an avatar of a first   │
│ other user included in the messaging session                        │
└─────────────────────────────────────────────────────────────────────┘
                                  │
                                  ▼
┌─────────────────────────────────────────────────────────────────────┐
│                                6606                                 │
│ In response to detecting the first user input, display a menu that  │
│ contains activatable menu items associated with the first other     │
│ user overlaid on the messaging user interface, the displayed menu   │
│ including an activatable menu item for initiating a payment action  │
│ with the first other user                                           │
└─────────────────────────────────────────────────────────────────────┘
                                  │
                                  ▼
┌─────────────────────────────────────────────────────────────────────┐
│                                6608                                 │
│ While displaying the menu that contains activatable menu items      │
│ associated with the first other user, detect a second user input    │
│ while a focus selector is at a second location in the messaging     │
│ user interface that corresponds to the activatable menu item for    │
│ initiating a payment action with the first other user               │
└─────────────────────────────────────────────────────────────────────┘
                                  │
                                  ▼
┌─────────────────────────────────────────────────────────────────────┐
│                                6610                                 │
│ In response to detecting the second user input, display a user      │
│ interface configured to initiate sending of a payment to, and/or    │
│ requesting a payment from, the first other user                     │
└─────────────────────────────────────────────────────────────────────┘
```

6806
In response to detecting the input by the first contact: in accordance with a determination that the input meets menu-activation-criteria, wherein the menu-activation-criteria require that a characteristic intensity of the contact on the touch-sensitive surface meet a respective intensity threshold in order for the menu-activation criteria to be met, display a menu that contains activatable menu items associated with the first avatar overlaid on the messaging user interface; and in accordance with a determination that the input meets avatar-spreading-criteria, wherein the avatar-spreading-criteria do not require that a characteristic intensity of the contact on the touchscreen meet the respective intensity threshold in order for the selection criteria to be met, display the plurality of avatars in an array 6816
The menu that contains activatable menu items associated with the first avatar includes a menu item that when activated initiates a call with the first other user 6818
The menu that contains activatable menu items associated with the first avatar includes a menu item that when activated initiates a video conference with the first other user 6820
The menu that contains activatable menu items associated with the first avatar includes a menu item that when activated initiates a payment action with the first other user

DEVICES, METHODS, AND GRAPHICAL USER INTERFACES FOR MESSAGING

RELATED APPLICATIONS

This application is a continuation of U.S. patent application Ser. No. 16/544,787, filed Aug. 19, 2019, which is a continuation of U.S. patent application Ser. No. 16/194,237, filed Nov. 16, 2018, which is a continuation of PCT International Application Serial No. PCT/US2017/033396, filed May 18, 2017, which claims priority to: (1) Denmark Application No. 201670636, filed Aug. 24, 2016; (2) Denmark Application No. 201670655, filed Aug. 26, 2016; (3) U.S. Provisional Application Ser. No. 62/506,614, filed May 16, 2017; (4) U.S. patent application Ser. No. 15/272,399, filed Sep. 21, 2016, now U.S. Pat. No. 9,959,037 (and previously published as US2017/0336958A1), (5) U.S. Provisional Application Ser. No. 62/349,114, filed Jun. 12, 2016; (6) U.S. Provisional Application Ser. No. 62/349,116, filed Jun. 12, 2016; (7) U.S. Provisional Application Ser. No. 62/339,078, filed May 19, 2016; and (8) U.S. Provisional Application Ser. No. 62/338,502, filed May 18, 2016, entitled "Devices, Methods, and Graphical User Interfaces for Messaging," which are all incorporated by reference herein in their entireties.

TECHNICAL FIELD

This relates generally to electronic devices with touch-sensitive surfaces, including but not limited to electronic devices with touch-sensitive surfaces that send and receive messages, such as instant messages.

BACKGROUND

The use of touch-sensitive surfaces as input devices for computers and other electronic computing devices has increased significantly in recent years. Exemplary touch-sensitive surfaces include touchpads and touch-screen displays. Such devices are often used to send messages, such as instant messages, between users using messaging applications.

But current messaging applications have numerous drawbacks and limitations. For example, they are limited in their ability to easily: acknowledge messages; edit previously sent messages; express what a user is trying to communicate; display private messages; synchronize viewing of content between users; incorporate handwritten inputs; quickly locate content in a message transcript; integrate a camera; integrate search and sharing; integrate interactive applications; integrate stickers; make payments; interact with avatars; make suggestions; navigate among interactive applications; manage interactive applications; translate foreign language text; combine messages into a group; and flag messages.

SUMMARY

Accordingly, there is a need for electronic devices with improved methods and interfaces for messaging. Such methods and interfaces optionally complement or replace conventional methods for messaging. Such methods and interfaces change the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

There is a need for electronic devices with improved methods and interfaces for selectively activating menus in a messaging session. Such methods and interfaces may complement or replace conventional methods for selectively activating menus in a messaging session. Such methods and interfaces reduce the number, extent, and/or the nature of the inputs from a user and produce a more efficient human-machine interface.

In accordance with some embodiments, a method is performed at an electronic device with one or more processors, memory, a touch-sensitive surface, one or more sensors to detect intensities of contacts with the touch-sensitive surface, and a display. The device displays a messaging user interface of a messaging application on the display, the messaging user interface including a conversation transcript of a messaging session between a user of the electronic device and a plurality of other users, a message-input area, and a plurality of avatars, each respective avatar in the plurality of avatars corresponding to a respective other user in the plurality of other users included in the messaging session, wherein the plurality of avatars are displayed as a stack of avatars, with a first avatar in the plurality of avatars displayed on the top of the stack of avatars. While displaying the messaging user interface, the device detects an input by a first contact on the touch-sensitive surface while a focus selector is at a first location in the messaging user interface that corresponds to the first avatar. In response to detecting the input by the first contact: in accordance with a determination that the input meets menu-activation-criteria, wherein the menu-activation-criteria require that a characteristic intensity of the contact on the touch-sensitive surface meet a respective intensity threshold in order for the menu-activation criteria to be met, the device displays a menu that contains activatable menu items associated with the first avatar overlaid on the messaging user interface. In accordance with a determination that the input meets avatar-spreading-criteria, wherein the avatar-spreading-criteria do not require that a characteristic intensity of the contact on the touchscreen meet the respective intensity threshold in order for the selection criteria to be met, the device displays the plurality of avatars in an array.

In accordance with some embodiments, there is an electronic device, including a display unit configured to display user interfaces; a touch-sensitive surface unit configured to detect contacts; and a processing unit coupled with the display unit and the touch-sensitive surface unit. The processing unit enables display of a messaging user interface of a messaging application on the display unit, the messaging user interface including a conversation transcript of a messaging session between a user of the electronic device and a plurality of other users, a message-input area, and a plurality of avatars, each respective avatar in the plurality of avatars corresponding to a respective other user in the plurality of other users included in the messaging session, wherein the plurality of avatars are displayed as a stack of avatars, with a first avatar in the plurality of avatars displayed on the top of the stack of avatars. While displaying the messaging user interface, the processing unit detects an input by a first contact on the touch-sensitive surface unit while a focus selector is at a first location in the messaging user interface that corresponds to the first avatar. In response to detecting the input by the first contact: in accordance with a determination that the input meets menu-activation-criteria, wherein the menu-activation-criteria require that a characteristic intensity of the contact on the touch-sensitive surface unit meet a respective intensity threshold in order for the menu-activation criteria to be met, the processing unit enables display of a menu that contains activatable menu items associated with the first avatar overlaid on the messaging user interface. In accordance with a determination that the input meets avatar-spreading-criteria, wherein the avatar-spreading-criteria do not require that a characteristic intensity of the contact on the touchscreen meet the respective intensity threshold in order for the selection criteria to be met, the processing unit enables display of the plurality of avatars in an array.

Thus, electronic devices with displays and touch-sensitive surfaces are provided with improved methods and interfaces for selectively activating menus in a messaging session, thereby increasing the effectiveness, efficiency, and user satisfaction with such devices. Such methods and interfaces may complement or replace conventional methods for selectively activating menus in a messaging session.

In accordance with some embodiments, an electronic device includes a display, a touch-sensitive surface, optionally one or more sensors to detect intensities of contacts with the touch-sensitive surface, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions which when executed by an electronic device with a display, a touch-sensitive surface, and optionally one or more sensors to detect intensities of contacts with the touch-sensitive surface, cause the device to perform or cause performance of the operations of any of the methods described herein. In accordance with some embodiments, a graphical user interface on an electronic device with a display, a touch-sensitive surface, optionally one or more sensors to detect intensities of contacts with the touch-sensitive surface, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, and optionally one or more sensors to detect intensities of contacts with the touch-sensitive surface; and means for performing or causing performance of the operations of any of the methods described herein. In accordance with some embodiments, an information processing apparatus, for use in an electronic device with a display and a touch-sensitive surface, and optionally one or more sensors to detect intensities of contacts with the touch-sensitive surface, includes means for performing or causing performance of the operations of any of the methods described herein.

Thus, electronic devices with displays, touch-sensitive surfaces and optionally one or more sensors to detect intensities of contacts with the touch-sensitive surface are provided with faster, more efficient methods and interfaces for messaging, thereby increasing the effectiveness, efficiency, and user satisfaction with such devices. Such methods and interfaces may complement or replace conventional methods for messaging.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4B illustrates an example user interface for a multifunction device with a touch-sensitive surface that is separate from the display in accordance with some embodiments.

FIG. 7 is a flow diagram illustrating a method of making payments from a messaging application in accordance with some embodiments.

FIGS. 9A-9B are flow diagrams illustrating a method 6800 of interacting with a single user included in a group messaging session in accordance with some embodiments.

DESCRIPTION OF EMBODIMENTS

Figure 1A:
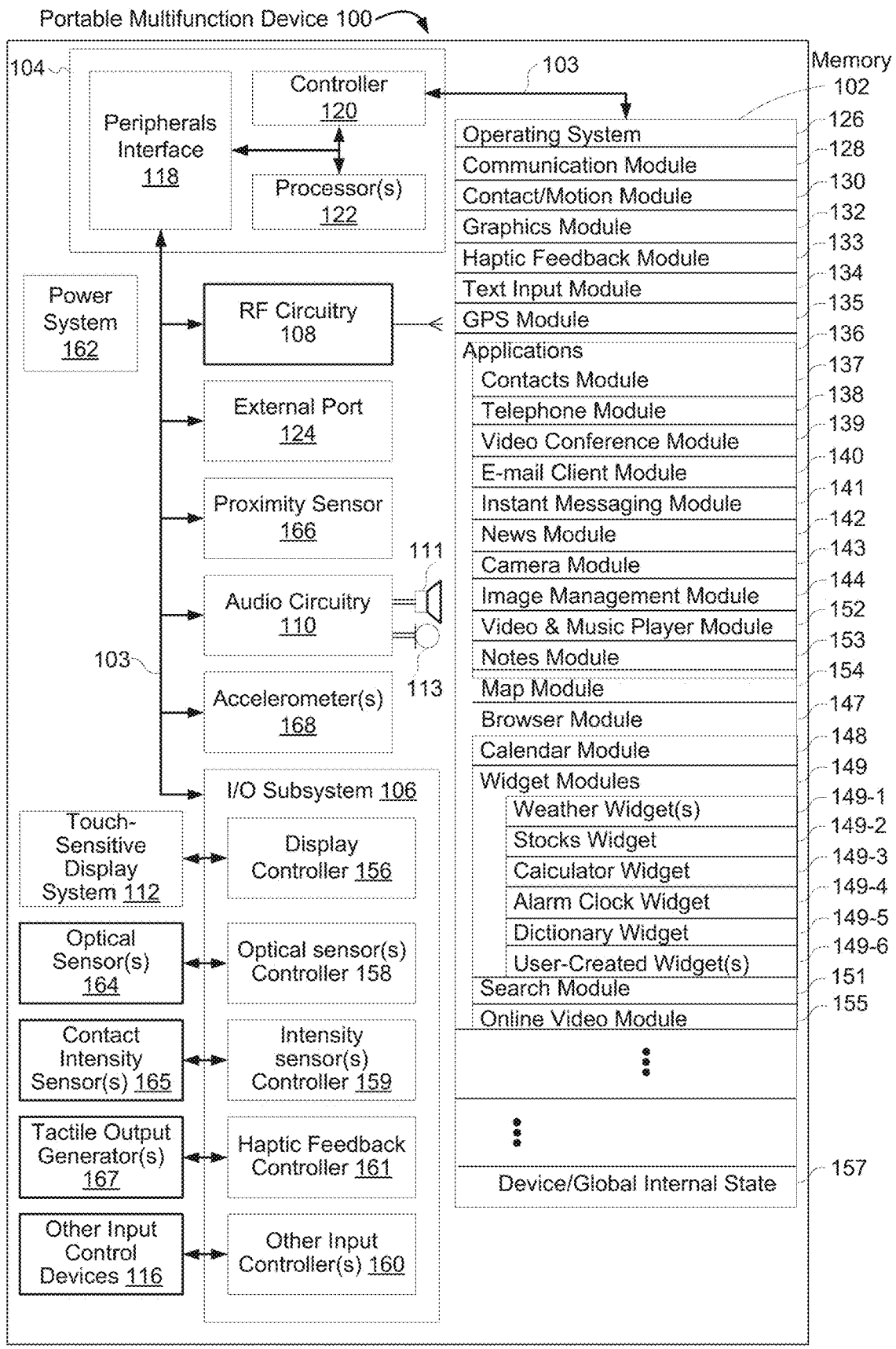
FIG. 1A is a block diagram illustrating a portable multifunction device with a touch-sensitive display in accordance with some embodiments.

The methods, devices, and GUIs described herein improve messaging in multiple ways. For example, they make it easier to: acknowledge messages; edit previously sent messages; express what a user is trying to communicate; display private messages; synchronize viewing of content between users; incorporate handwritten inputs; quickly locate content in a message transcript; integrate a camera; integrate search and sharing; integrate interactive applications; integrate stickers; make payments; interact with avatars; make suggestions; navigate among interactive applications; manage interactive applications; translate foreign language text; combine messages into a group; and flag messages.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

In addition to a messaging application, the device typically supports a variety of other applications, such as one or more of the following: a note taking application, a drawing application, a presentation application, a word processing application, a website creation application, a disk authoring application, a spreadsheet application, a gaming application, a telephone application, a video conferencing application, an e-mail application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 120, one or more processing units (CPUs) 122, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 122 and the peripherals interface 118, is, optionally, controlled by memory controller 120.

Peripherals interface 118 can be used to couple input and output peripherals of the device to CPU(s) 122 and memory 102. The one or more processors 122 run or execute various software programs and/or sets of instructions stored in memory 102 to perform various functions for device 100 and to process data.

In some embodiments, peripherals interface 118, CPU(s) 122, and memory controller 120 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
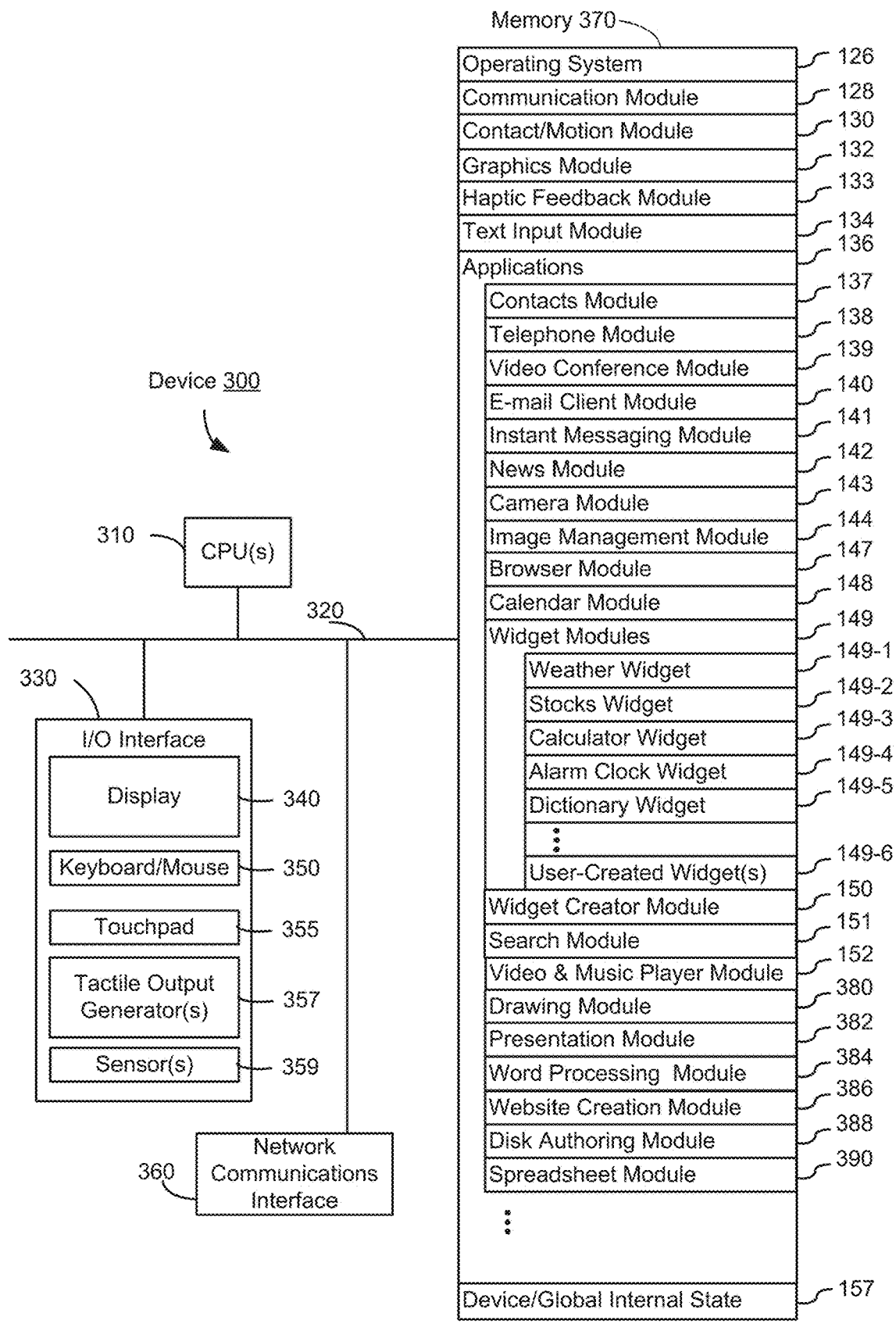
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensities of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- news module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, to view received instant messages, and to perform the functions of the messaging application described in greater detail below. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, news module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
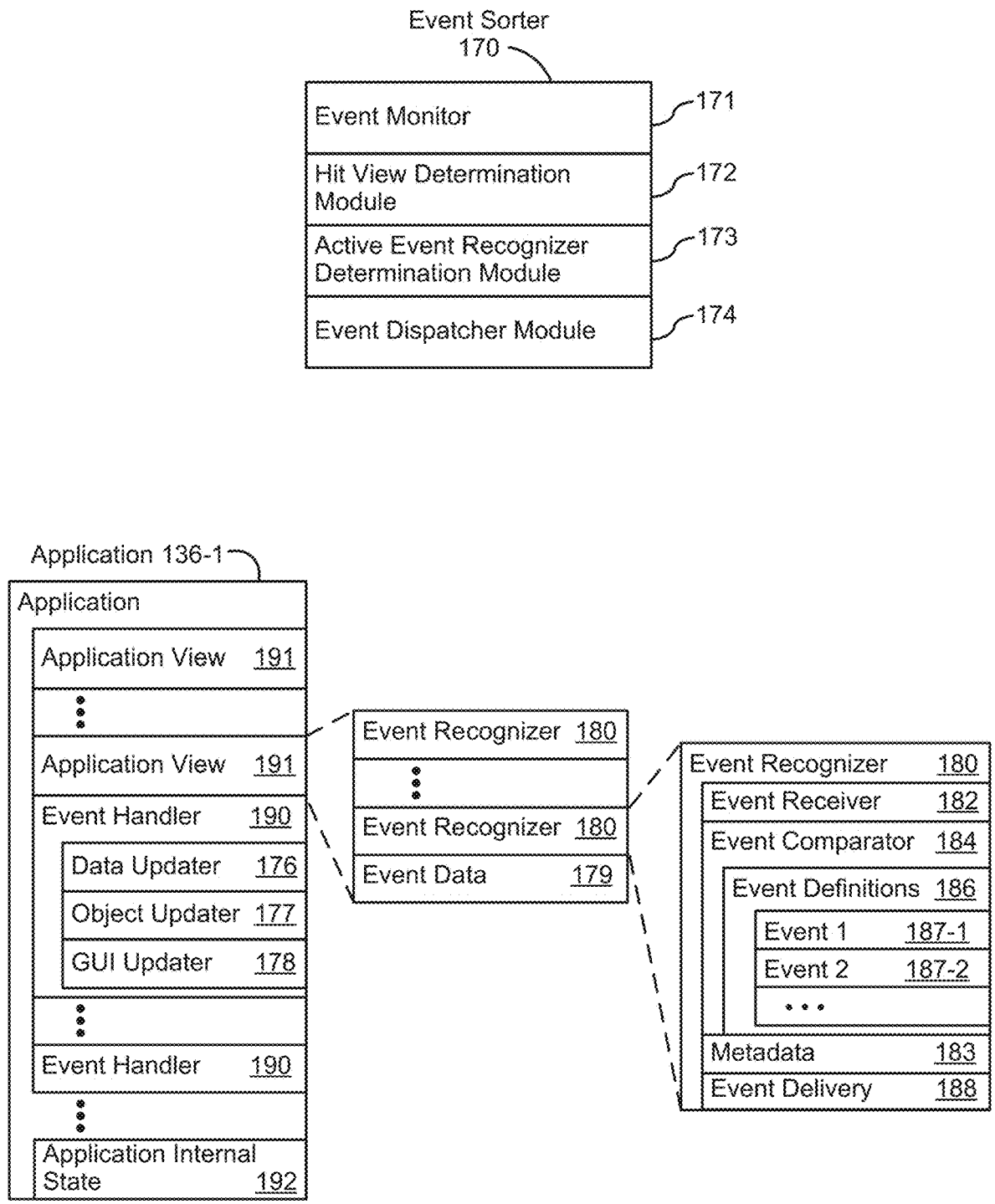
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
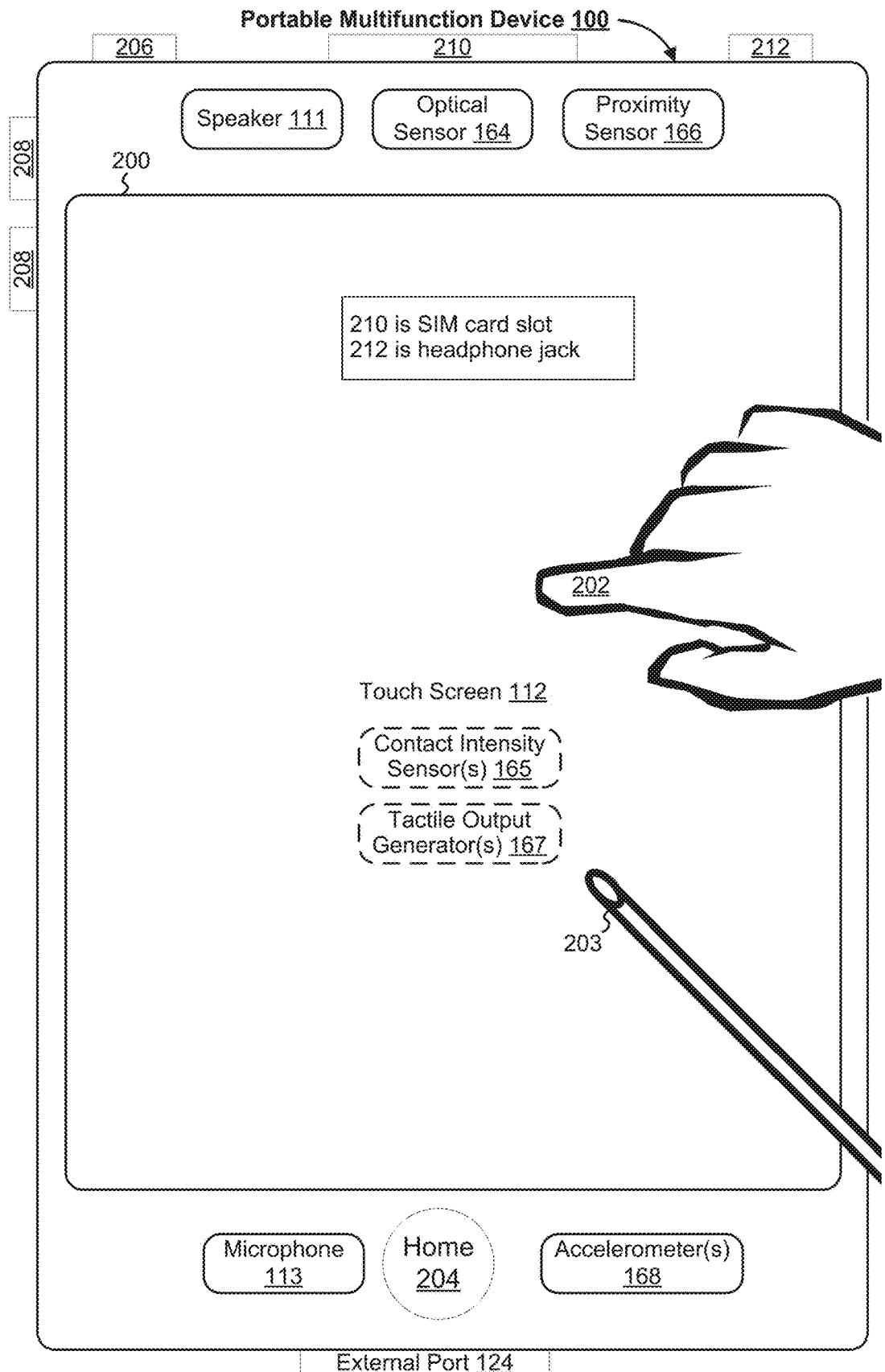
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
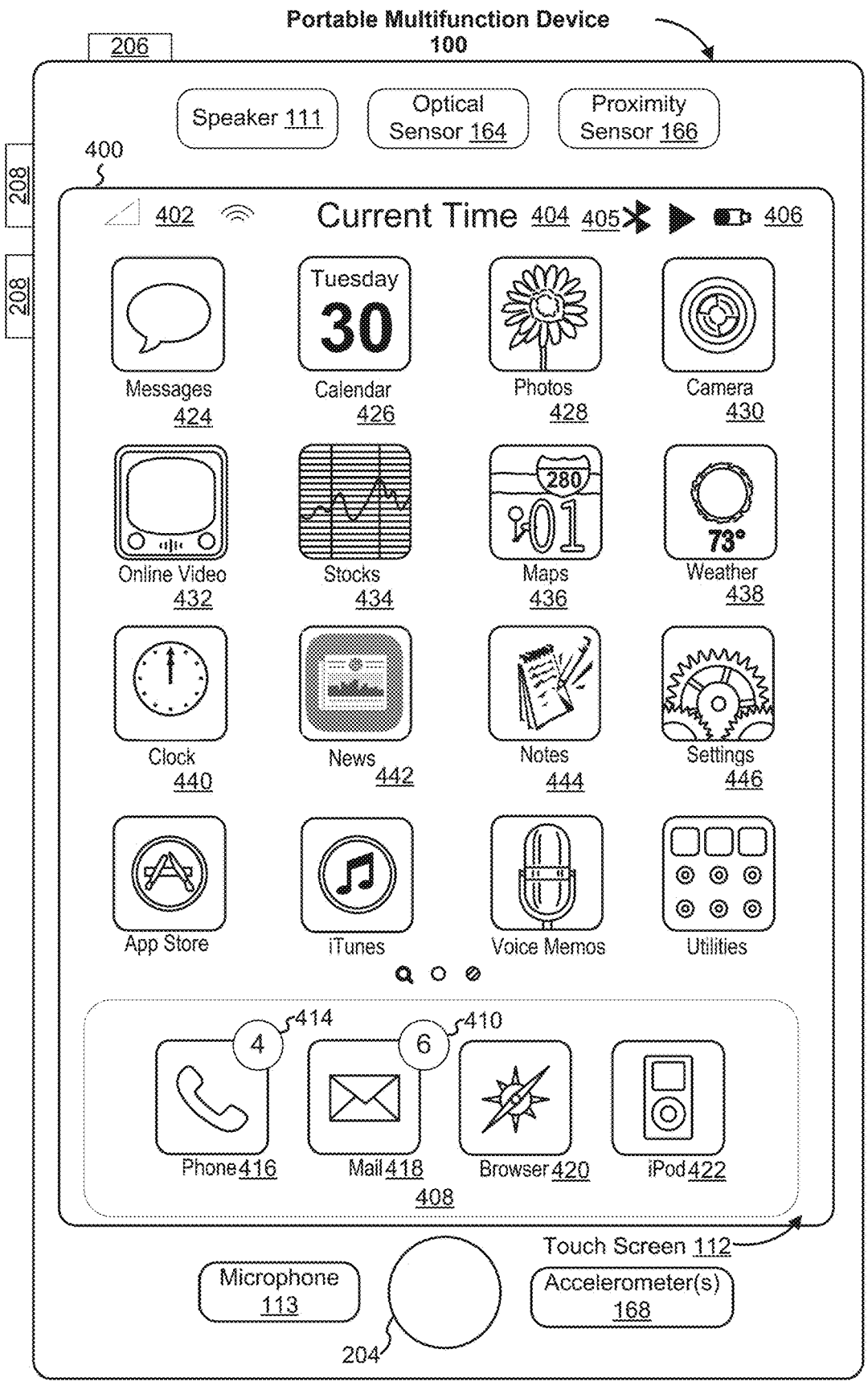
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Map;"

Icon 438 for weather widget 149-1, labeled "Weather;"

Icon 440 for alarm clock widget 149-4, labeled "Clock;"

Icon 442 for news module 142, labeled "News;"

Icon 444 for notes module 153, labeled "Notes;" and

Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 359) for detecting intensities of contacts on touch-sensitive surface 451 and/or one or more tactile output generators 357 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" is an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen display acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact.

Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact is a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$) (e.g., that is at least initially higher than $I_L$), and/or one or more other intensity thresholds (e.g., an intensity threshold $I_H$ that is lower than $I_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold.

Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

Figure 4C:
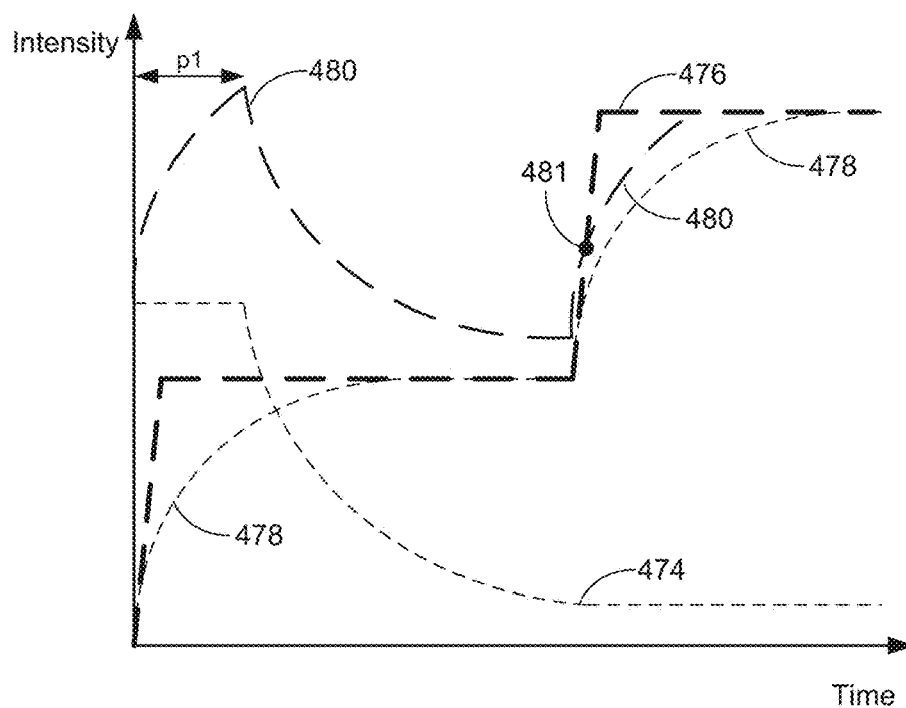
FIGS. 4C-4E illustrate examples of dynamic intensity thresholds in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
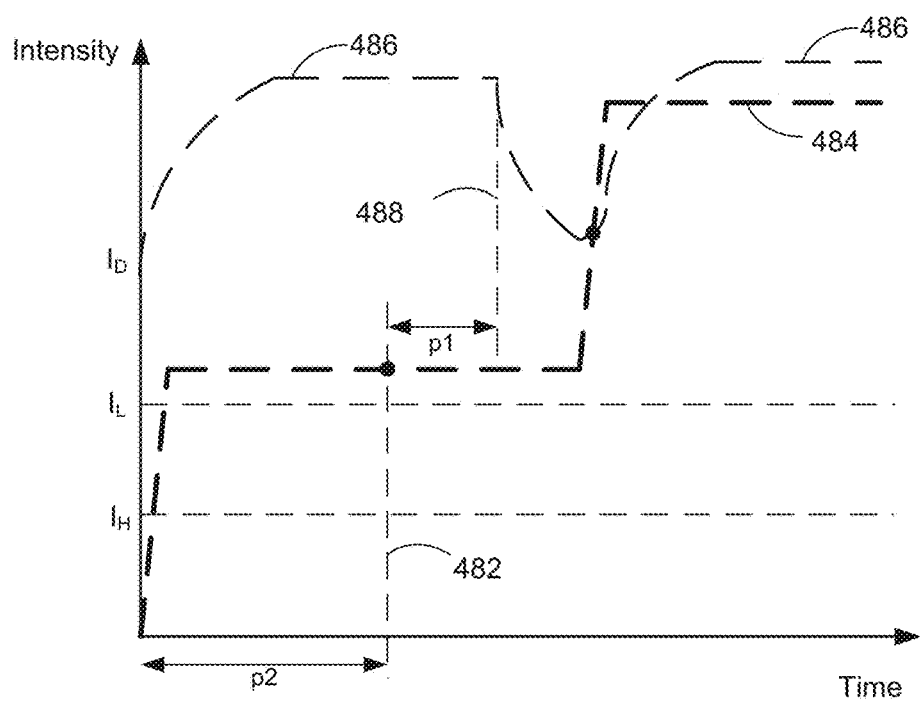

FIG. 4D illustrates another dynamic intensity threshold 486 (e.g., intensity threshold ID). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold ID immediately after, or concurrently with, triggering a response associated with a lower intensity threshold, such as the first intensity threshold $I_H$ or the second intensity threshold $I_L$.

Figure 4E:
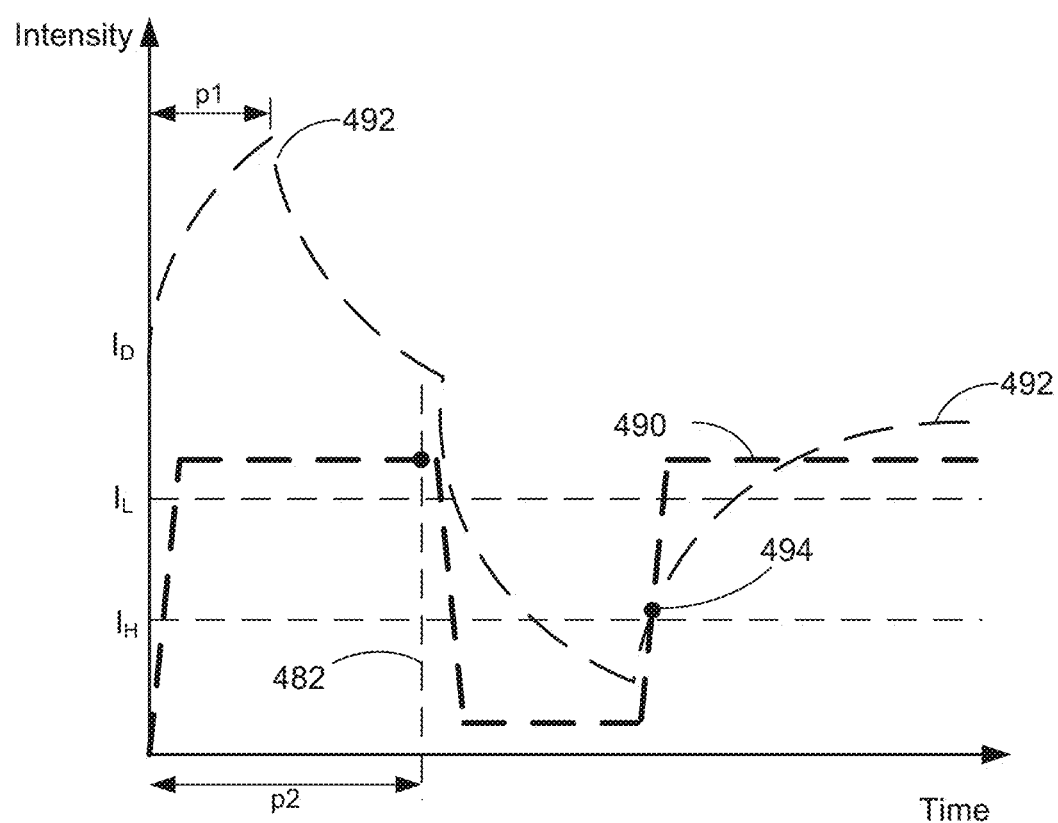

FIG. 4E illustrate yet another dynamic intensity threshold 492 (e.g., intensity threshold ID). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold ID (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_D$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, and (optionally) one or more sensors to detect intensities of contacts with the touch-sensitive surface.

These user interfaces and associated processes provide new, improved ways to:
  acknowledge messages;
  edit previously sent messages;
  display an edit history for a previously sent message;
  apply impact effect options to a message (e.g., to express what a user is trying to communicate);
  display private messages using "invisible ink";
  display enhanced message interface content (e.g., "full screen moments");
  display content (e.g., "magic moments") that corresponds to particular combinations of content in two separate messages;
  build message bubbles;
  suggest emojis
  synchronize viewing of content between users;
  incorporate handwritten inputs;
  selectively scrunch content in a message transcript;
  integrate a camera;
  integrate search and sharing;
  integrate interactive applications;
  integrate stickers;
  make payments;
  interact with avatars; and
  make suggestions.

Figure 5A:
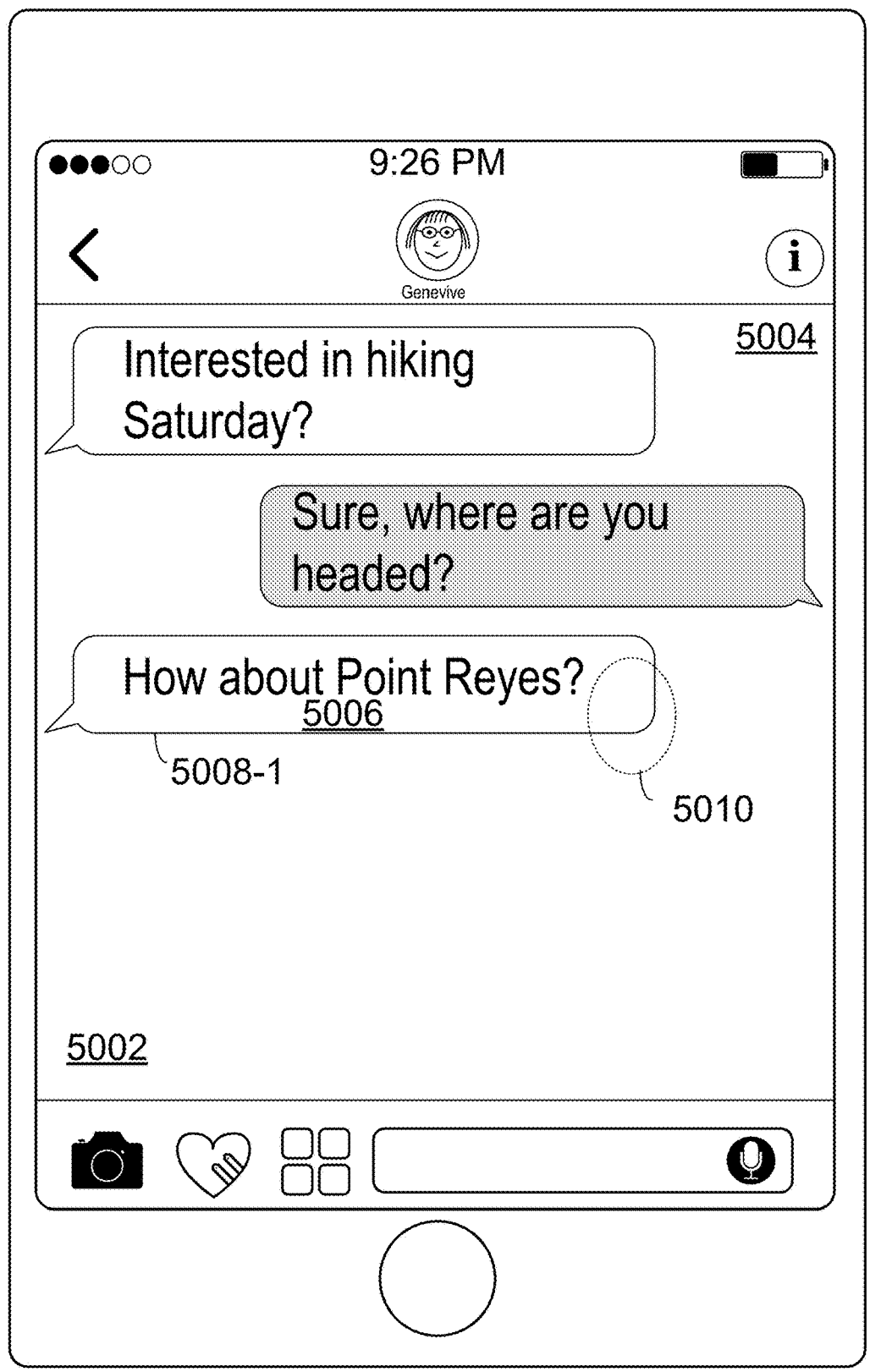
FIGS. 5A-5K illustrate exemplary user interfaces for displaying message transcripts and message acknowledgments.
Figure 5B:
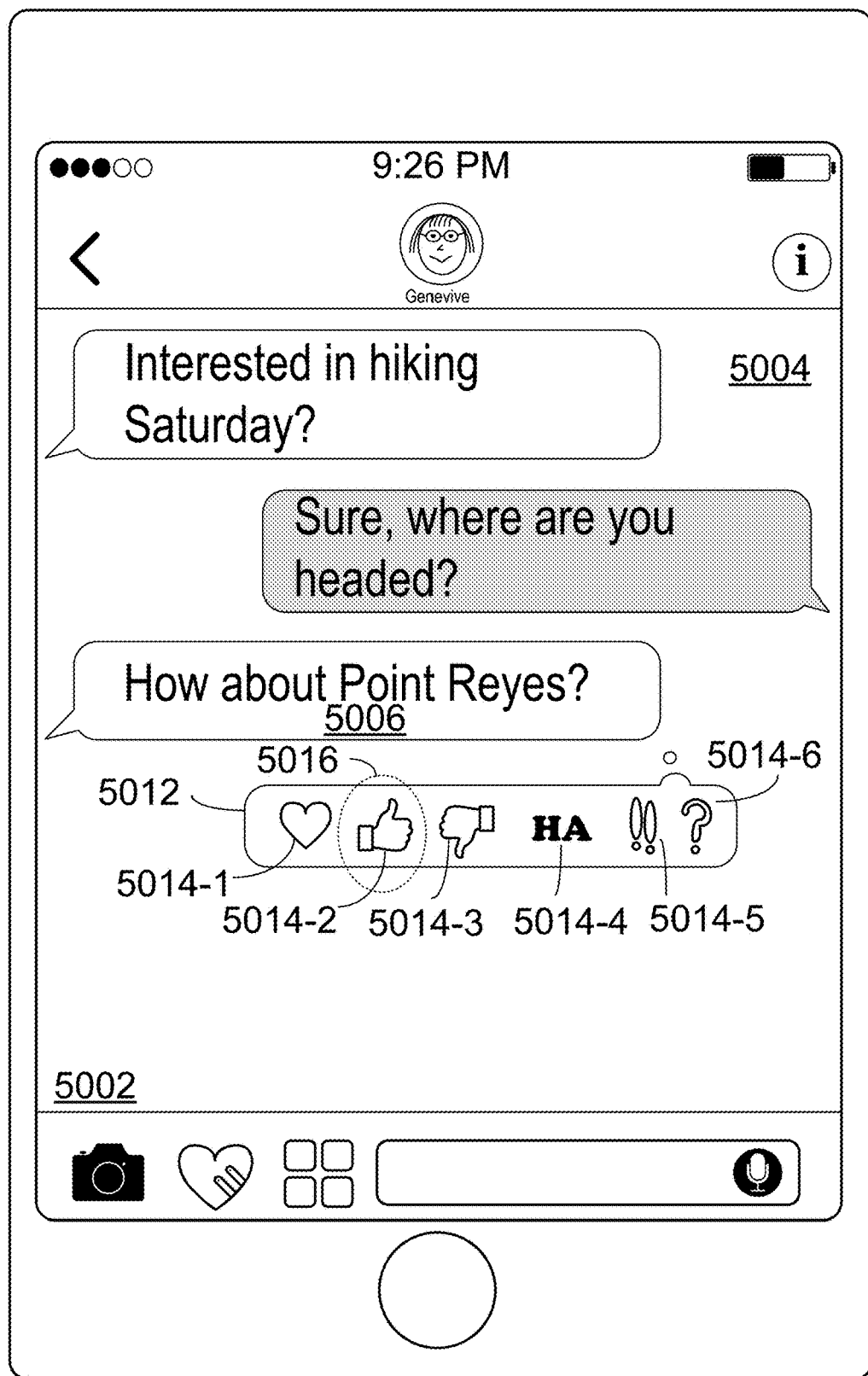

FIGS. 5A-5K illustrate exemplary user interfaces for displaying message transcripts and message acknowledgments in accordance with some embodiments. In particular, FIG. 5A illustrates a messaging user interface 5002 of a messaging application, displayed on the display of an electronic device, sometimes called the first electronic device to help distinguish it from other electronic devices in communication with the first electronic device. The first electronic device also includes a touch-sensitive surface and one or more sensors, such as in a touch-screen display or trackpad, configured to detect intensities of contacts on the touch-sensitive surface.

Figure 5C:
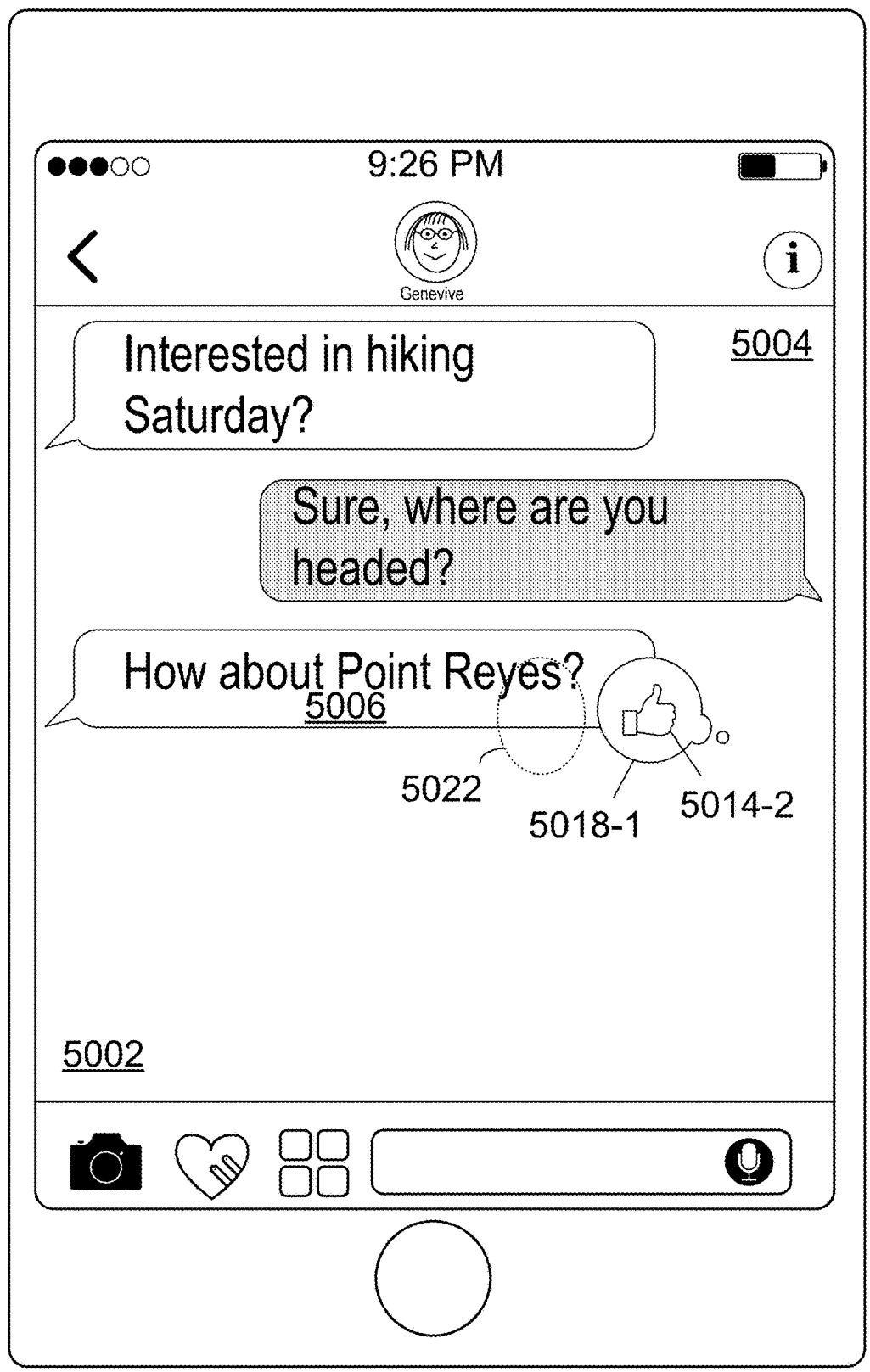
Figure 5D:
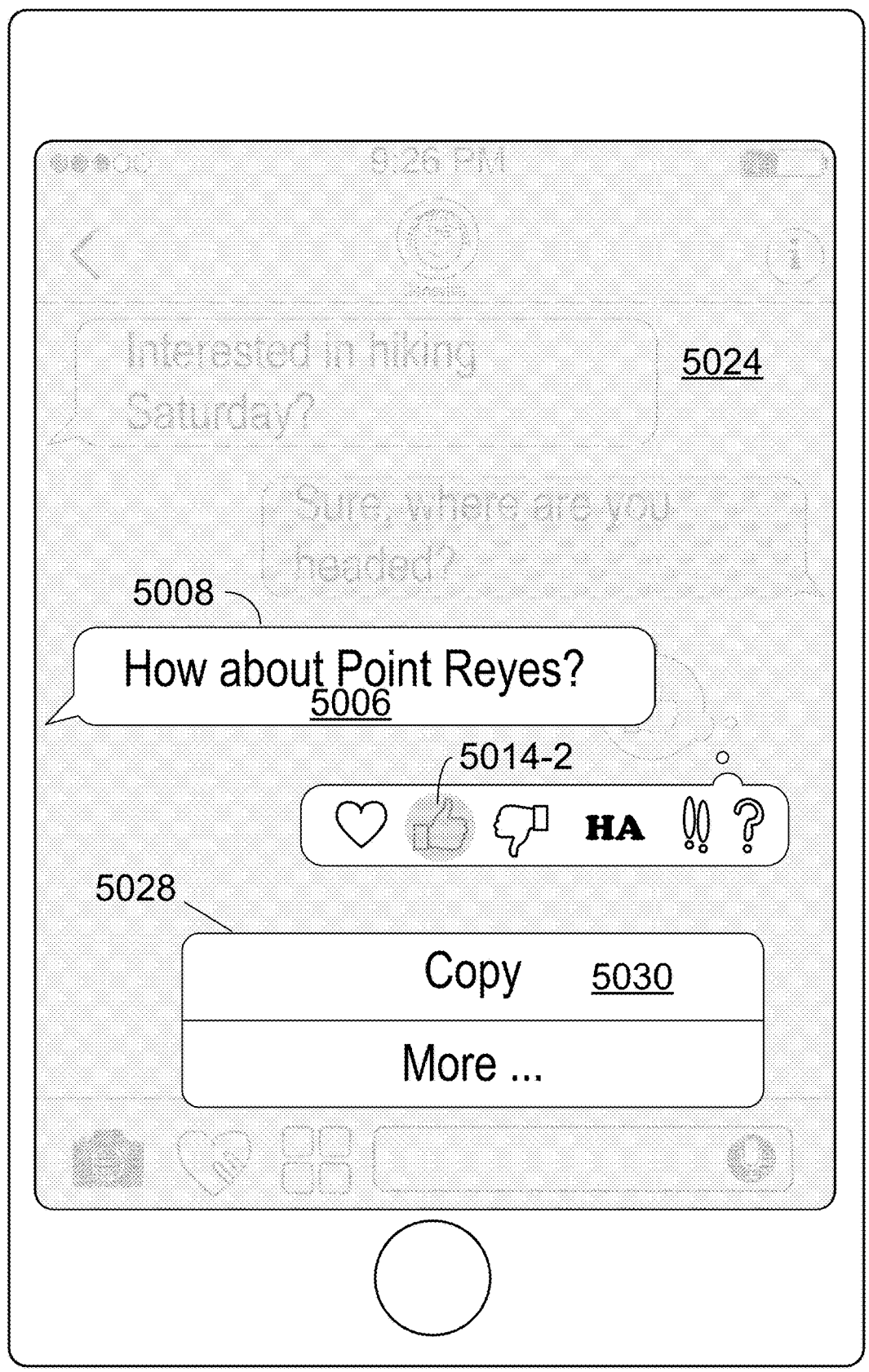

The messaging user interface 5002, as shown in FIG. 5A, includes an exemplary conversation transcript 5004 (also referred to as "conversation transcript 5004") of a messaging session between a user (e.g., Genevive) of the electronic device and at least one other user (e.g., Isaac) of another electronic device). The conversation transcript 5004 in this example includes multiple messages, each in a respective message region 5008. A first input with a first contact 5010 at the location on the touch-sensitive surface corresponding to a first message 5006. In response to detecting the first input 5010, the electronic device displays an acknowledgement selection affordance 5012, FIG. 5B, at a location in the messaging interface that corresponds to the first message region. In this example, the acknowledgement selection affordance displays a plurality of acknowledgement options: 5014-1 (heart), 5014-2 (thumbs up), 5014-3 (thumbs down), 5014-4 ("HA"), 5014-5 ("! !") and 5014-6 ("?"). Other embodiments may include fewer, additional or different acknowledgment options. The electronic device responds to receiving a second input 5106 by a second contact (e.g., a tap gesture, light press gesture, deep press gesture, or lift off) on a respective acknowledgment option (or a hit region corresponding to the respective acknowledgment option), such as option 5014-2 (thumbs up), to select respective acknowledgment option and apply it to the first message 5006 or first message region 5008-1, as shown in FIG. 5C. The selected acknowledgment option, in this example option 5014-2, is displayed in a respective acknowledgement region 5018. As shown in FIG. 5H, the electronic device(s) of other user(s) (in this example, Isaac) participating in the messaging session (sometimes called a conversation) display the same selected acknowledgment option proximate for the first message region.

To edit the selected acknowledgement option, the user make a third input by a third contact 5022, as shown in FIG. 5C. Upon detecting the third input by the third contact, the electronic device displays an acknowledgement editing interface 5024, as shown in FIG. 5D. Optionally, the acknowledgement editing interface is displayed on top of and/or in place of the conversation transcript. Optionally the currently selected acknowledgment option, in this example option 5014-2, is visually distinguished from the other available acknowledgement options in the acknowledgement editing interface 5024, as shown in FIG. 5D.

Figure 5E:
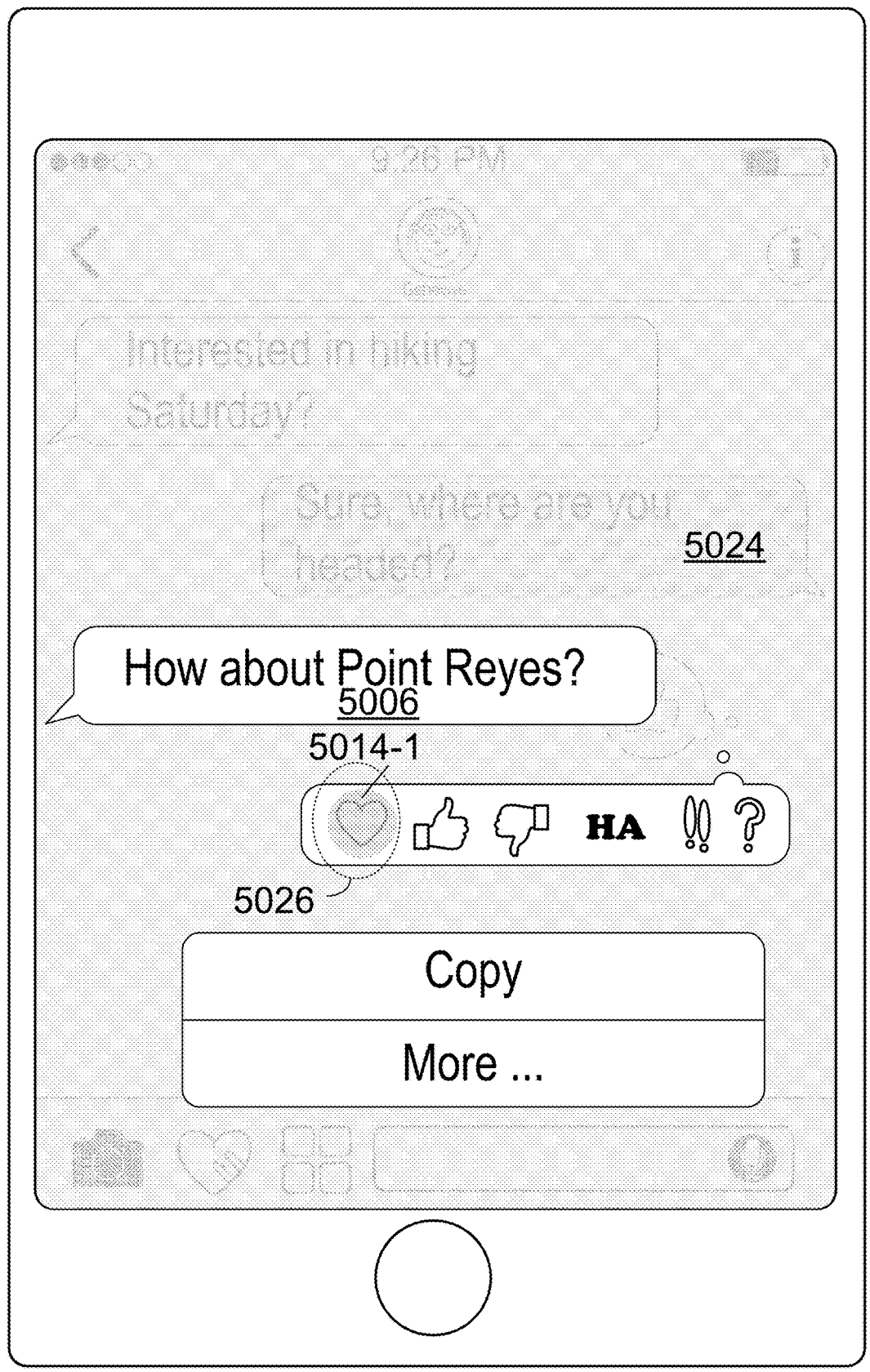
Figure 5F:
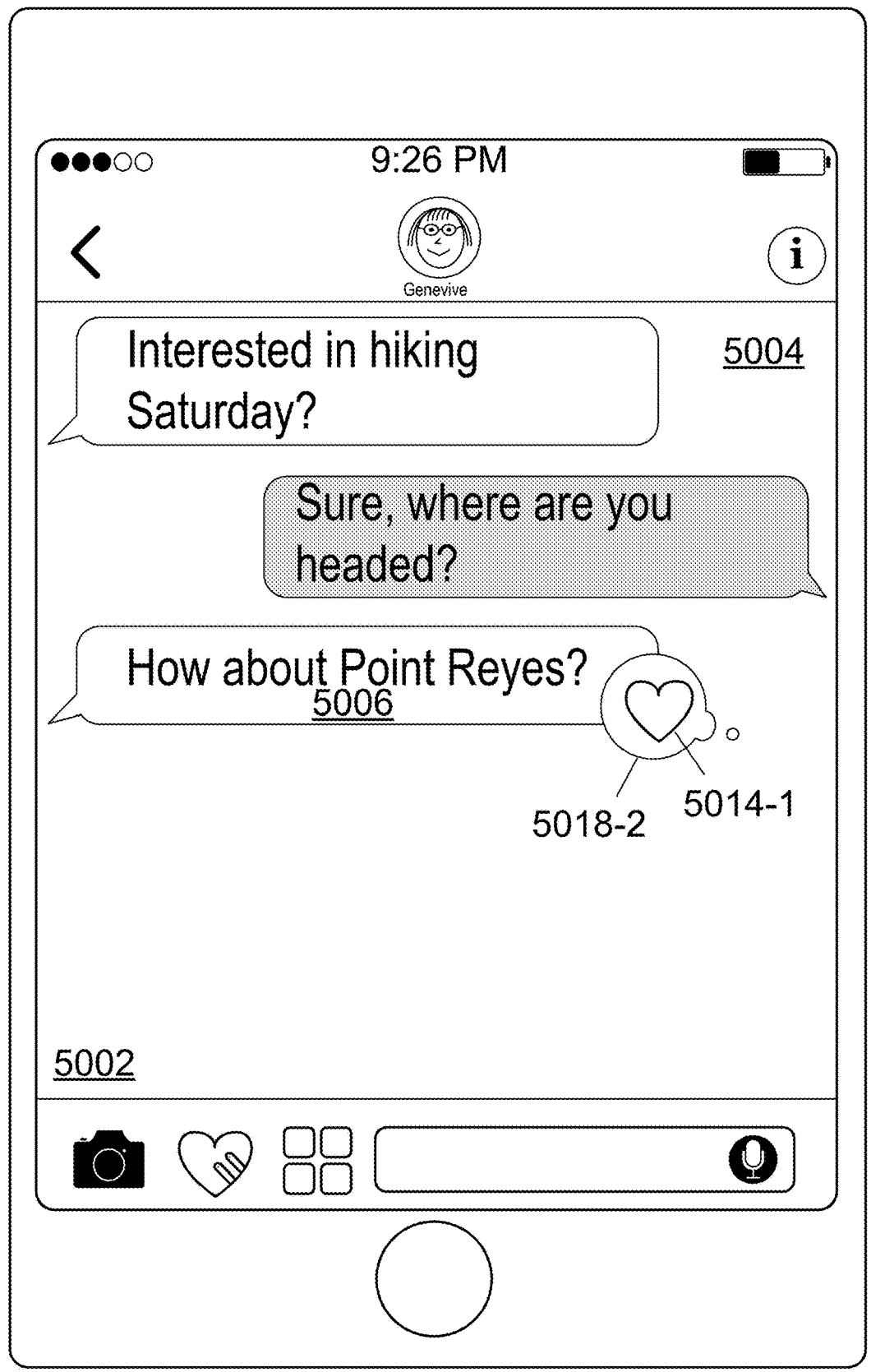

FIG. 5E shows an input, contact 5026, selecting a different, second acknowledgement option 5014-1, and FIG. 5F shows a message region in a conversation transcript with the edited acknowledgment (i.e., with second acknowledgement option 5014-1 displayed instead of first acknowledgement option 5014-2).

Figure 5G:
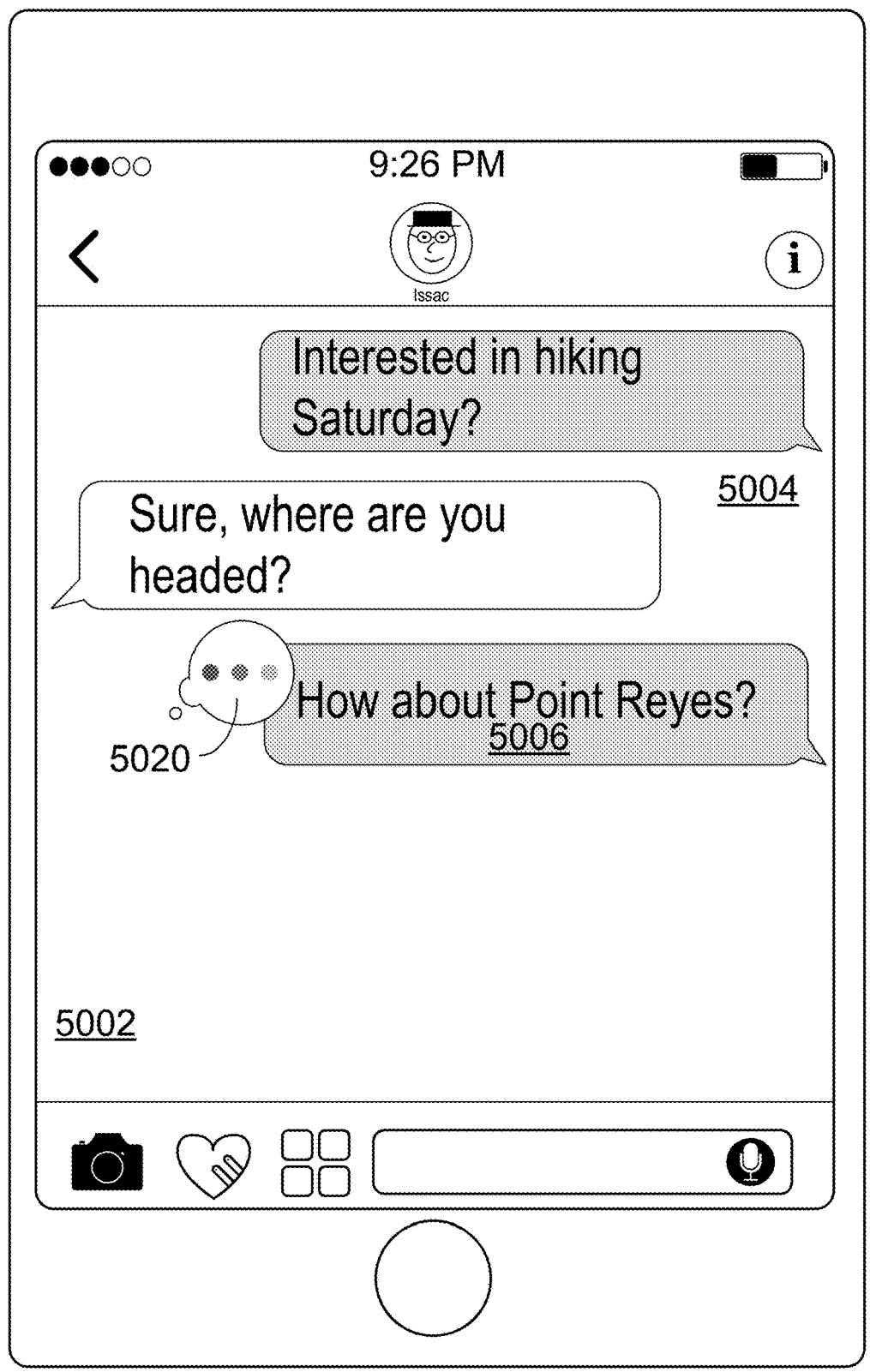
Figure 5H:
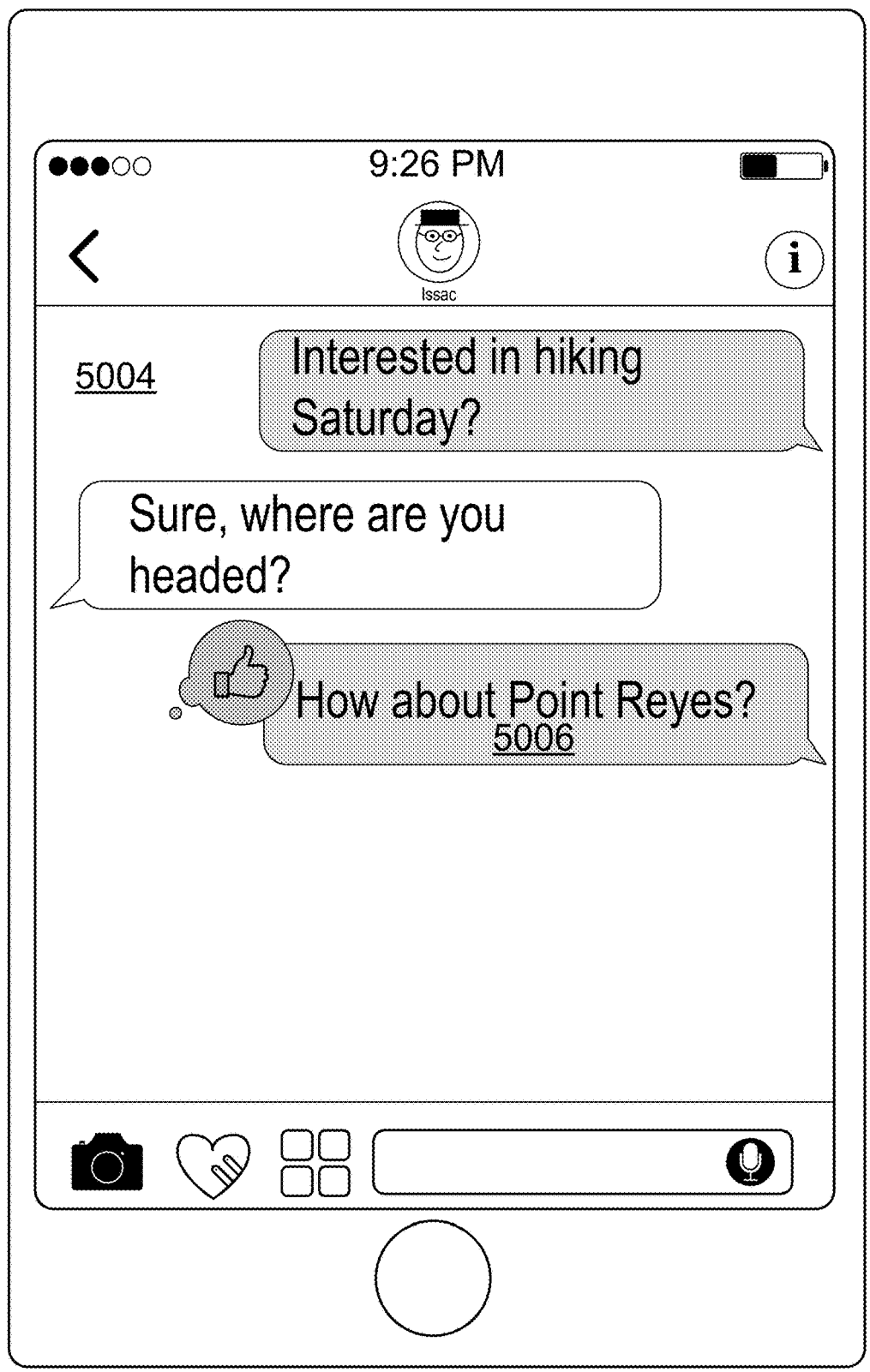

In some embodiments, while the user of the first electronic device is using the acknowledgement editing interface 5024 to edit a previously selected acknowledgment option for the first message region, the electronic device of another user in the messaging session displays an acknowledgement-preparation indicator 5020, as shown in FIG. 5G, proximate (e.g., near, adjacent or partially overlapping) the first message region in the conversation transcript 5004 displayed by that electronic device.

Figure 5I:
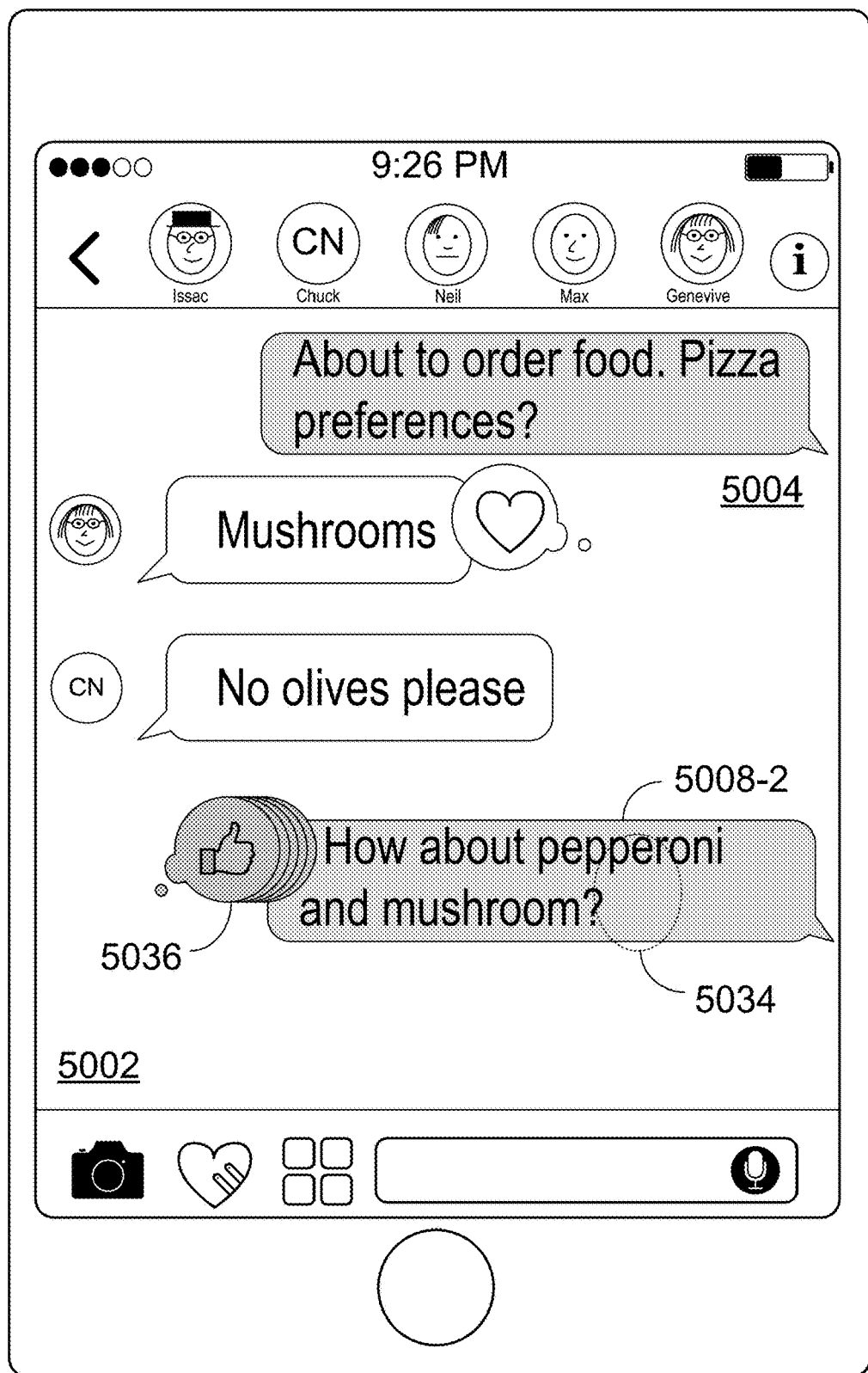

Different users in the same messaging session may select different acknowledgment options for the same message or message region. In some embodiments, as shown in FIG. 5I, the electronic device displays, in the conversation transcript, an indicia 5036, that users in the messaging session have selected a plurality of acknowledgements options for the second message region. In the example shown in FIG. 5I, indicia 5036 is a stack of overlapping acknowledgement option icons, but could alternatively be a plurality of individual acknowledgement option icons. As shown in FIG. 5I, indicia 5036 is optionally adjacent to and/or partially overlapping the second message region 5008-02.

Figure 5J:
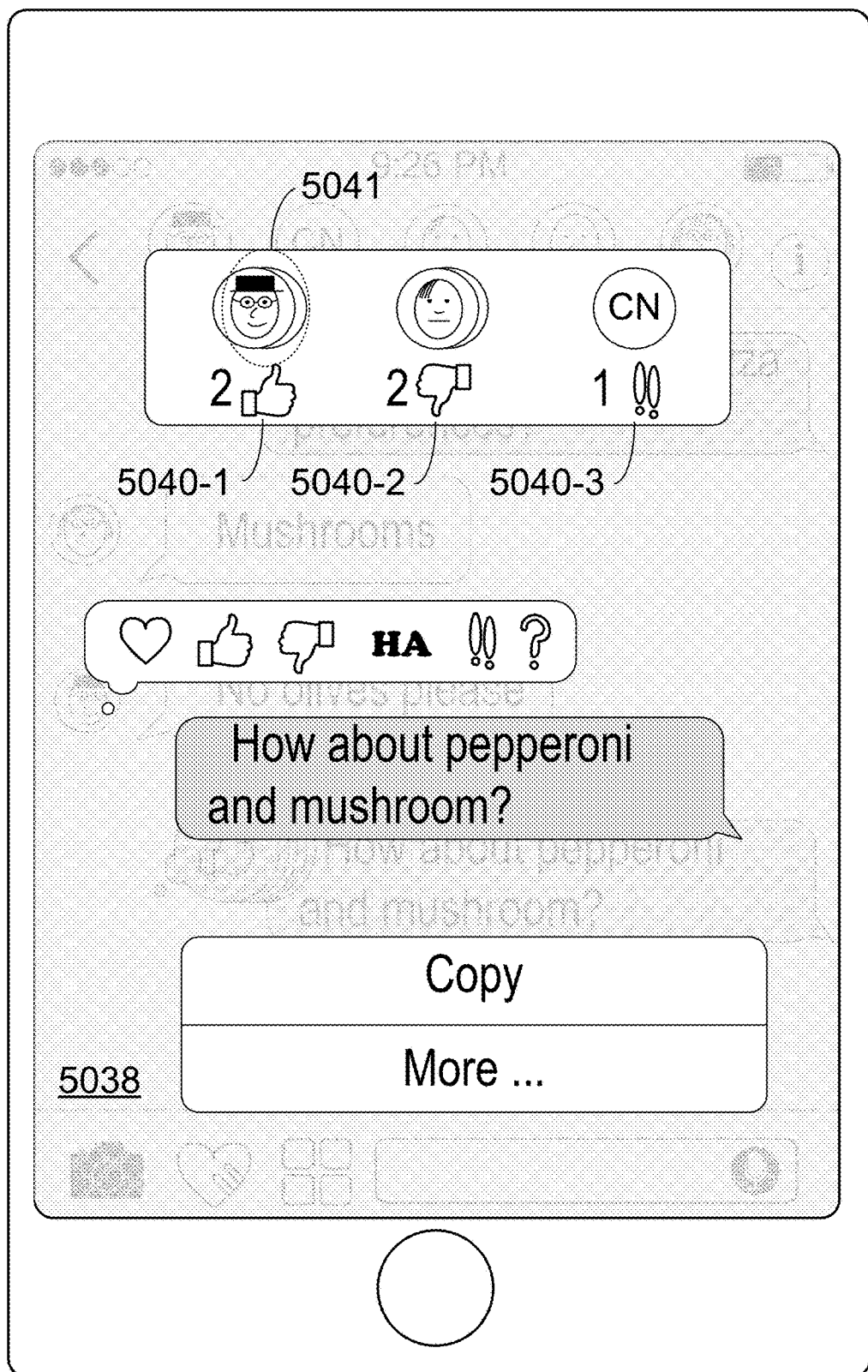

FIG. 5J shows an example of a user interface that includes a tally for each type of acknowledgement option selected by the users in the messaging session. For example, as shown in FIG. 5J, the user interface includes tallies 5040-1, 5040-2, 5040-3 for three distinct acknowledgement options selected by users in the messaging session. In some embodiments, the user messaging interface shown in FIG. 5J is displayed by the electronic device in response to detecting an input by a contact (e.g., contact 5034, FIG. 5I) at a location on the touch-sensitive surface that corresponds to a location of the message region having indicia 5036, which indicates that multiple user in the messaging session have selected acknowledgement options for the same message (or corresponding message region).

Figure 5K:
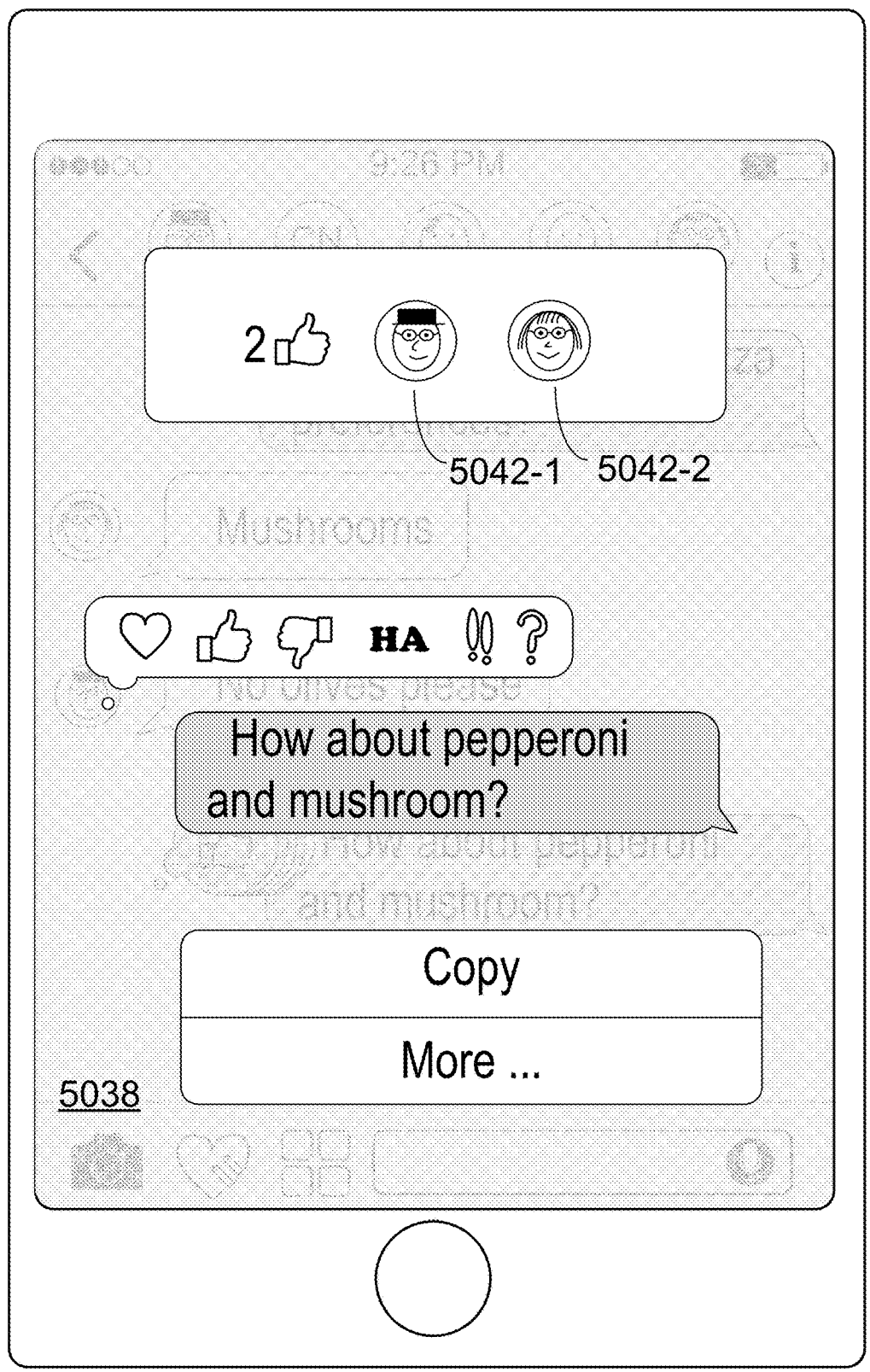

By selecting one of the tallies 5040, a user can see the users who selected any particular acknowledgement option. The electronic device, in response to an input by a contact (e.g., contact 5041, as shown in FIG. 5J) at a location on the touch-sensitive surface that corresponds to the tally 5040 for a particular acknowledgement option for a respective message region, displays icons 5042 (e.g., avatars) that represent users that selected the particular acknowledgement option for the respective message region, as shown in FIG. 5K.

Figure 5L:
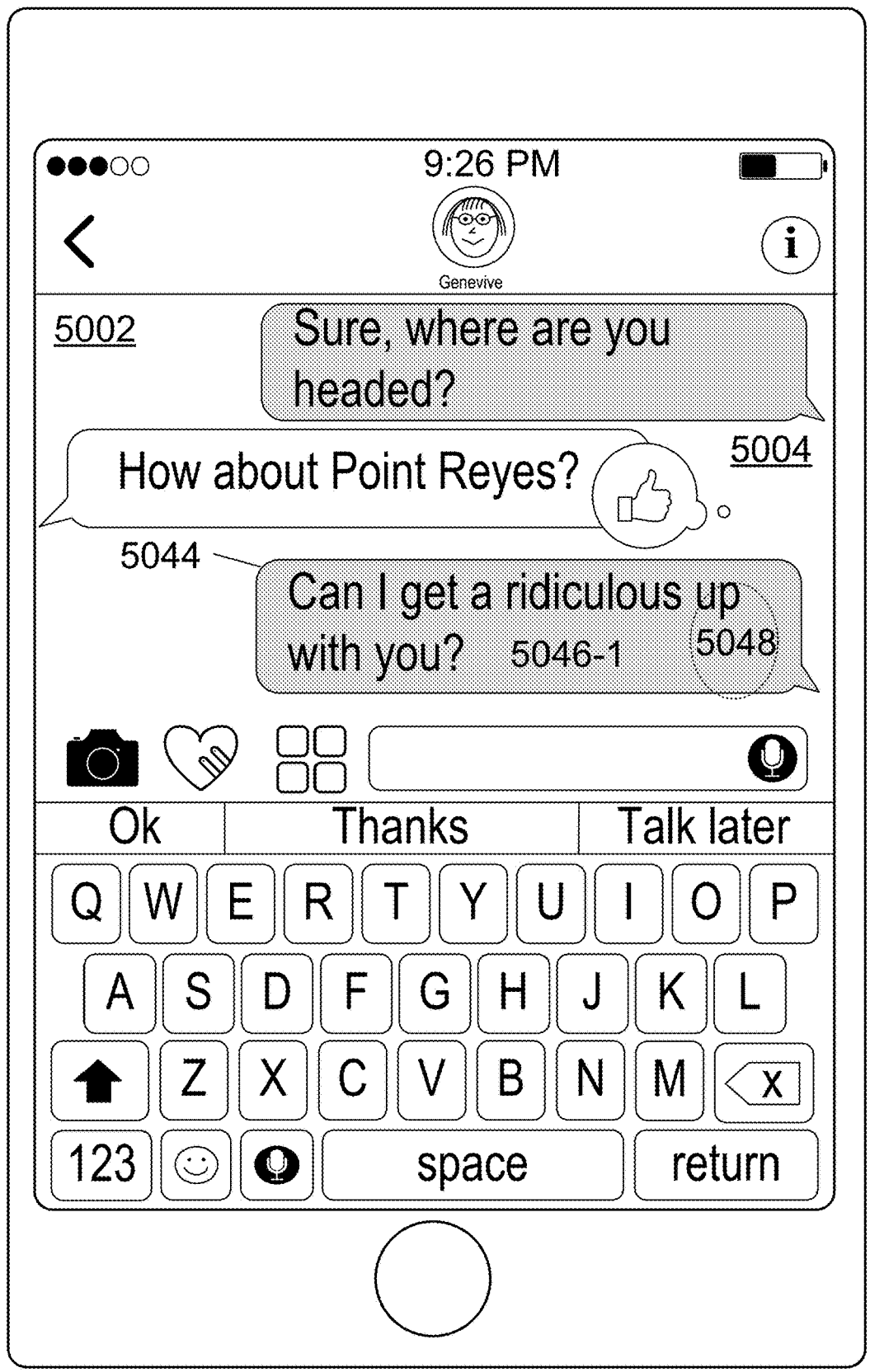
FIGS. 5L-5T illustrate exemplary user interfaces for editing previously sent messages while displaying a message transcript.

FIGS. 5L-5T illustrate exemplary user interfaces for editing previously sent messages while displaying a message transcript. FIG. 5L shows a messaging user interface 5002 of a messaging application on the display of an electronic device. The messaging user interface 5002 includes a conversation transcript 5004 of a messaging session between a user of the electronic device and at least one other user, and a first message region 5044 that includes a first message 5046-1 that was sent from the electronic device of the user to the at least one other user in the messaging session.

Figure 5M:
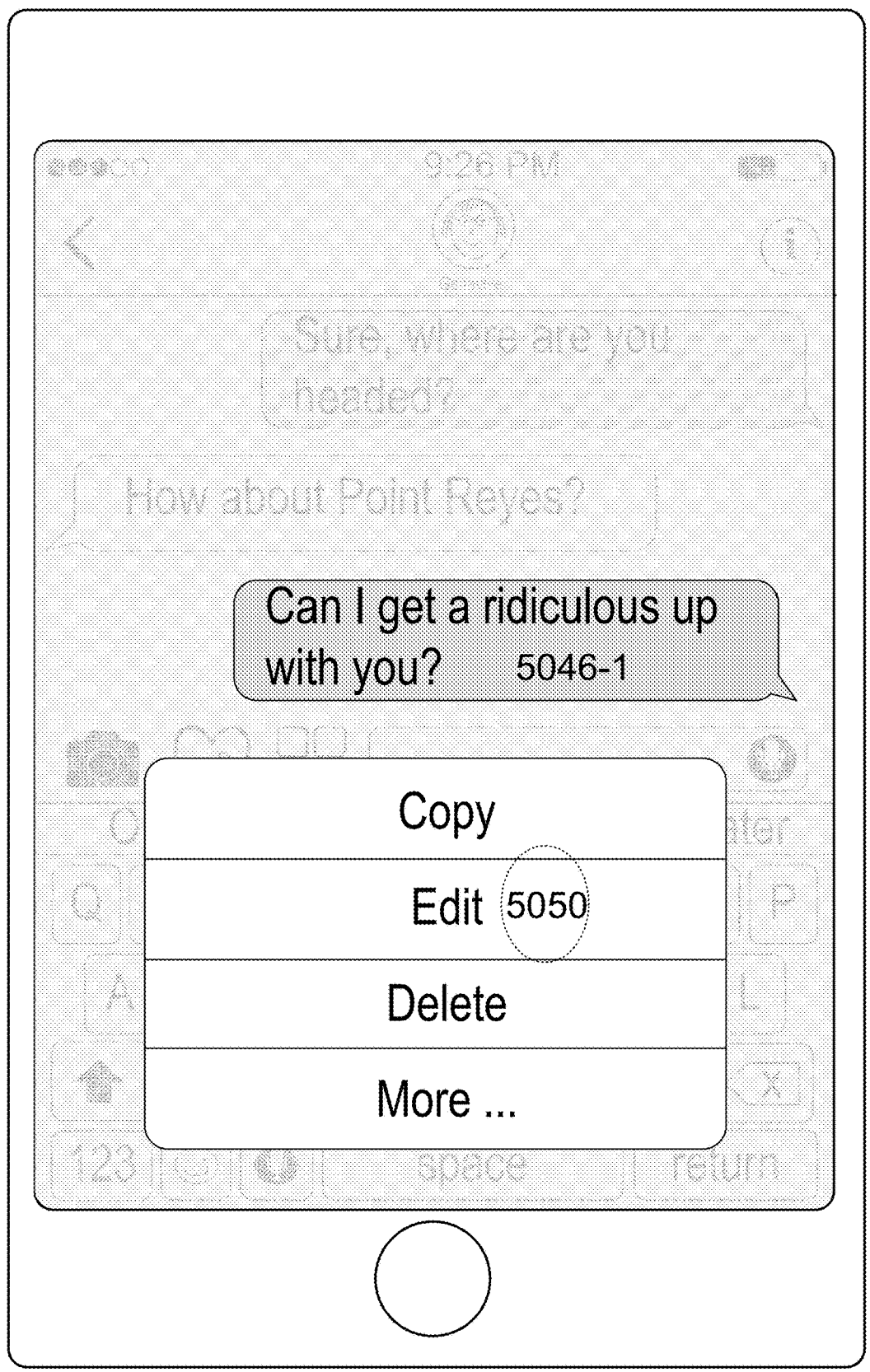
Figure 5N:
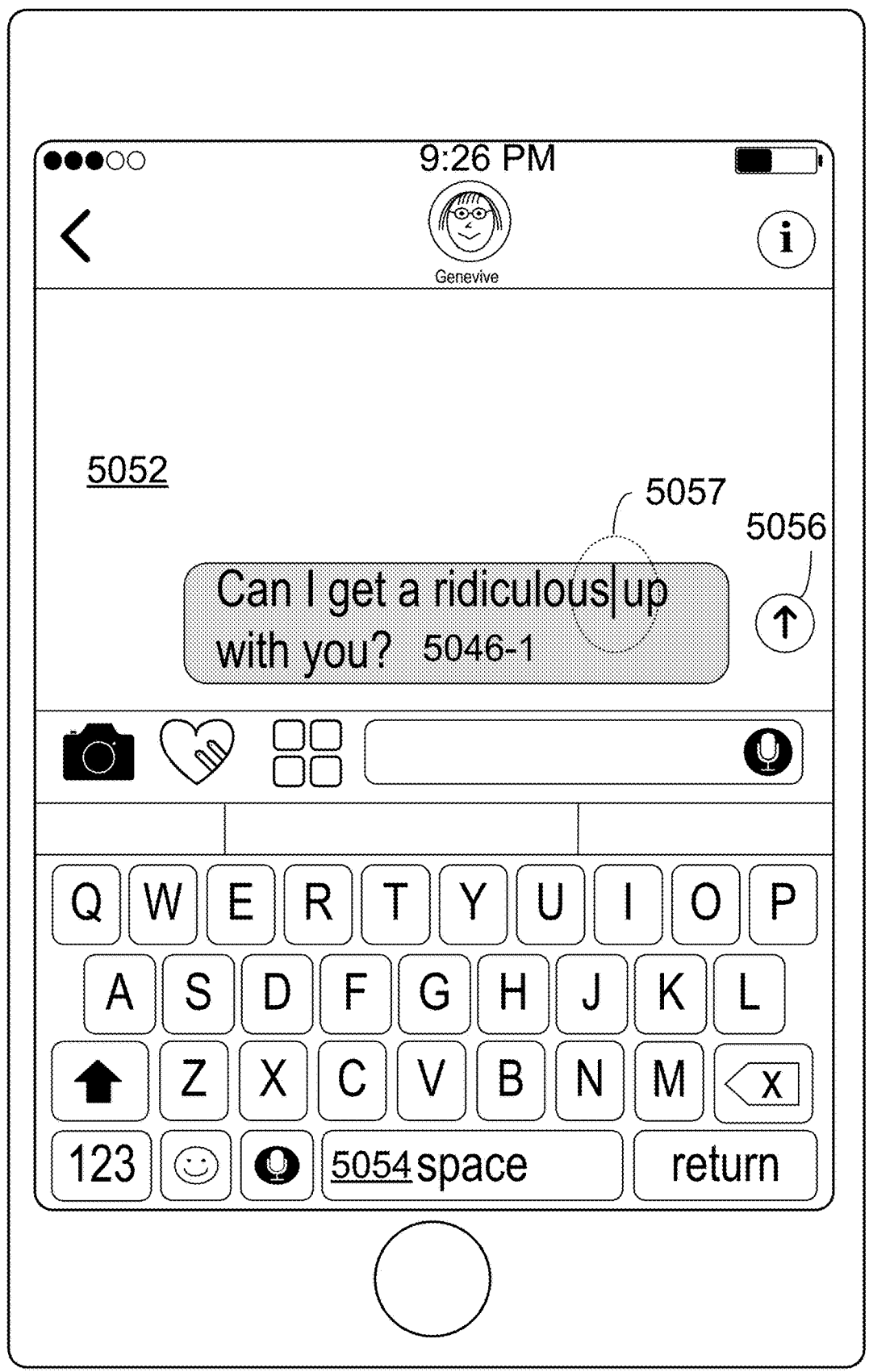

The first message 5046-1 can be edited, despite the fact that it has already been sent. To initiate the editing of the first message, the user selects the first message with a predefined touch input 5048 (e.g., a tap gesture, long press gesture, light press gesture, or deep press gesture) on the first message or the message region for the first message. In some embodiments, the electronic device, in response to detecting the input 5048, displays a menu interface, such as the one shown in FIG. 5M. Alternatively, the electronic device, in response to detecting the input 5048, displays a message editing interface 5022, as shown in FIG. 5N. In some embodiments, a first input gesture (e.g., a tap gesture) on the first message is used to transition to the menu interface (e.g., as shown in FIG. 5M), while a second input gesture (e.g., a deep press) is used to transition to the message editing interface 5052, FIG. 5N. From the menu interface, as shown in FIG. 5M, a user can transition the messaging application to the message editing interface 5022, shown in FIG. 5N, by a touch input 5050 (FIG. 5M) that selects an edit option in the menu interface.

The message editing interface 5052, FIG. 5N, for editing a respective message, such as first message 5046-1, includes a keyboard 5054, and an update affordance 5056. While displaying the message editing interface 5052 for the respective message, the electronic device detects one or more inputs, such as input 5057 shown in FIG. 5N, that revise the respective message, displays a revised version of the message, and detects an input that activates the update affordance (e.g., for sending the updated message to the one or more other electronic devices of the one or more other participants in the messaging session.

Figure 5O:
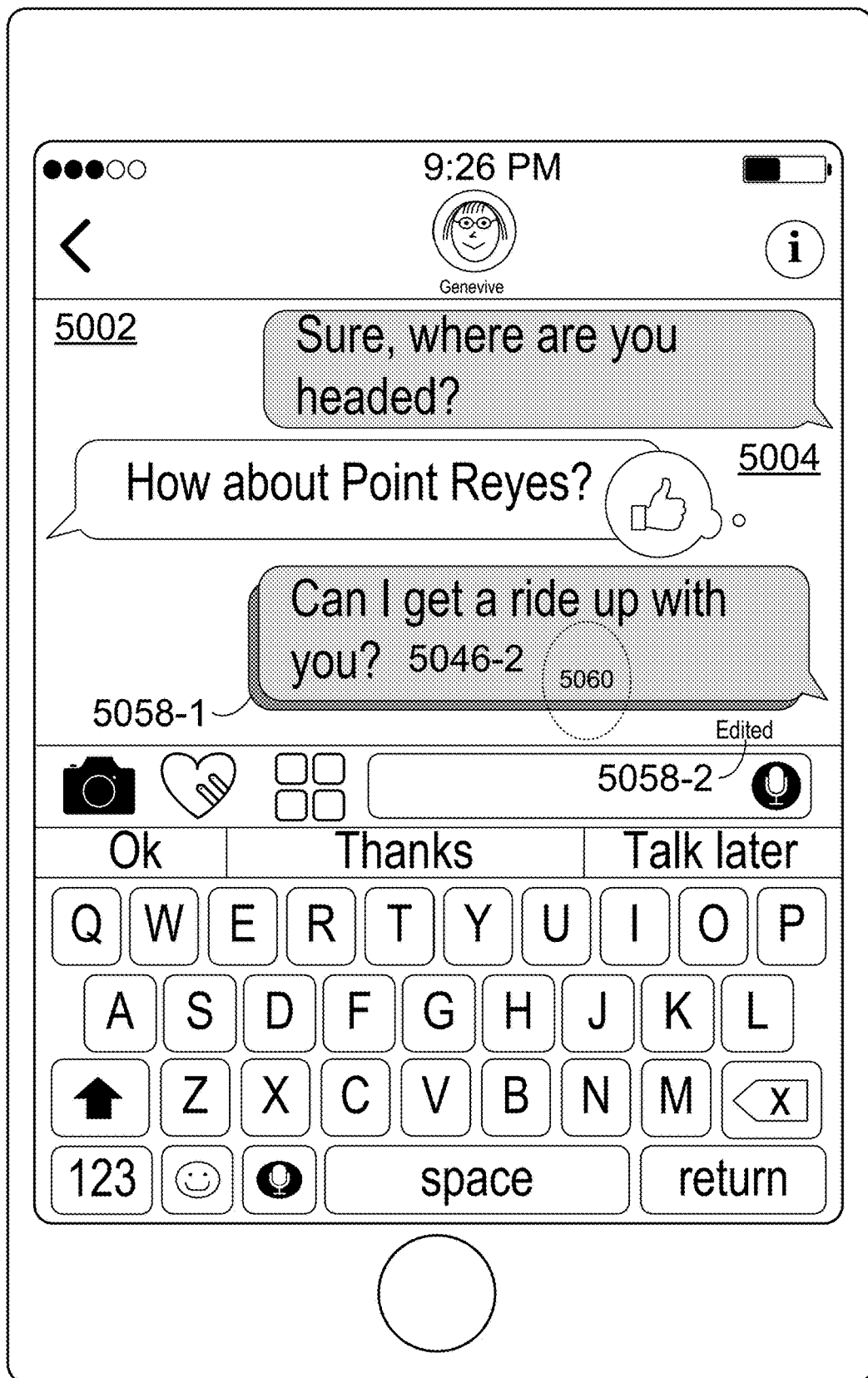

FIG. 5O shows the conversation transcript 5004 after message 5046 has been updated. Because the conversation transcript 5004 includes an edited message, the edited message includes one or more indications 5058 that a particular message was revised after the original version of the message was sent to the other participant(s) in the messaging session. In FIG. 5O, there are two such indications of revision: indication 5058-1 is a shadow region behind the message region; indication 5058-2 is text (e.g., "Edited") displayed below the message region that contains the revised version of the message.

An edited or revised message can be edited yet again. The electronic device, in response to an input (e.g., input 5060, FIG. 5O) that corresponds to a request to edit the revised version 5046-2) of a message, displays a message editing interface for the revised version of the message, as shown in FIG. 5R. The message editing interface, as shown in FIG. 5R, includes the message 5046-2 to be edited, a keyboard, and an update affordance (which is optionally not shown until at least one revision has been made to the message).

A participant in the messaging session can request to see all version, or two or more versions, of an edited message. For example, in response to a predefined input 5060, FIG. 5O, on an edited message, the electronic device displays the user interface shown in FIG. 5P, in which display of the conversation transcript is suppressed except for the revised version of the first message 5046-2, and a menu 5062 or list of editing options. In this example, the displayed menu 5062 includes a copy affordance 5064 (for copying the message selected by input 5060), a show edits affordance 5066 (for showing edits to the message selected by input 5060), a delete affordance 5068 (for deleting the message selected by input 5060, or alternatively for undoing all edits made to the message selected by input 5060), and a display more options affordance 5070. In the example shown in FIG. 5P, input 5072 (e.g., a tap gesture) is detected at the location on the touch-sensitive surface that corresponds to the location of the "show edits" affordance 5066, which when activated, displays a user interface 5074 (FIG. 5Q) that includes current version 5046-1 of the first message as well as a prior version 5046-2, as shown in FIG. 5Q. A further input, 5076 or 5078, in the user interface of FIG. 5Q, selects a version of the message to edit. For example, the selected version is highlighted, and then a touch input on Edit (5080) would initiate editing of the selected version of the message. Alternatively, a touch input on Done (5082) terminates the editing of the selected version of the message.

Figure 5P:
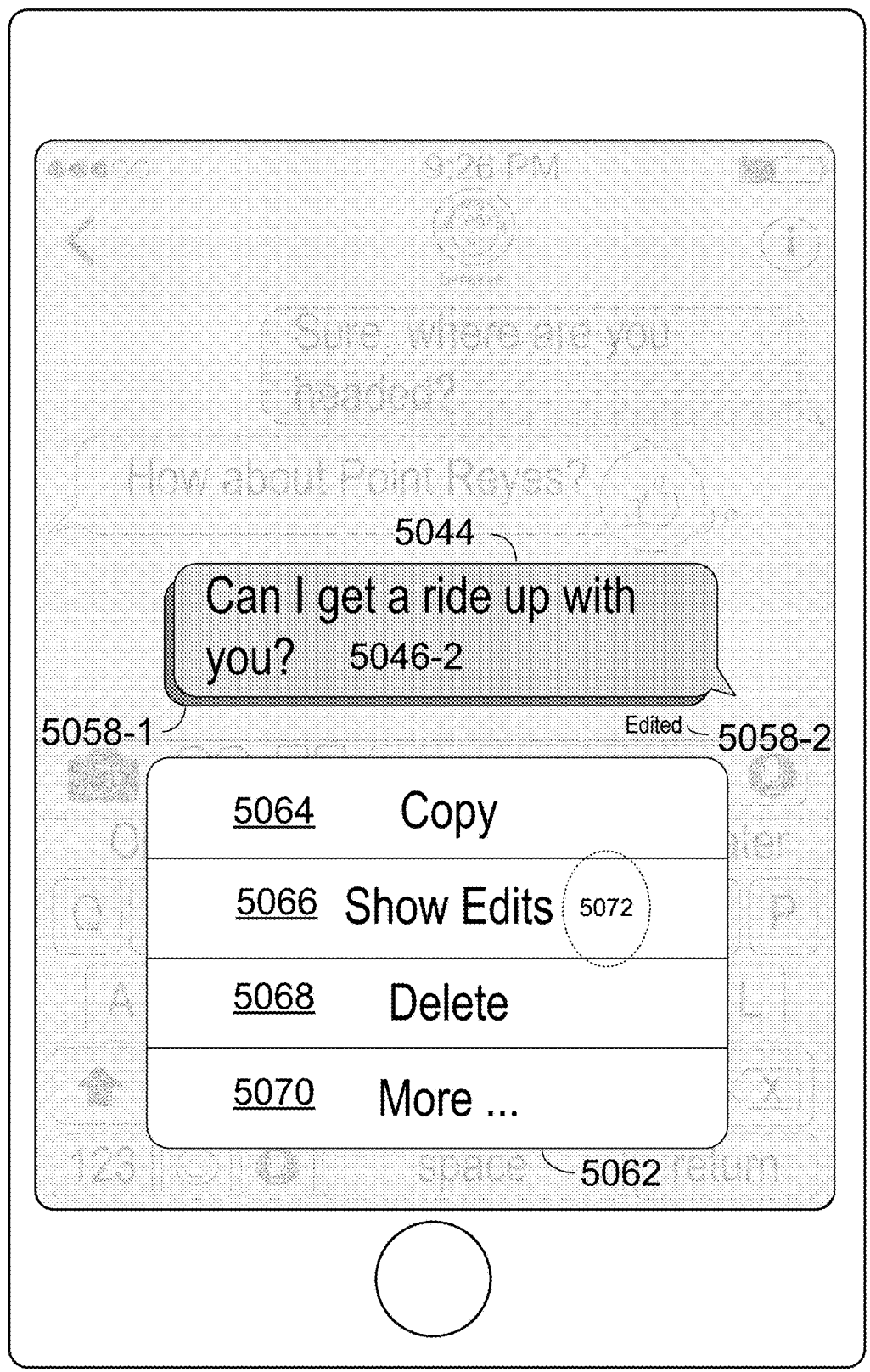
Figure 5Q:
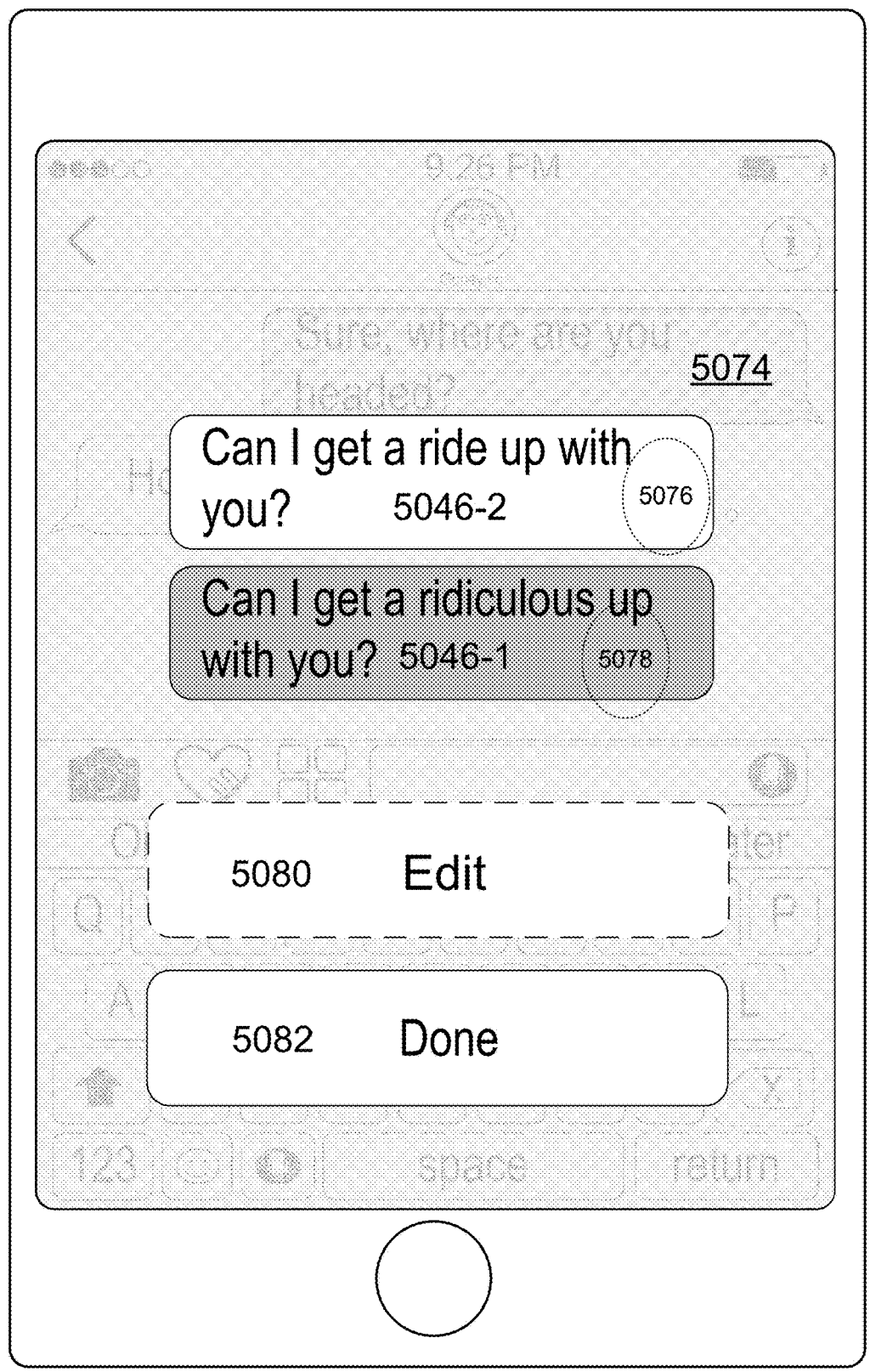
Figure 5R:
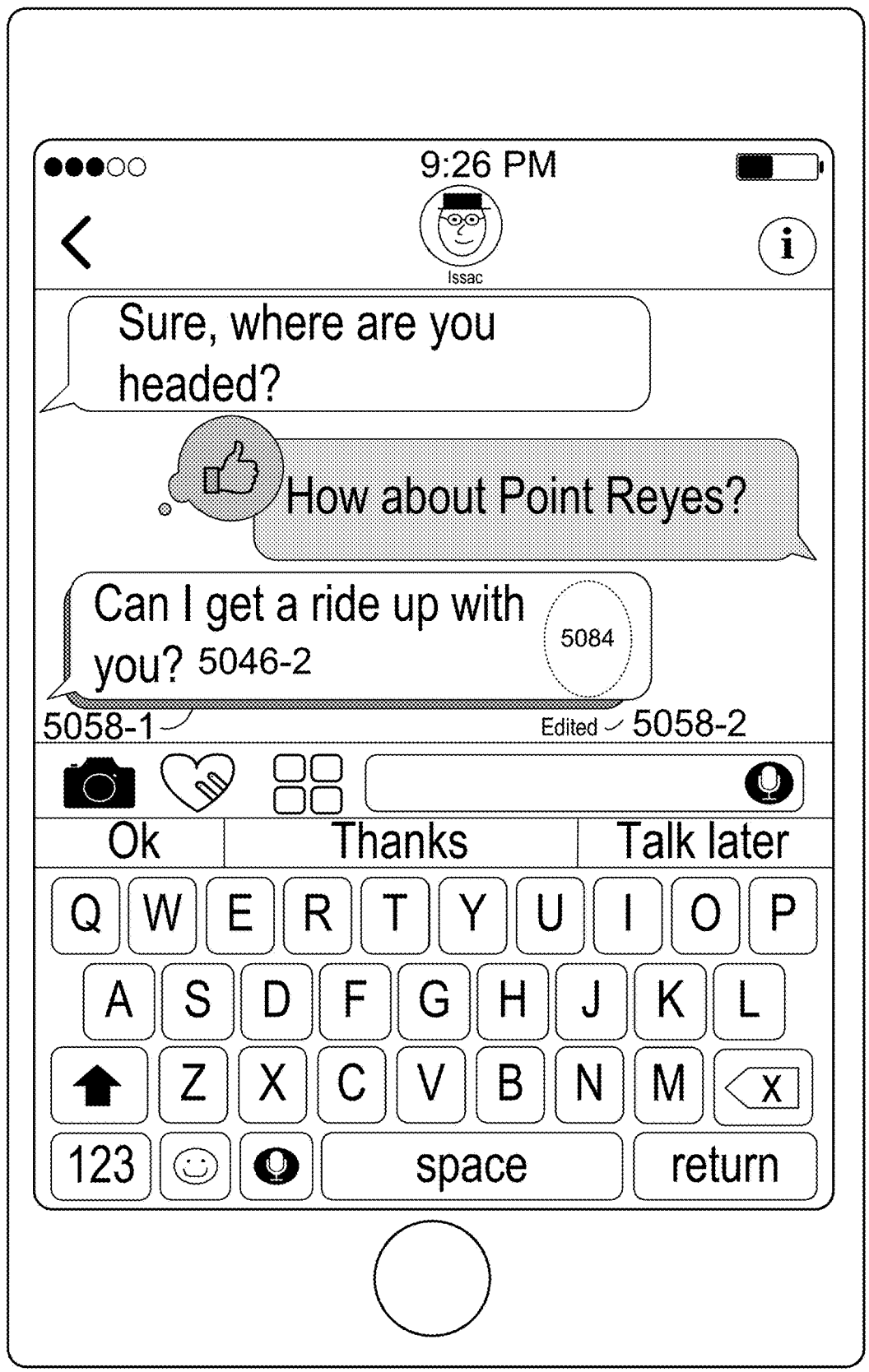
Figure 5S:
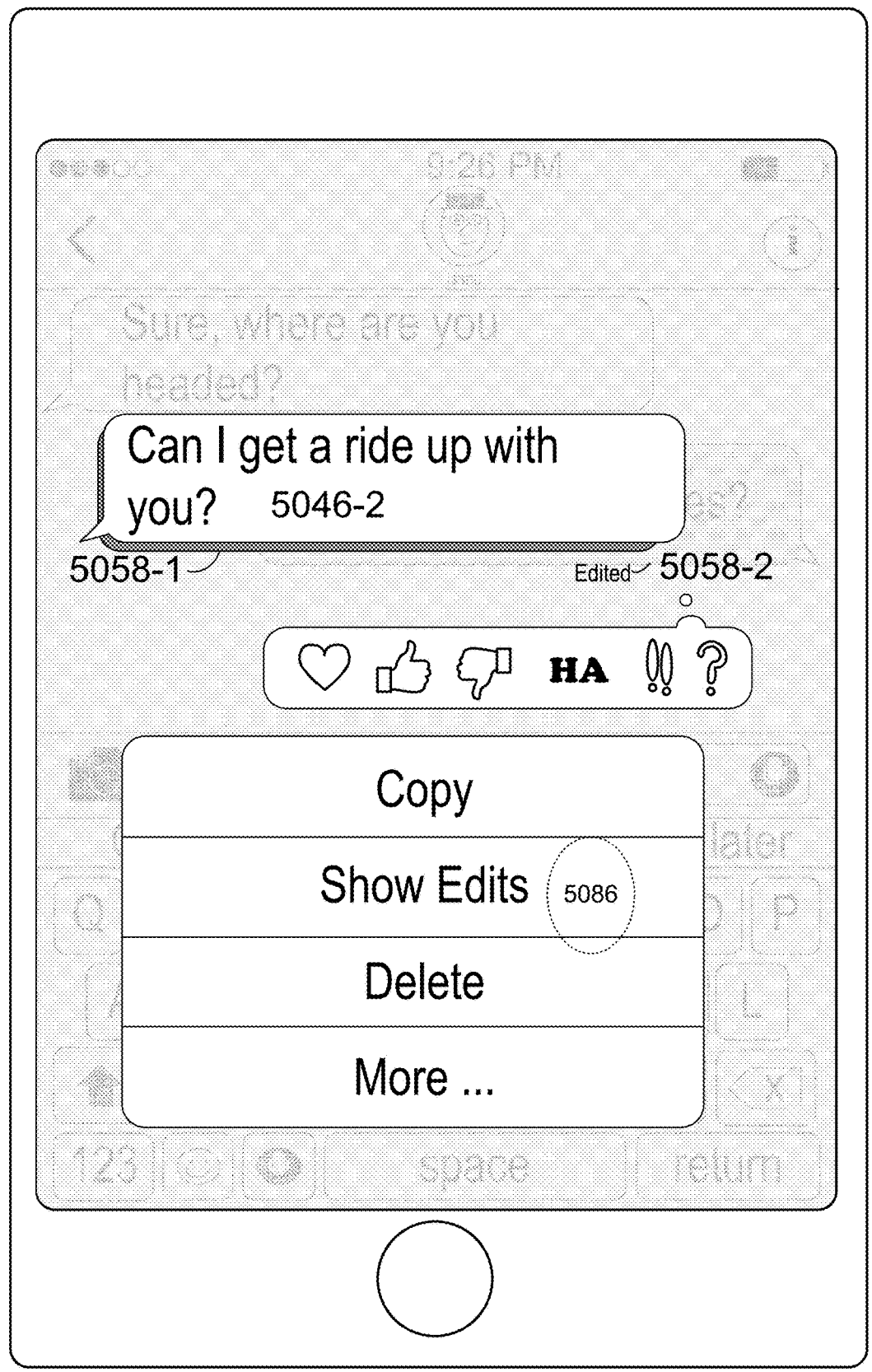
Figure 5T:
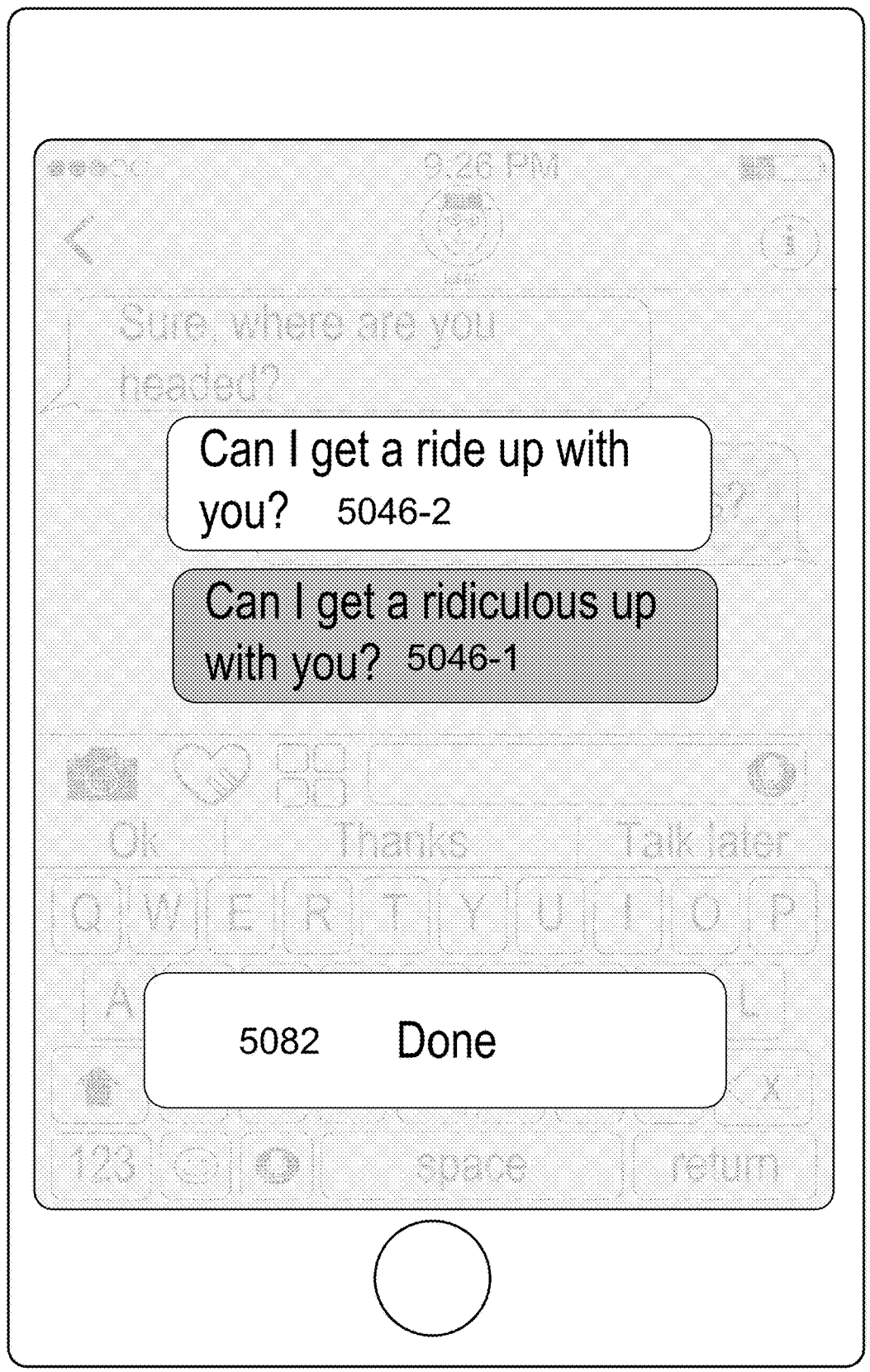

An alternative to the edit menu interface shown in FIG. 5P is the edit menu interface shown in FIG. 5S, which includes the selected message (selected in response to input 5060, FIG. 5O), and a menu that includes an affordance (e.g., a "show edits" option, 5086), which when activated results in display of the user interface shown in FIG. 5T, which includes the current version 5046-2 of the selected message and one or more prior versions of the selected message (e.g., version 5046-1).

Integrated Messaging

Figure 6A:
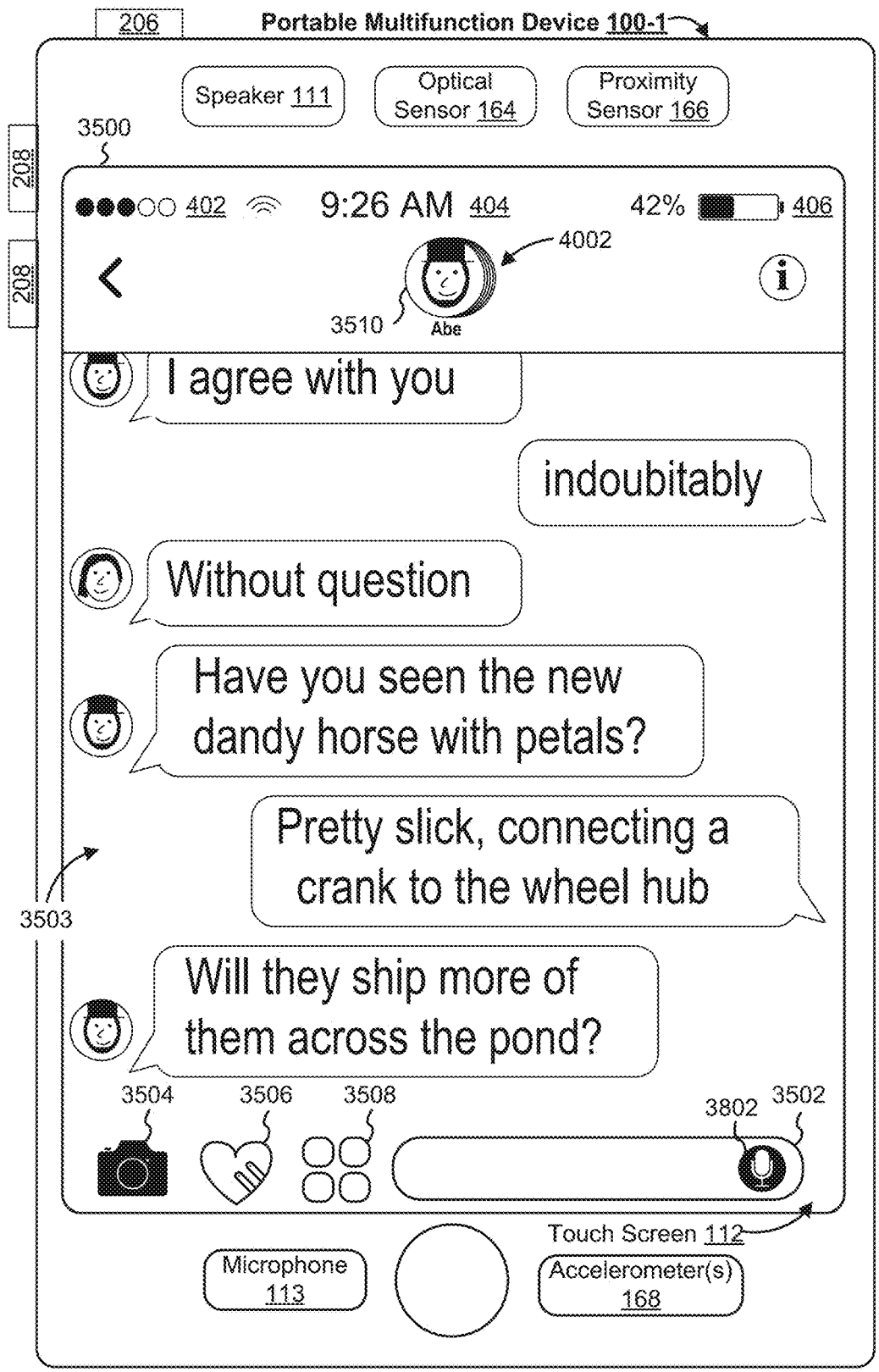
FIGS. 6A-6W illustrate exemplary user interfaces for interacting with other users of a messaging transcript through an avatar in accordance with some embodiments.
Figure 6B:
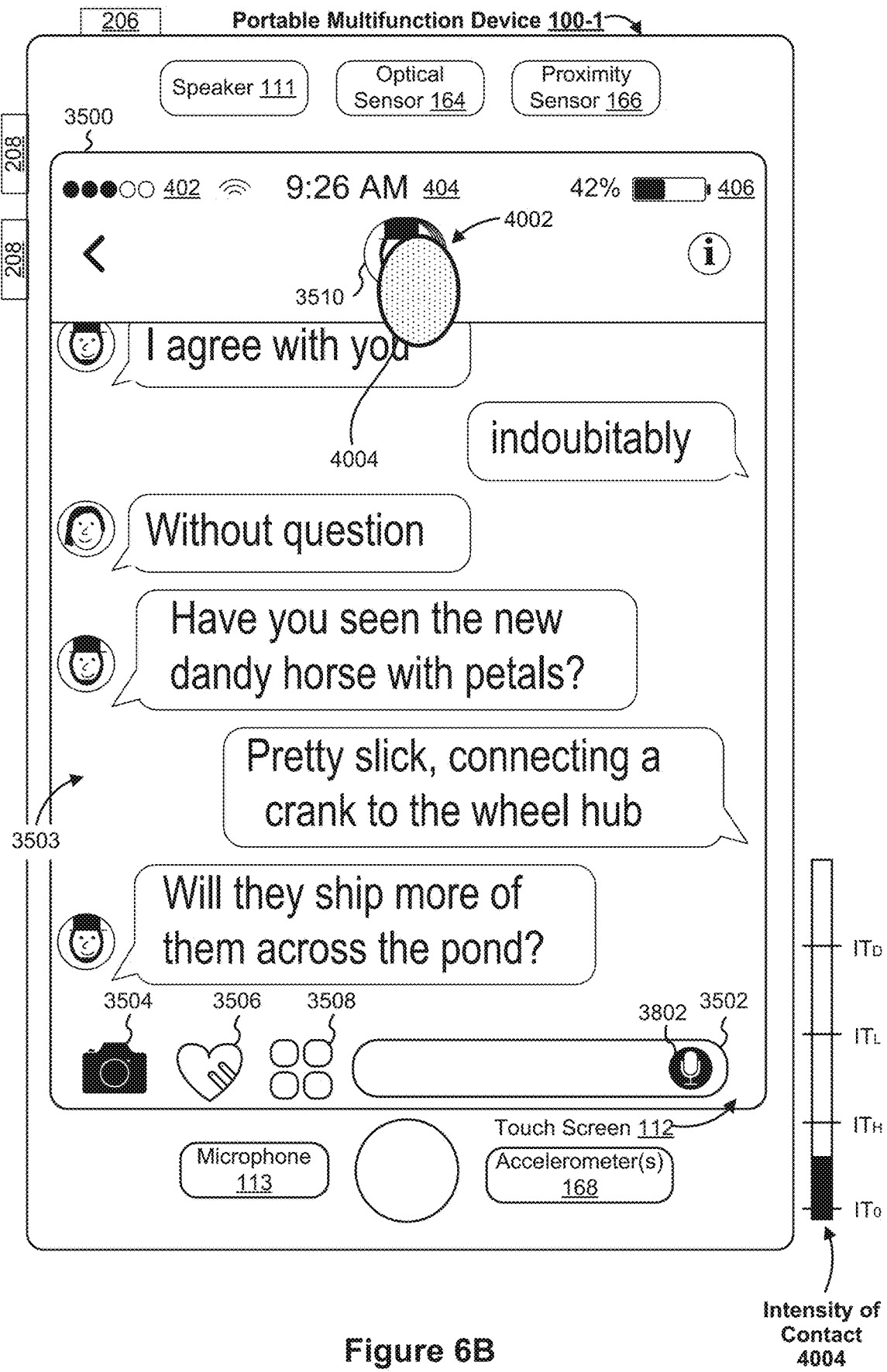
Figure 6C:
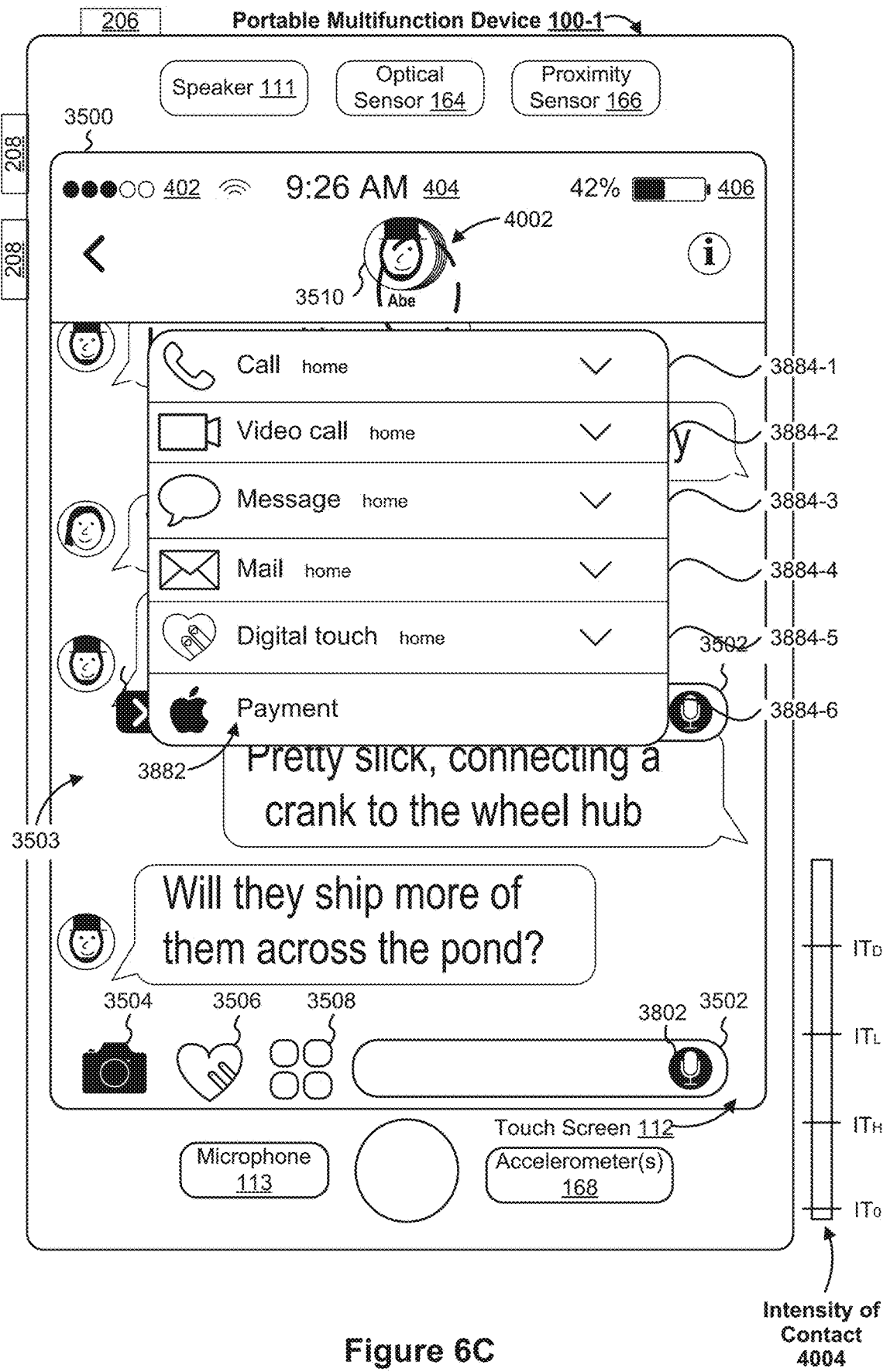
Figure 6D:
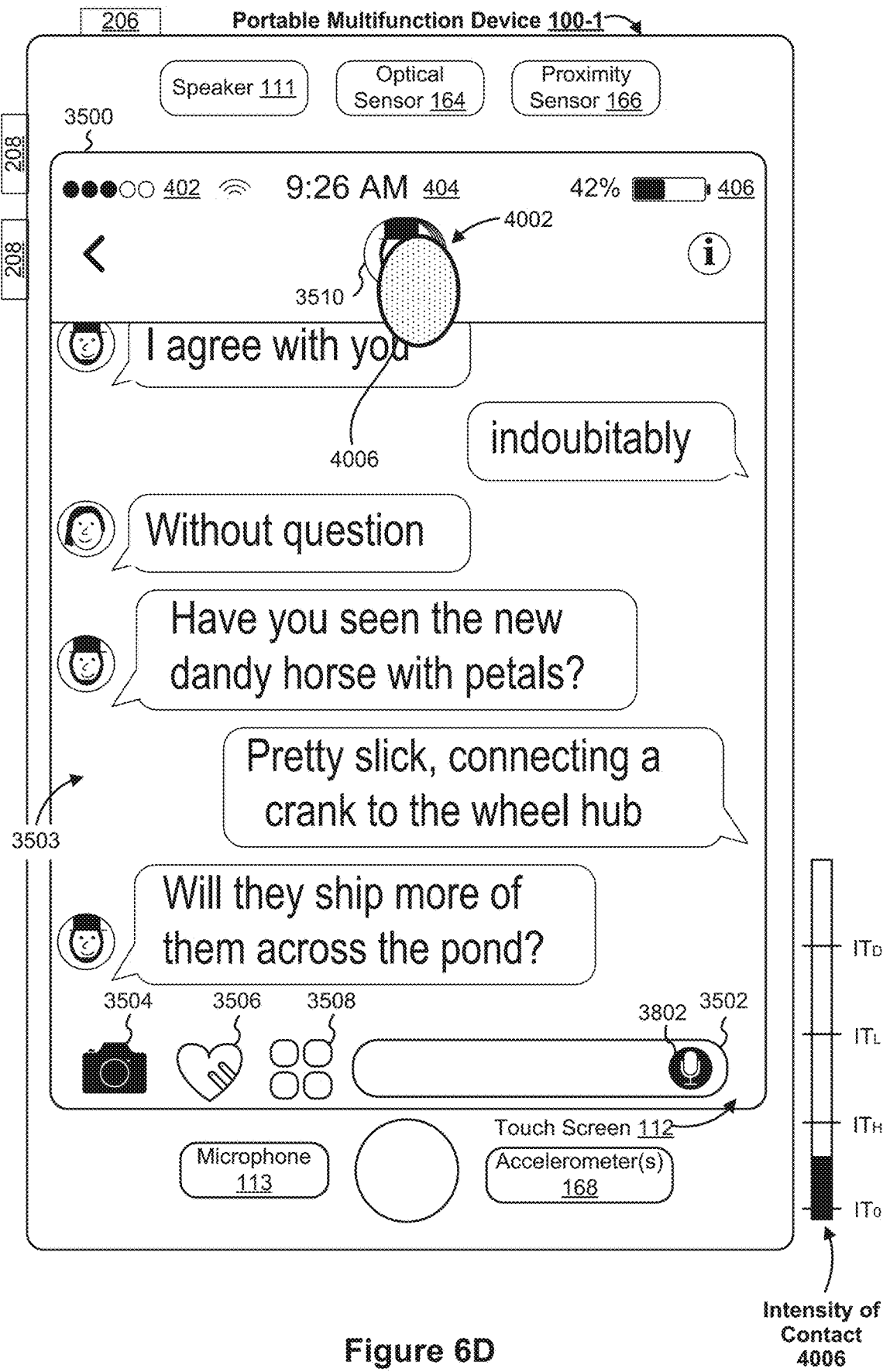
Figure 6E:
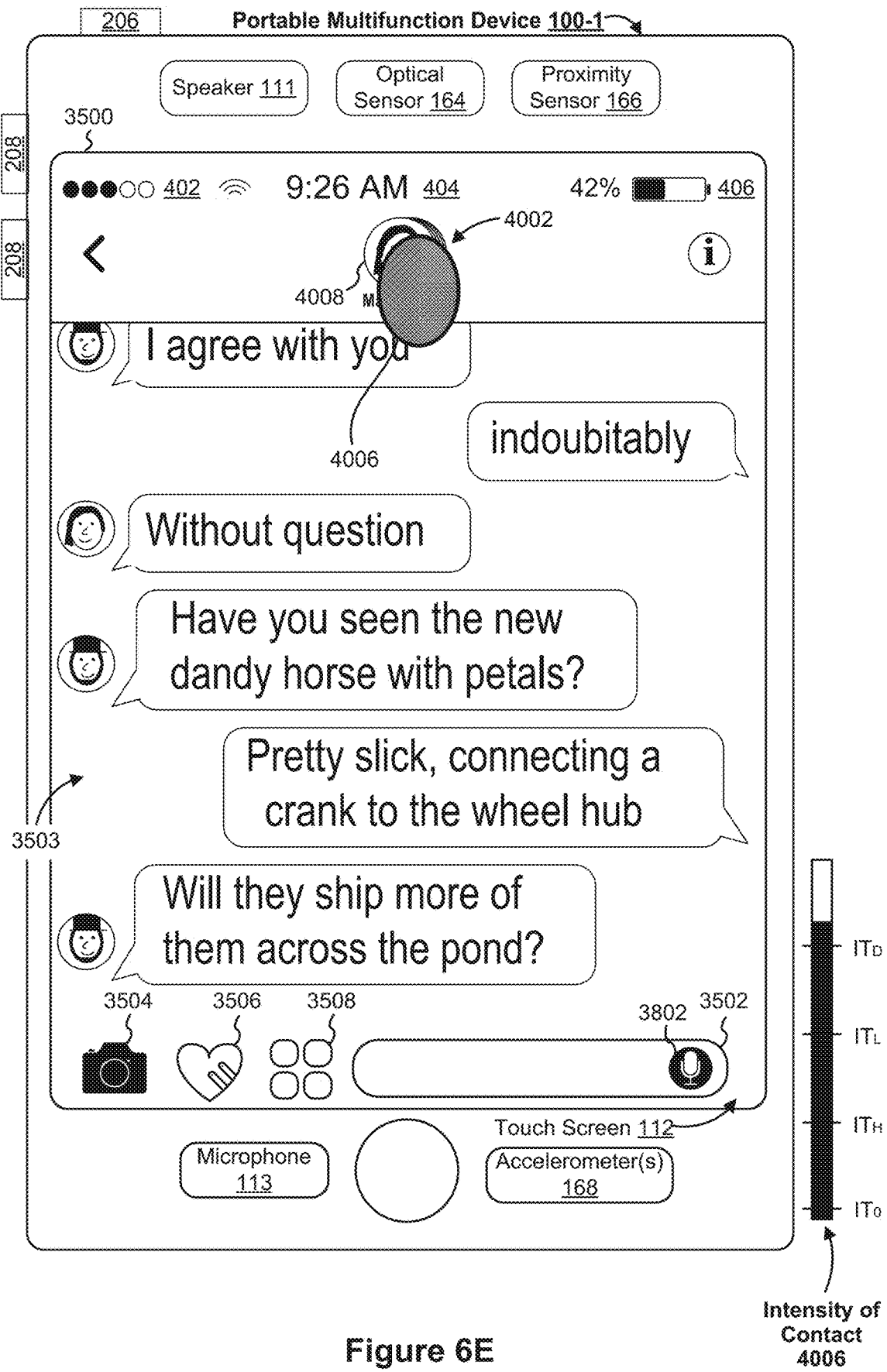
Figure 6F:
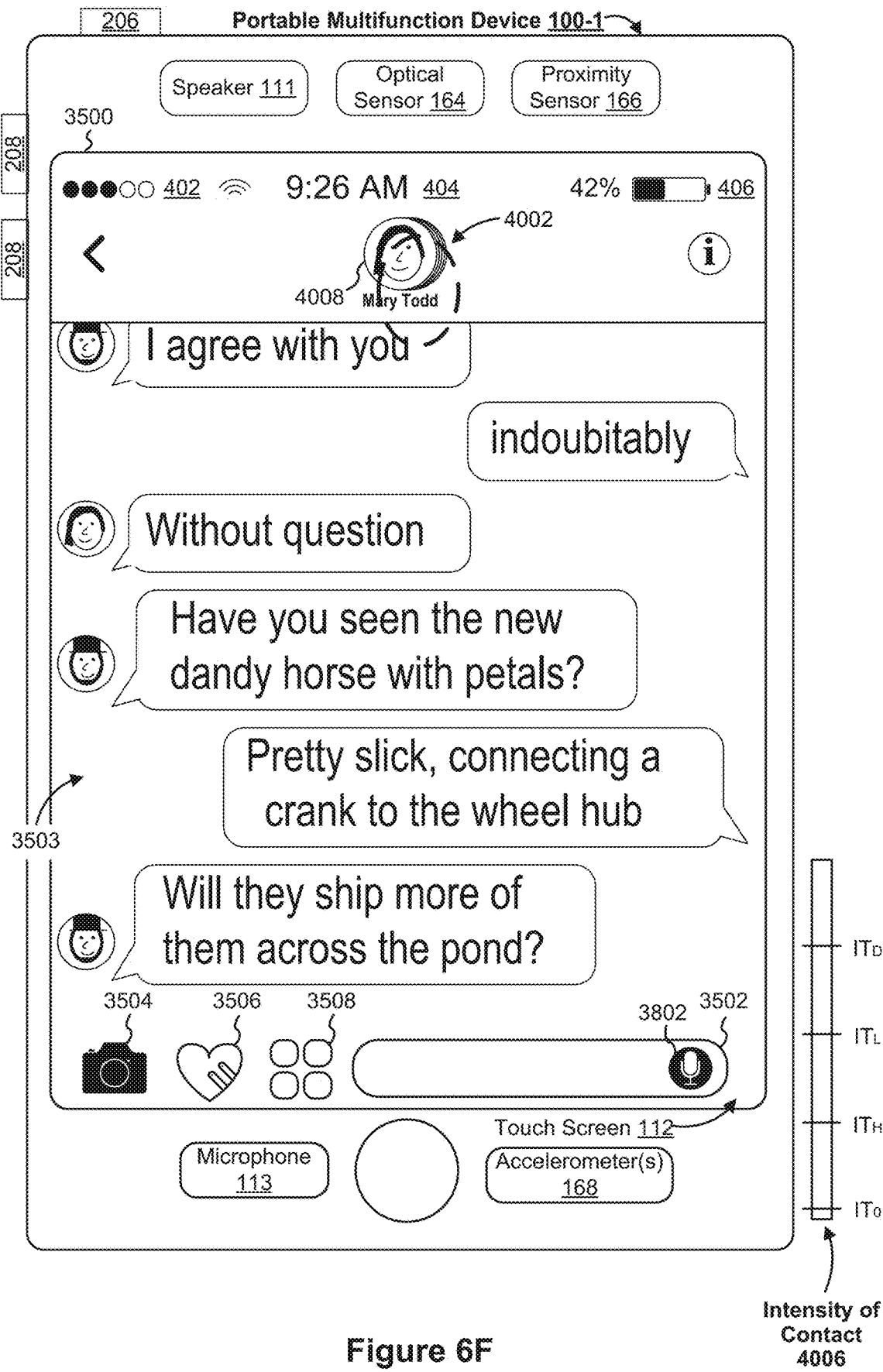
Figure 6G:
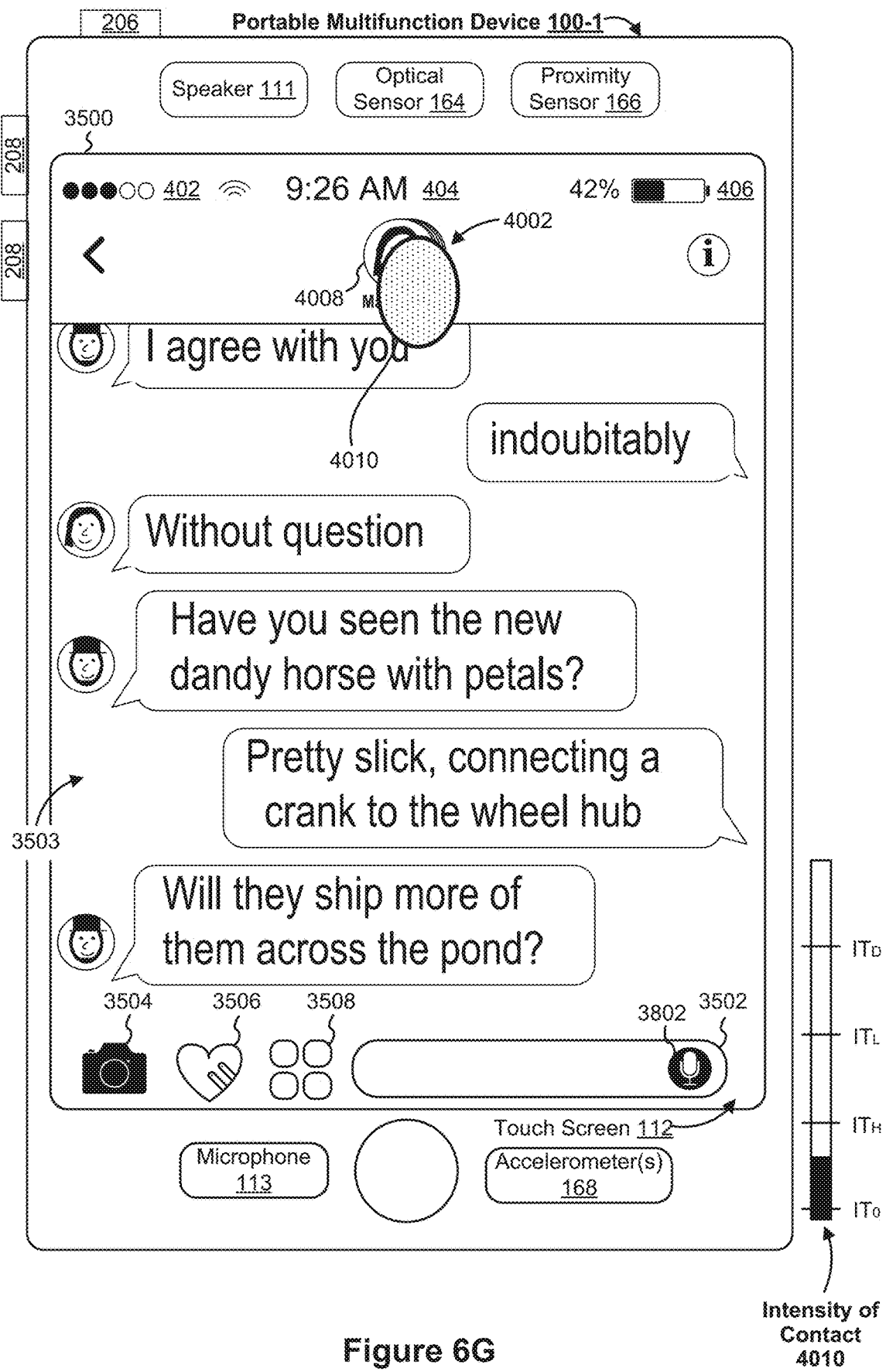
Figure 6H:
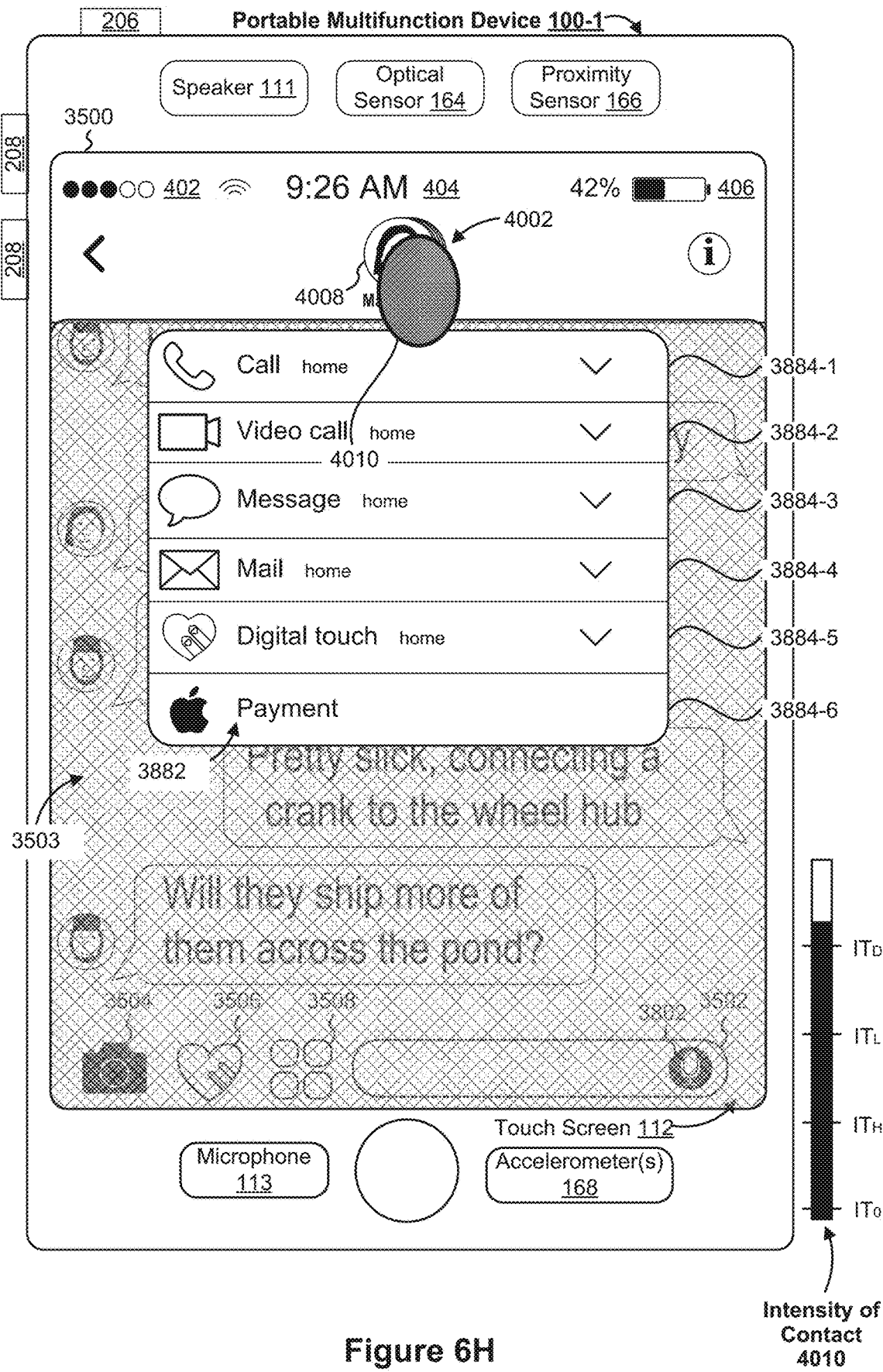
Figure 6I:
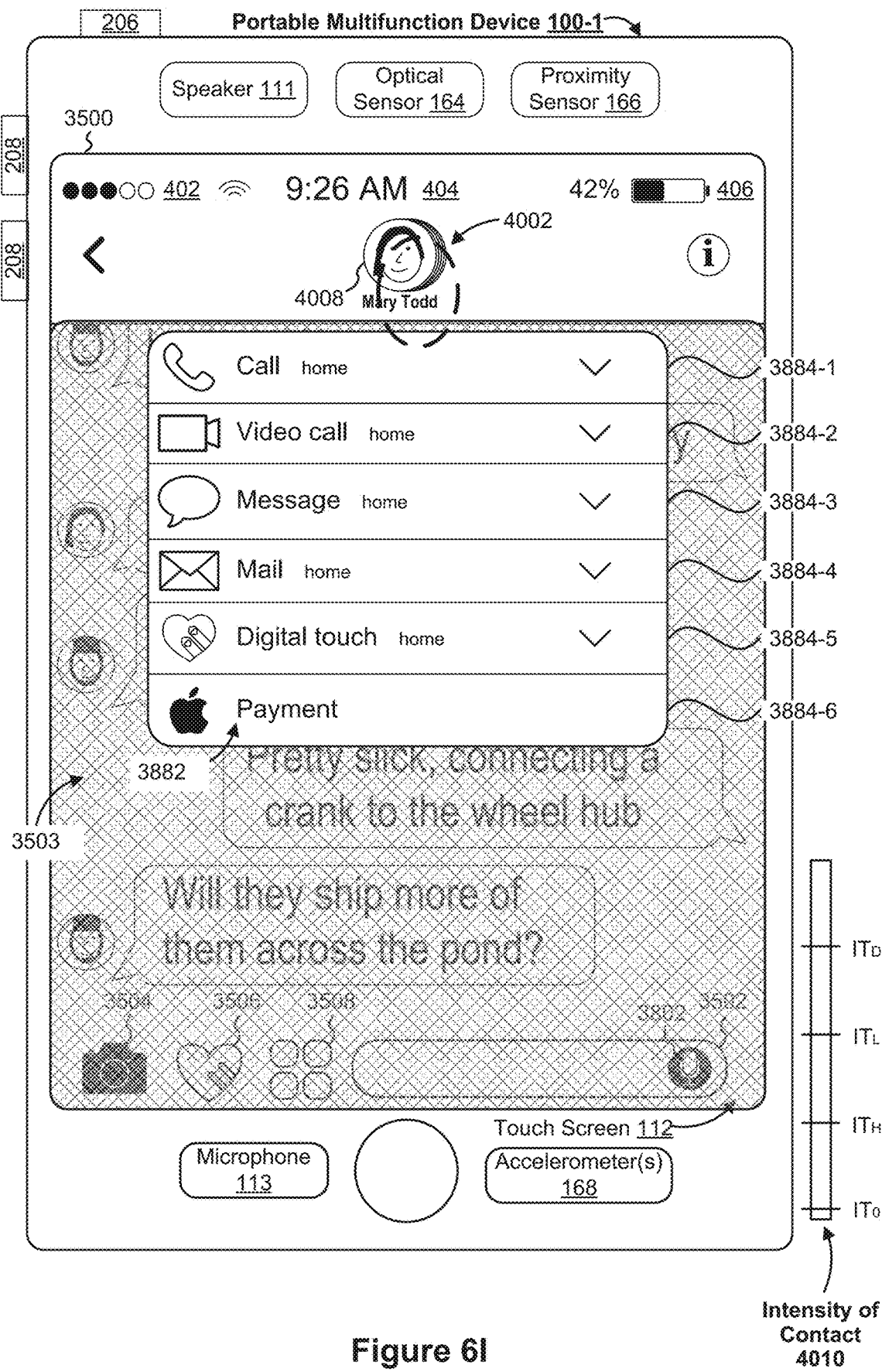
Figure 6J:
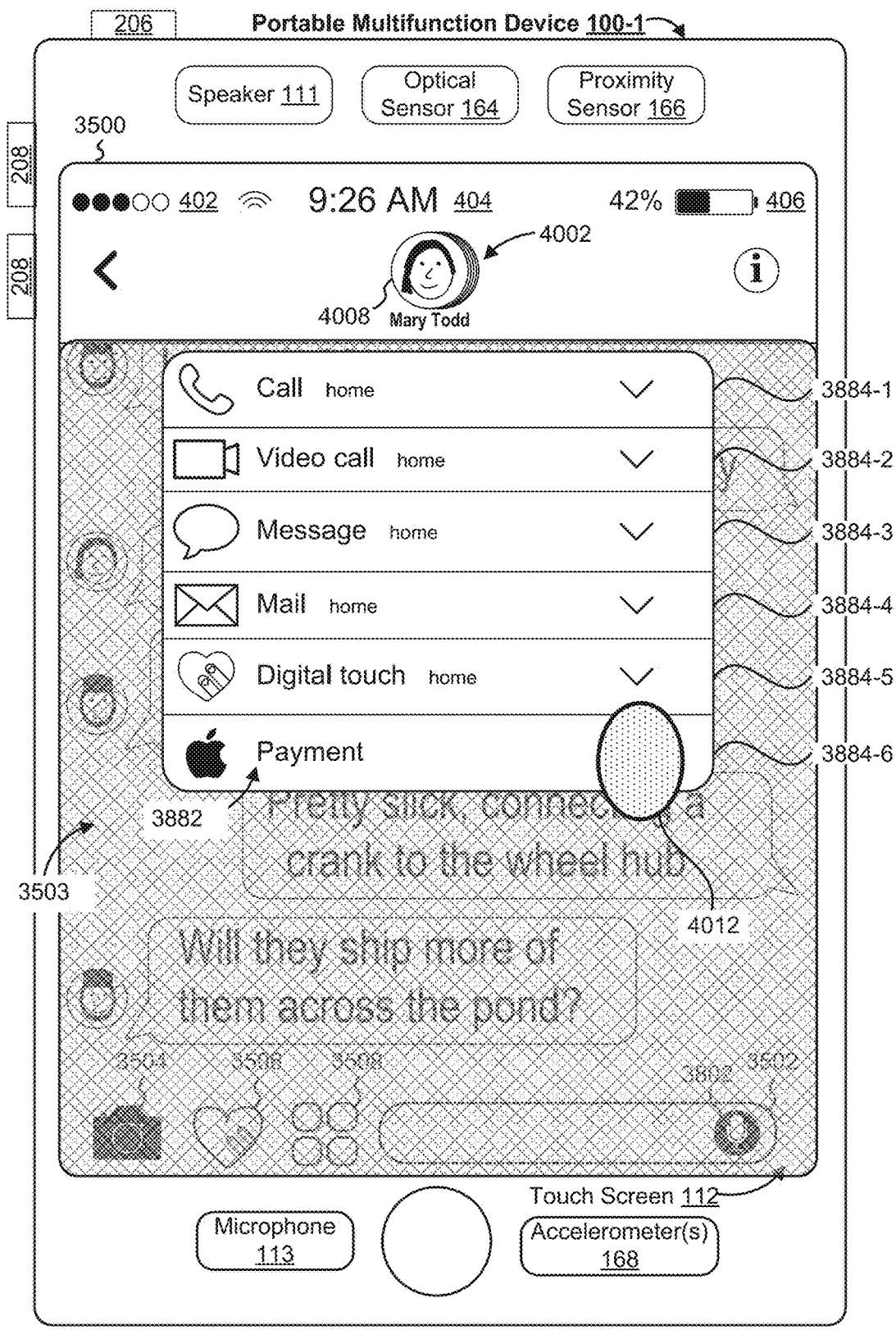
Figure 6K:
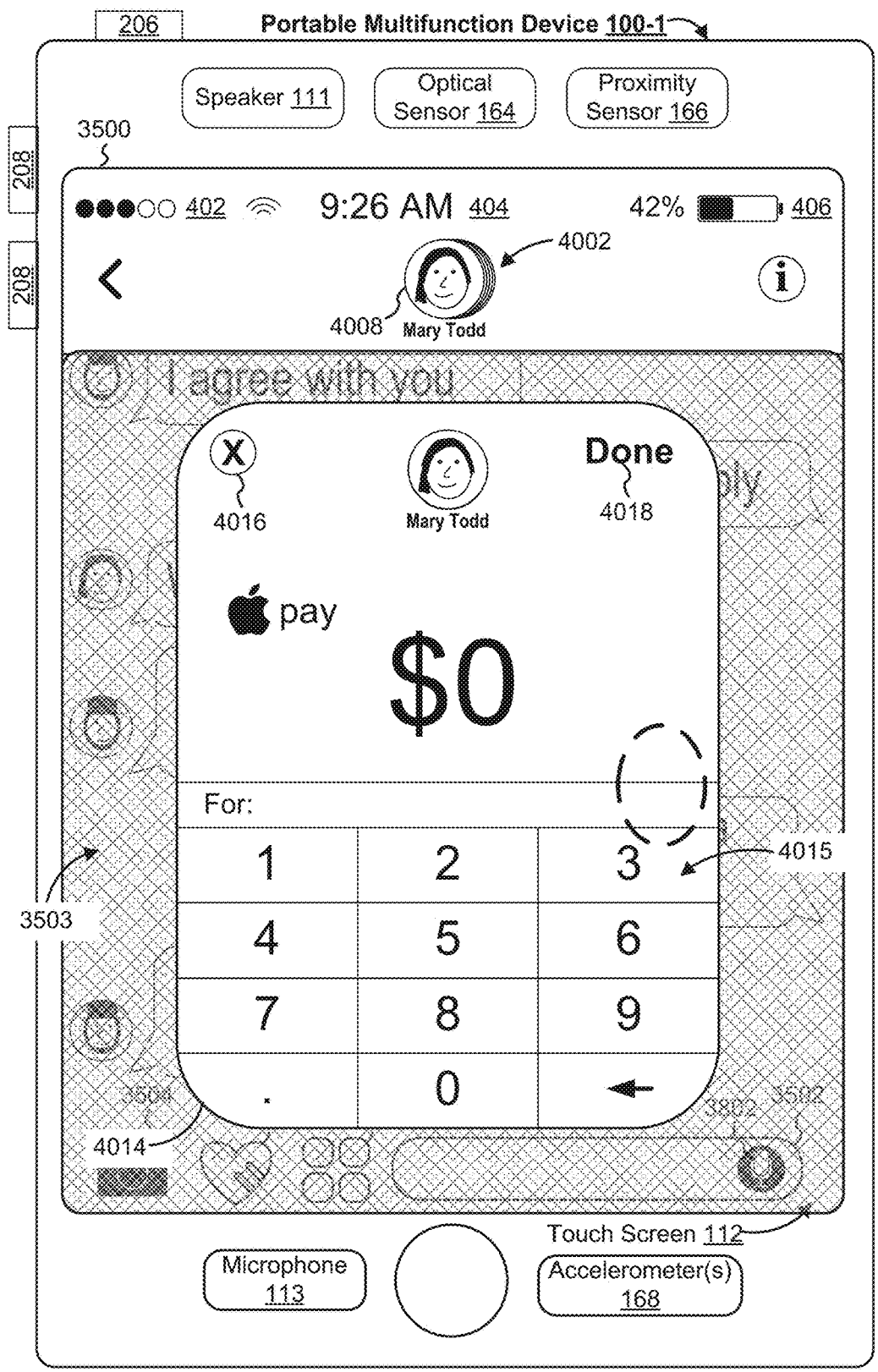
Figure 6L:
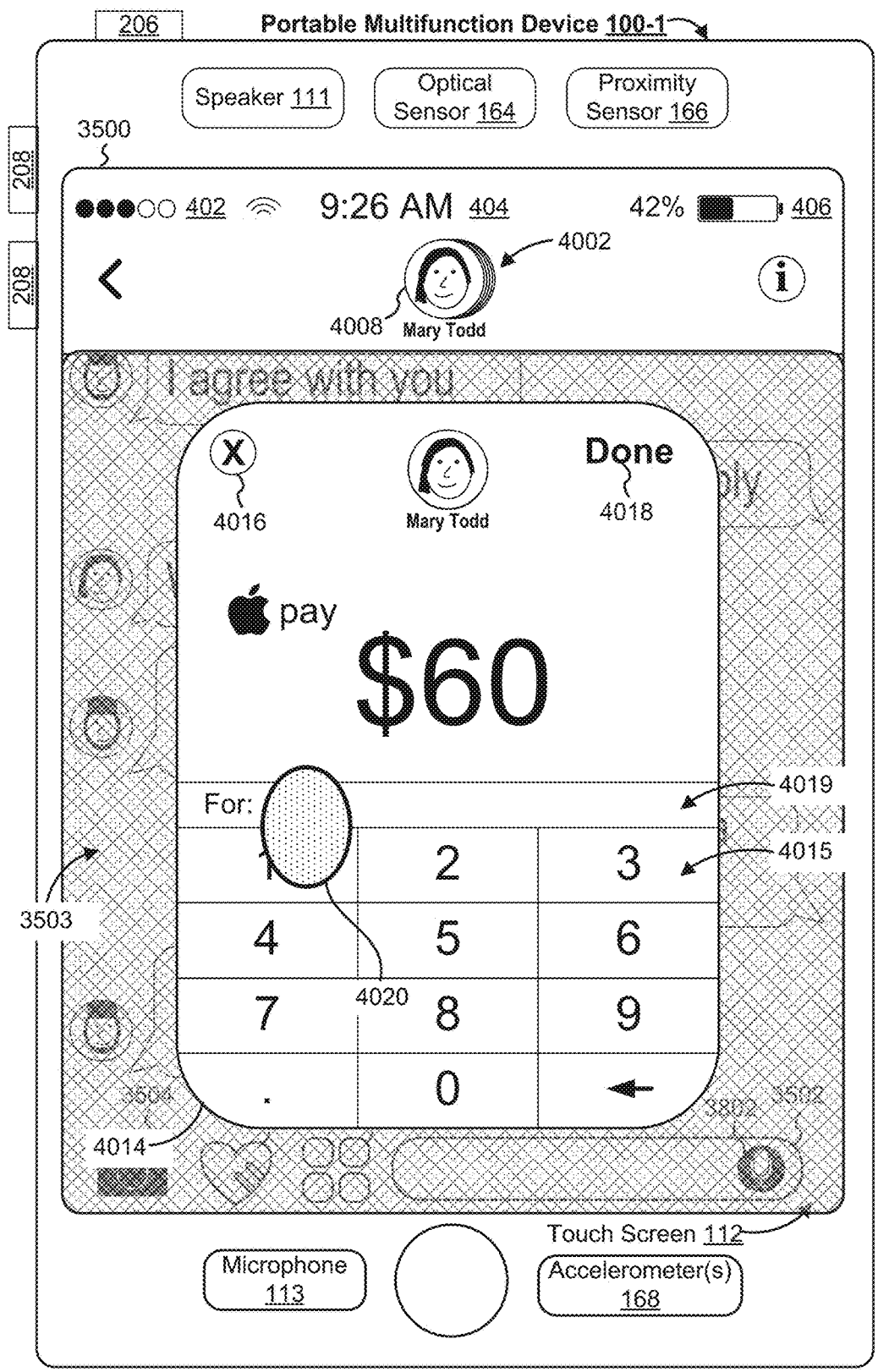
Figure 6M:
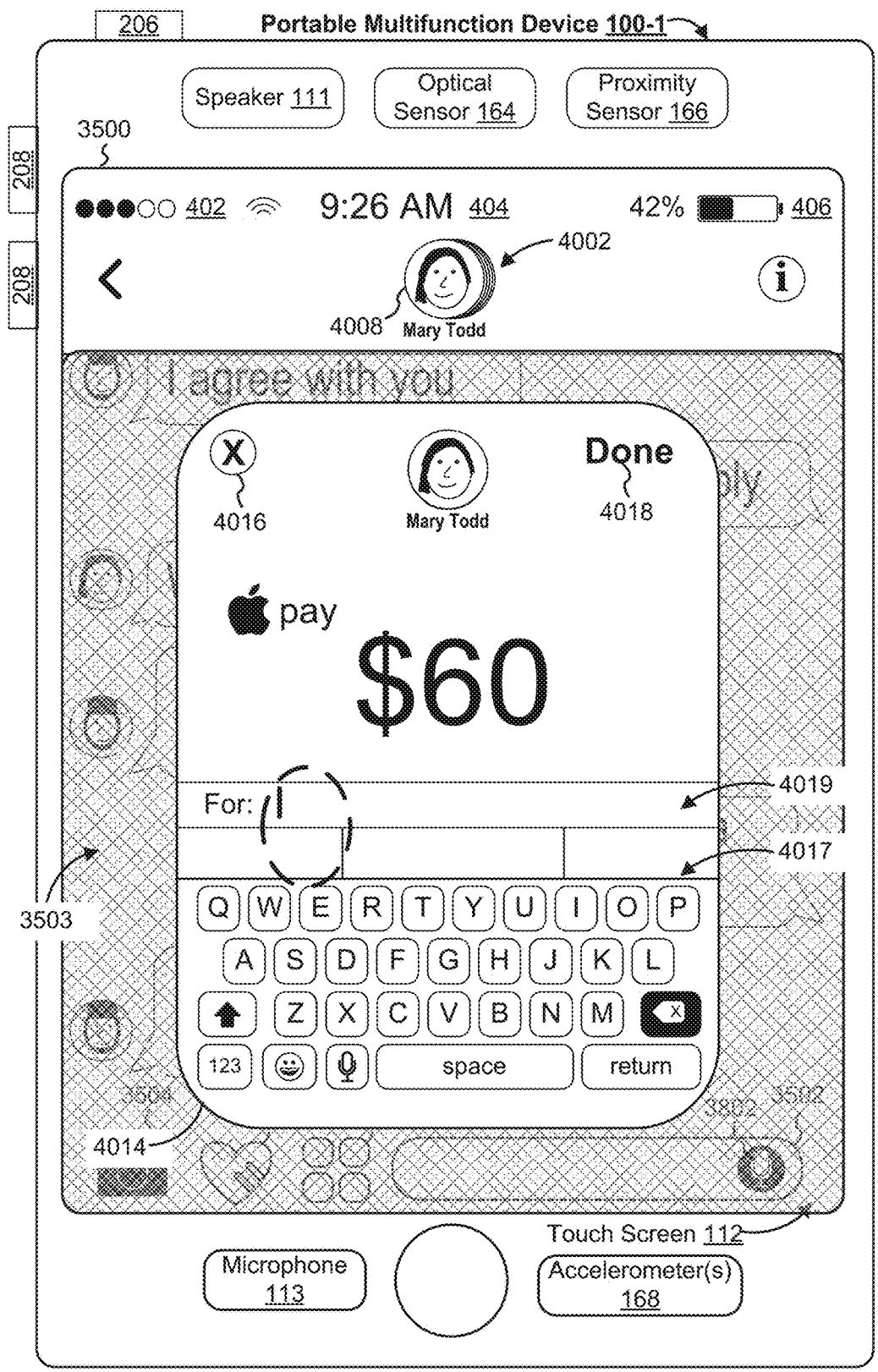
Figure 6N:
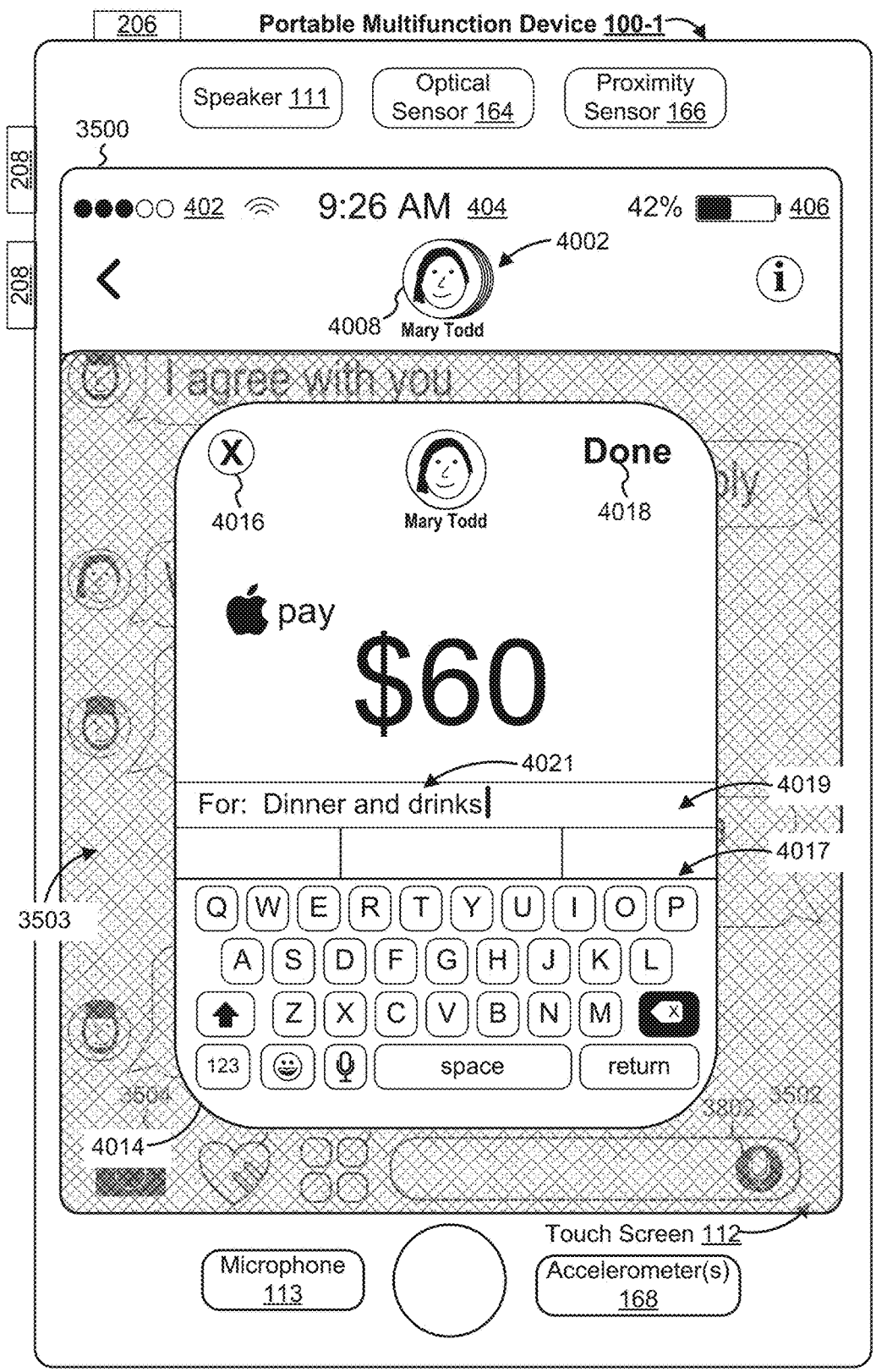
Figure 6O:
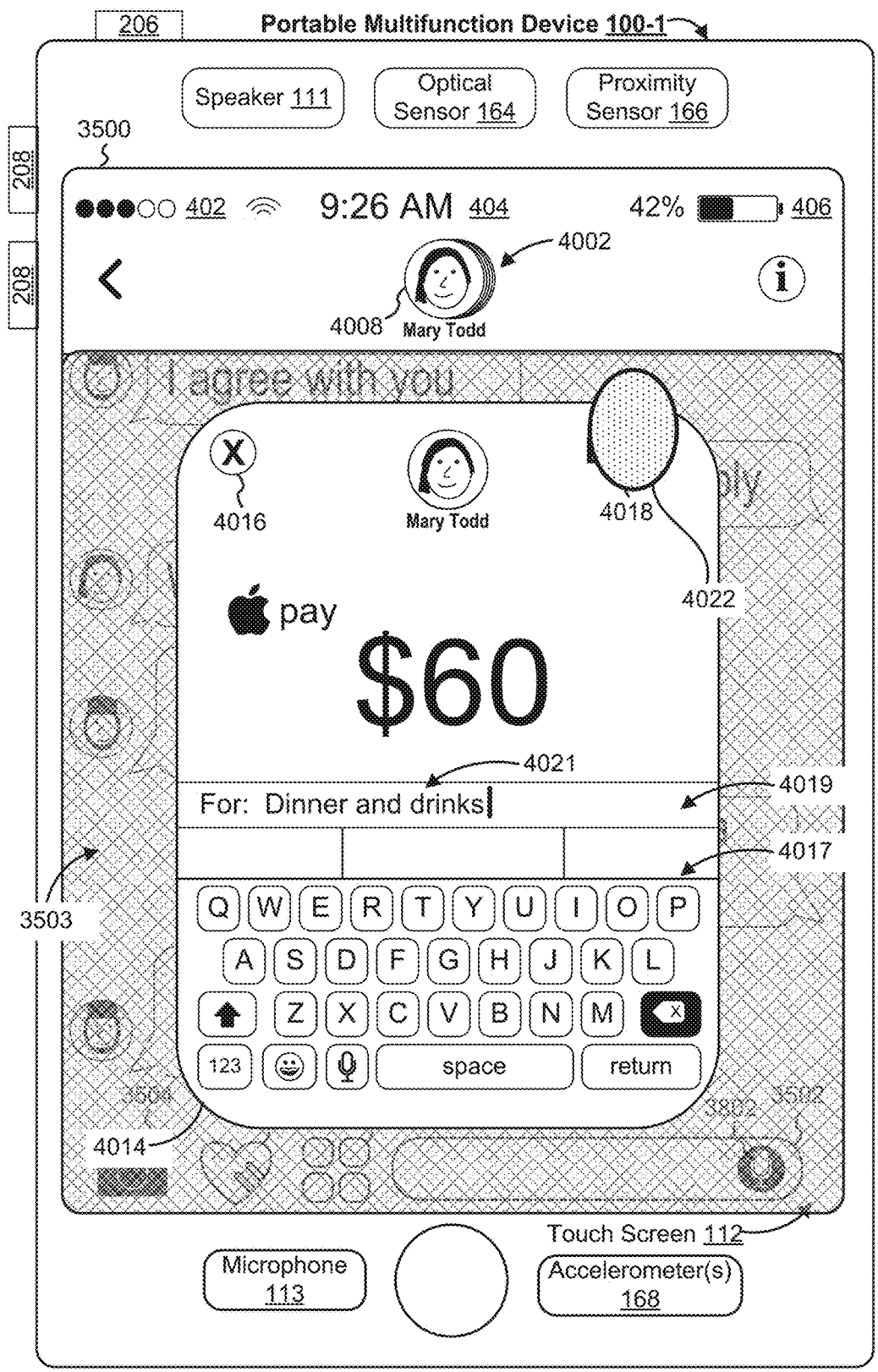
Figure 6P:
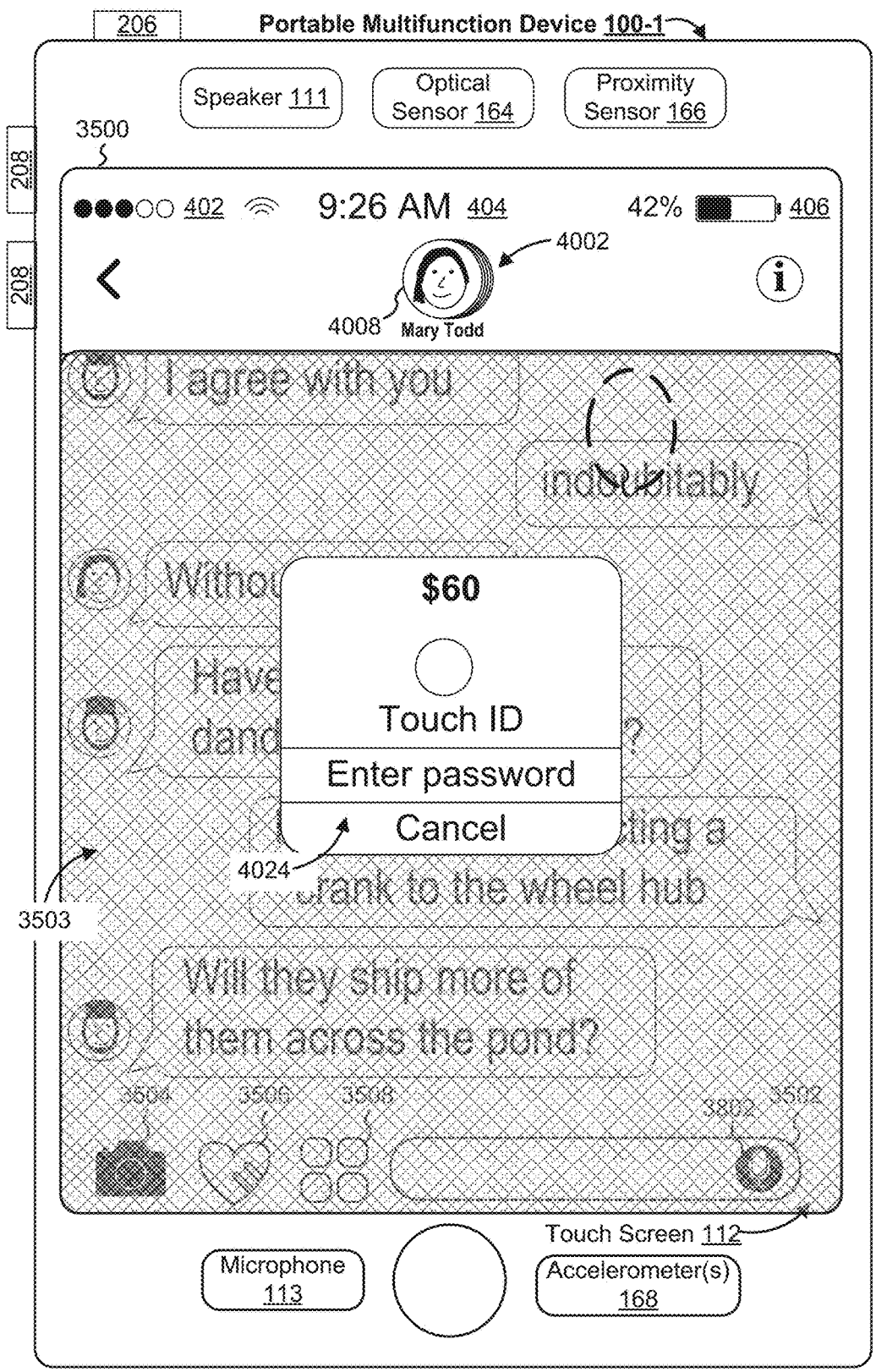
Figure 6Q:
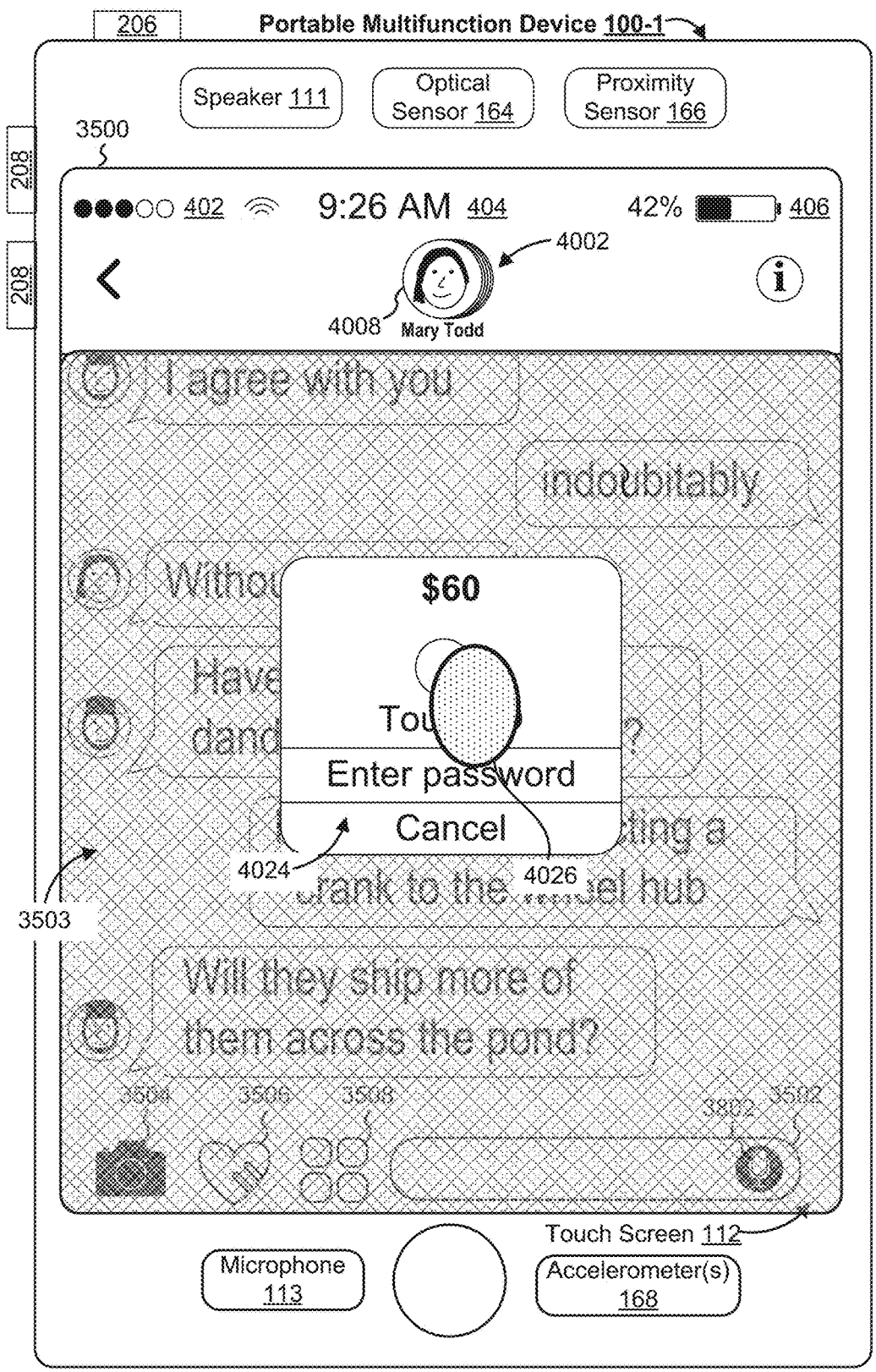
Figure 6R:
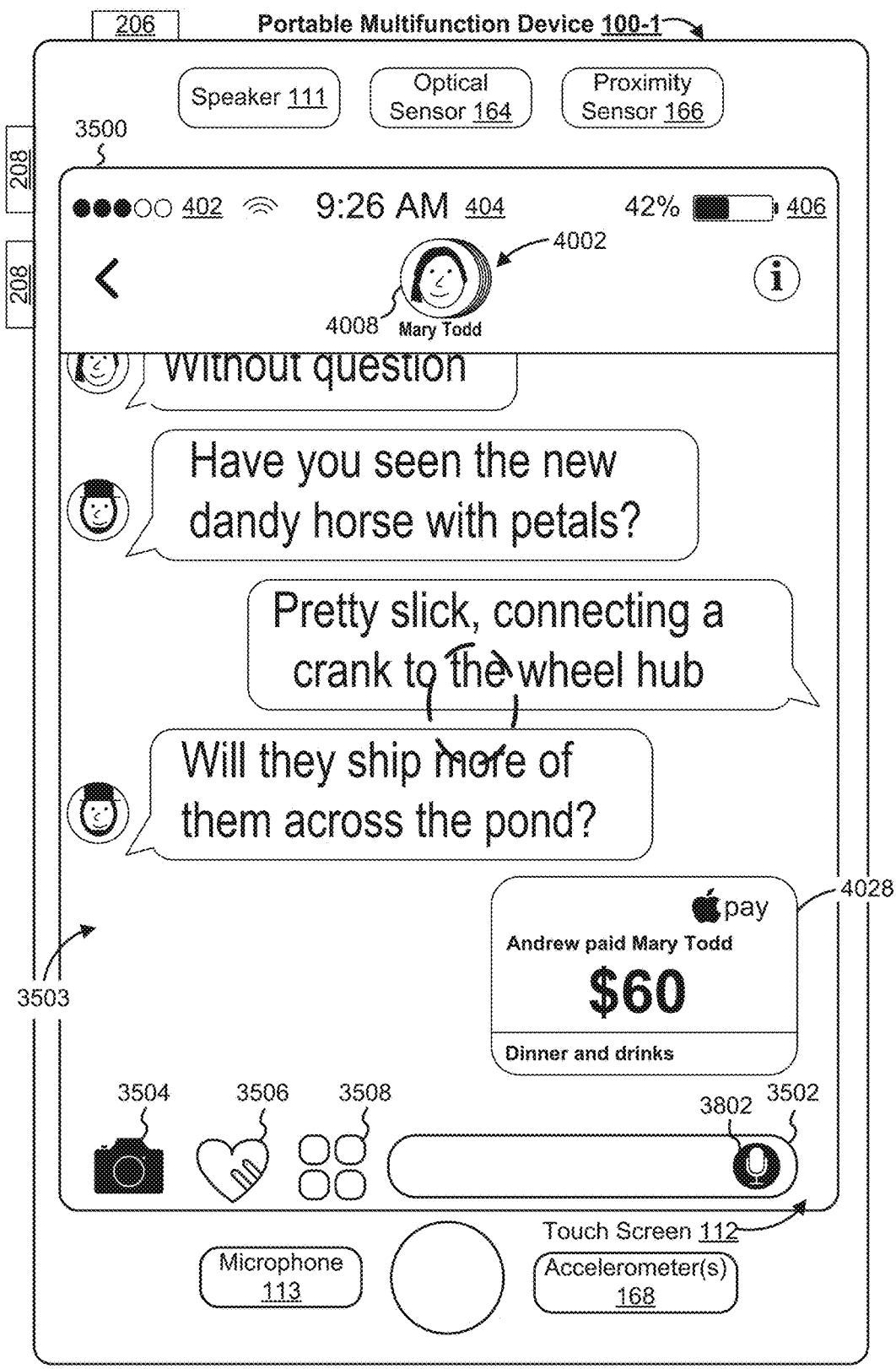
Figure 6S:
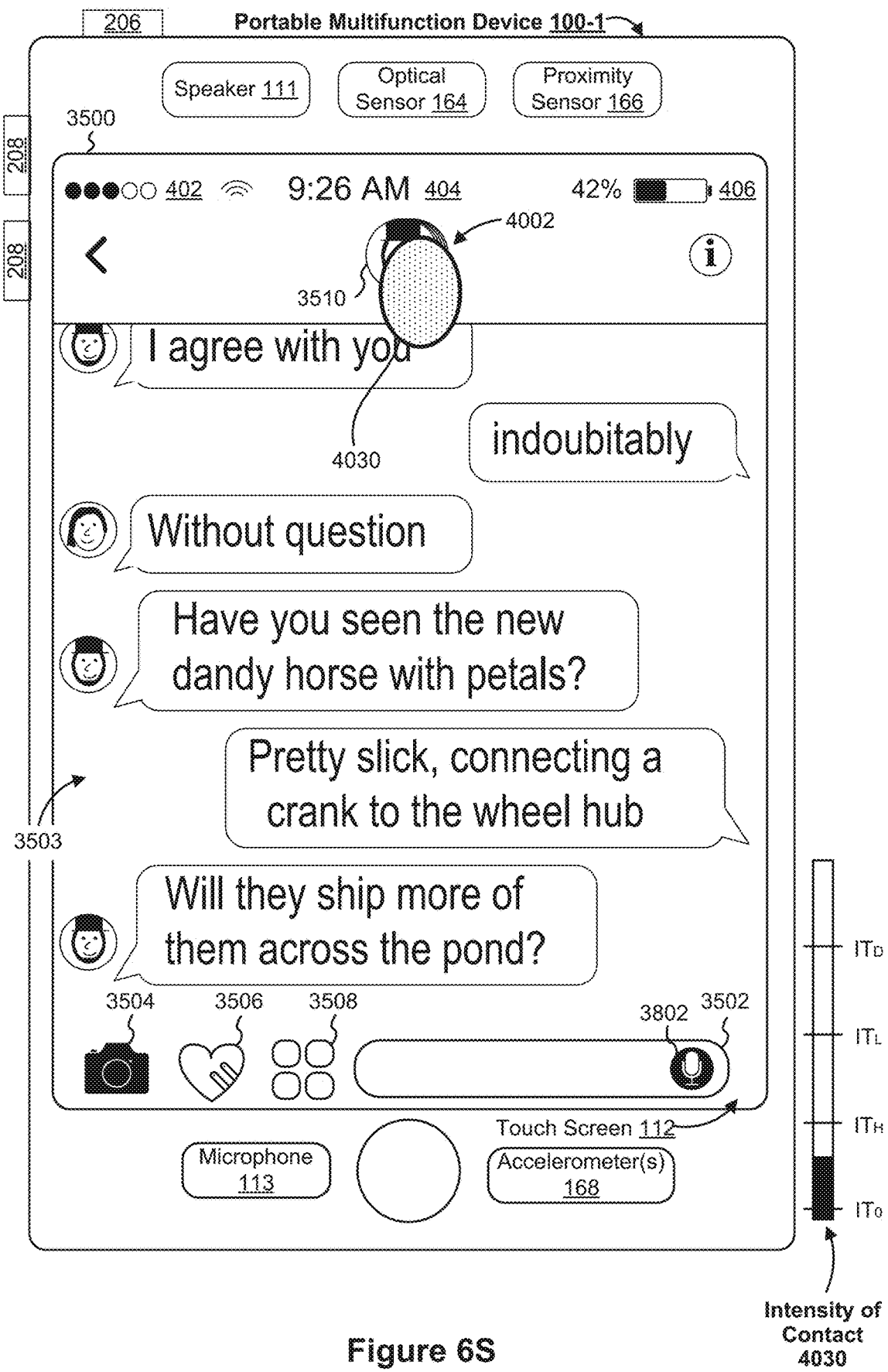
Figure 6T:
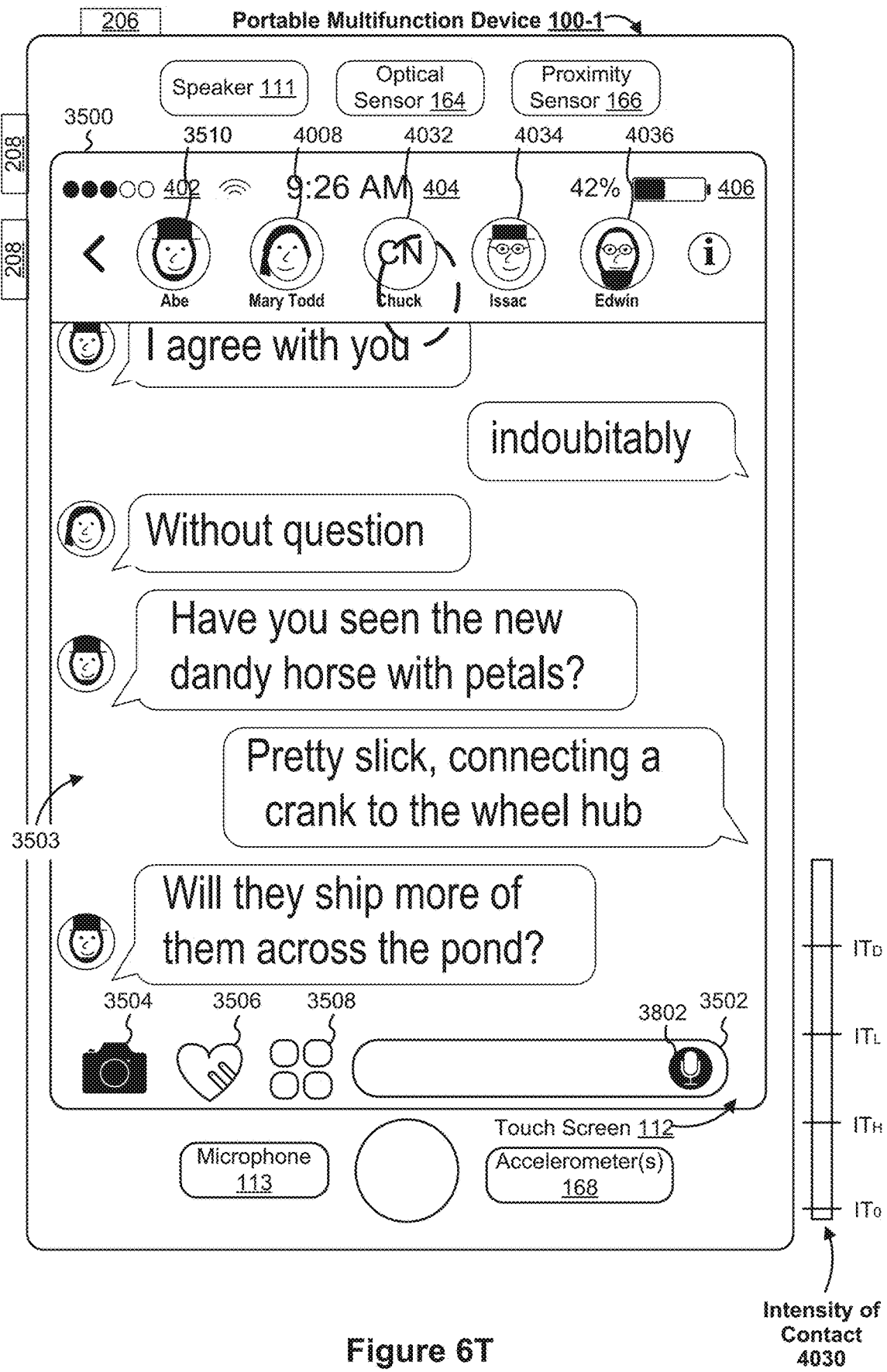
Figure 6U:
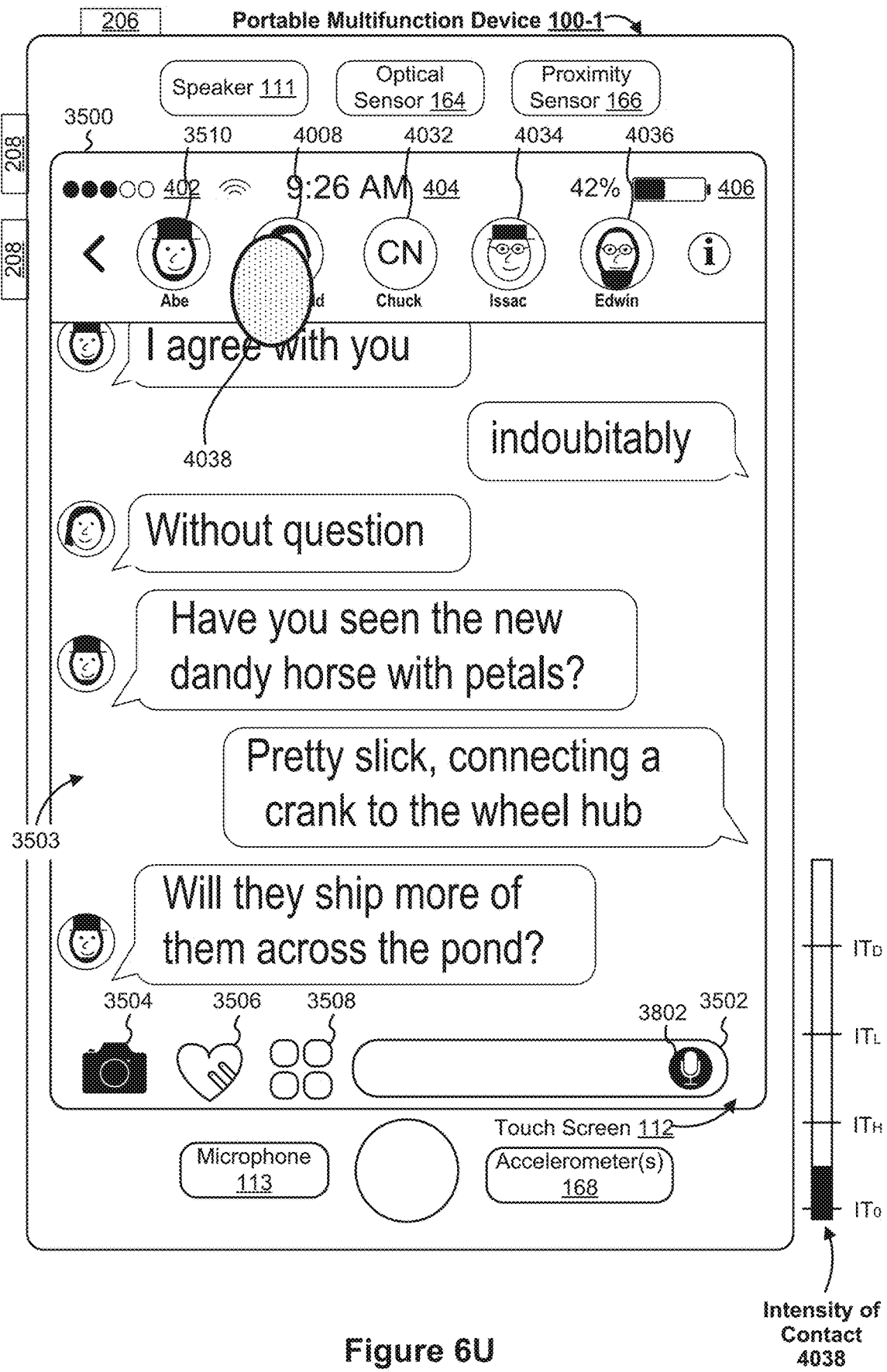
Figure 6V:
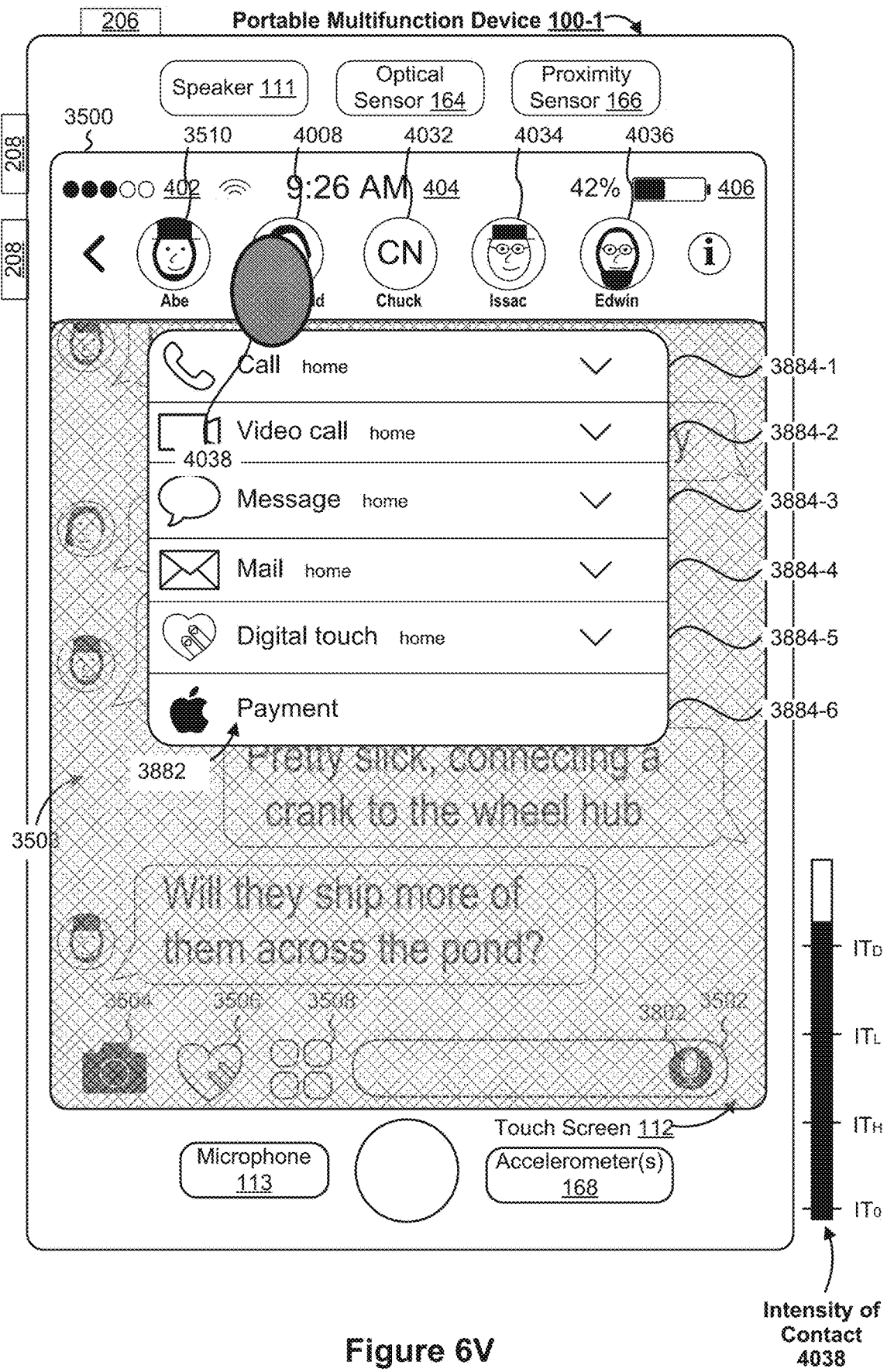
Figure 6W:
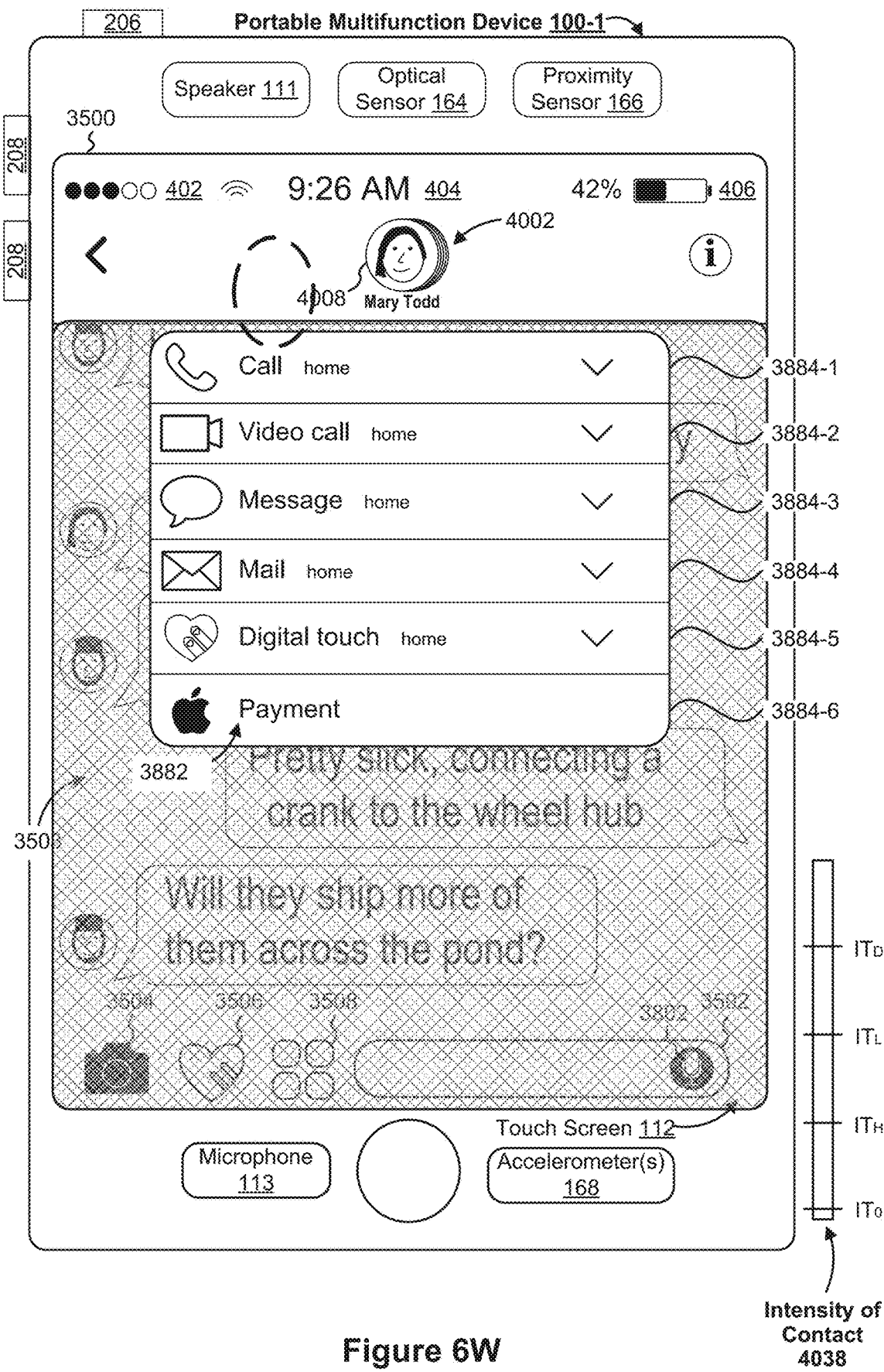

FIGS. 6A-6W illustrate exemplary user interfaces for interacting with other users of a messaging transcript through an avatar in accordance with some embodiments. The user interfaces in these figures are used to illustrate the processes described below, including the processes in FIGS. 7 and 9A-9B. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 6A-6W illustrate an exemplary user interface 3500 for a messaging application which includes conversation transcript 3503, message-input area 3502, three activatable affordances—digital image affordance 3504, digital canvas affordance 3506, and application affordance 3508. Conversation transcript 3503 includes messages from participants of a corresponding messaging session, including the user of portable multifunction device 100-1 and other users included in the messaging session. Each of the other users included in the messaging transcript are represented by an avatar (e.g., avatar 3510 for "Abe" and avatar 4008 for "Mary Todd") displayed in stack of avatars 4002.

FIGS. 6A-6F illustrate two exemplary embodiments for interacting with another user of a messaging session through an avatar, where the device performs different operations based on detecting different types of user inputs.

In a first embodiment, a menu of actions for interacting with another user included in the messaging session is displayed by tapping on the user's avatar. Device 100-1 detects a tap gesture, including contact 4004 in FIG. 6B, on Abe's avatar 3510. In response, the device displays menu 3882 of activatable menu items 3884-1 to 3884-6 for interacting directly with Abe by a phone call, video call, individual message, e-mail, digital drawing, or payment, respectfully.

In a second embodiment, the stacked avatars are cycled to display a different avatar on top of the stack by deep pressing on the stack of avatars. Device 100-1 detects a press gesture, including contact 4006 in FIG. 6D, on stack of avatars 4002 displaying Abe's avatar 3510 on top. The device then detects an increase in the intensity of contact 4006 above a predefined intensity threshold (e.g., $IT_L$ or $IT_D$) in FIG. 6E and, in response, shuffles the stack of avatars 4002 to display Mary Todd's avatar 4008 on top, in FIGS. 6E-6F.

FIGS. 6G-6R illustrate an exemplary embodiment for paying another user of a messaging session through an avatar. Device 100-1 detects a press gesture, including contact 4010 in FIG. 6G, of stack of avatars 4002 displaying Mary Todd's avatar 4008 on top. The device then detects an increase in the intensity of contact 4010 above a predefined intensity threshold (e.g., $IT_L$ or $IT_D$) and, in response, displays menu 3882 of activatable menu items 3884-1 to 3884-6, for interacting with Mary Todd directly, and blurs display of conversation transcript 3503 in FIG. 6H. Menu 3882 remains displayed after the device detects lift-off of contact 4010 in FIG. 6I.

Device 100-1 then detects a tap gesture, including contact 4012 in FIG. 6J, on activatable menu item 3884-6 for a payment action. In response, the device displays payment area 4014, including termination affordance 4016, execution affordance 4018, and digital keypad 4015 for inputting payment amount, in FIG. 6K. The device then detects input of a payment amount ($60) and, subsequently, a tap gesture including contact 4020 on message-input area 4019, in FIG. 6L. In response, the device replaces digital touchpad 4014 with digital keyboard 4017 in FIG. 6M. Responsive to detecting input of message 4021, in FIG. 6N, and a tap gesture, including contact 4022 in FIG. 6O, on execution affordance 4018, the device prompts the user of device 100-1 to confirm their identity by displaying confirmation area 4024 in FIG. 6P. In response to receiving an identity confirming input, including contact 4026 in FIG. 6Q, the device executes payment of $60 to Mary Todd and posts confirmation of the payment to the messaging session, displaying payment confirmation 4028 within conversation transcript 3503 in FIG. 6R.

FIGS. 6S-6W illustrate two exemplary embodiments for interacting with another user of a messaging session through an avatar, where the device performs different operations based on detecting different types of user inputs.

In a first embodiment, tapping on the stack of avatars spreads the avatars out, such that a particular avatar can be selected. Device 100-1 detects a tap gesture, including contact 4030 in FIG. 6S, on stack of avatars 4002. In response, the device spreads the avatars in stack of avatars 4002—avatar 3510 for "Abe," avatar 4008 for "Mary Todd," avatar 4032 for "Chuck," avatar 4034 for "Issac," and avatar 4036 for "Edwin"—across the top of touch screen 112 in FIG. 6T.

In a second embodiment, which is also a continuation of the first embodiment, deep pressing on a particular avatar calls up a menu of activatable actions for interacting with the user corresponding to the avatar. Device 100-1 detects a press gesture, including contact 4038 in FIG. 6U, on Mary Todd's avatar 4008. The device then detects an increase in the intensity of contact 4038 above a predefined intensity threshold (e.g., $IT_L$ or $IT_D$) and, in response, displays menu

3882 of activatable menu items 3884-1 to 3884-6, for interacting with Mary Todd directly, and blurs display of conversation transcript 3503 in FIG. 6V. Menu 3882 remains displayed after the device detects lift-off of contact 4038 in FIG. 6W.

Making Payments

FIG. 7 is a flow diagram illustrating a method 6600 of making payments from a messaging application in accordance with some embodiments. The method 6600 is performed at an electronic device (e.g., device 300, FIG. 3, or portable multifunction device 100, FIG. 1A) with a display, a touch-sensitive surface, and one or more sensors to detect intensities of contacts with the touch-sensitive surface. In some embodiments, the display is a touch-screen display and the touch-sensitive surface is on or integrated with the display. In some embodiments, the display is separate from the touch-sensitive surface. Some operations in method 6600 are, optionally, combined and/or the order of some operations is, optionally, changed.

As described below, the method 6600 provides an intuitive way to make payments from a messaging application. The method reduces the number, extent, and/or nature of the inputs from a user when making payments from a messaging application, thereby creating a more efficient human-machine interface. For battery-operated electronic devices, enabling a user to make payments from a messaging application faster and more efficiently conserves power and increases the time between battery charges.

The device displays (6602) a messaging user interface of a messaging application on the display, the messaging user interface including a conversation transcript (e.g., displayed in a first area of the display) of a messaging session between a user of the electronic device and at least one other user (e.g., of another electronic device) and a message-input area, wherein each of the other users included in the messaging session has a corresponding avatar (e.g., displayed in a second area of the display). For example, messaging user interface 3500, in FIG. 6F, includes conversation transcript 3503, message-input area 3502. Conversation transcript 3503 includes messages from participants of a corresponding messaging session, including the user of portable multifunction device 100-1 and other users included in the messaging session. Each of the other users included in the messaging transcript are represented by an avatar (e.g., avatar 4008 for "Mary Todd") displayed in stack of avatars 4002, in FIG. 6F.

While displaying the messaging user interface, the device detects (6604) a first user input (e.g., a tap, light press, or deep press gesture by a contact on a touch-sensitive surface) while a focus selector is at a first location in the messaging user interface that corresponds to an avatar of a first other user included in the messaging session, (e.g., detect a gesture by a contact on a touch-sensitive display at the location of the avatar of the first other user, or detect a gesture by a contact on a touch-sensitive surface while a cursor or other pointer is at the location of the avatar of the first other user). For example, device 100-1 detects an input including contact 4010, on Mary Todd's avatar 4008, in FIG. 6G.

In response to detecting the first user input, the device displays (6006) a menu that contains activatable menu items associated with the first other user overlaid on the messaging user interface, the displayed menu including an activatable menu item for initiating a payment action with the first other user (e.g., a menu item for paying, or requesting payment from, the first other user). For example, in response to detecting an input including an increase in a characteristic intensity of contact 4010, meeting a predefined intensity threshold, the device displays action menu 3882 that includes activatable action 3884-6 for making a payment to another user (e.g., Mary Todd) included in the messaging session, in FIG. 6H.

While displaying the menu that contains activatable menu items associated with the first other user (e.g., action menu 3882 in FIG. 6J), the device detects (6008) a second user input (e.g., by a contact on a touch-sensitive surface, such as an input including contact 4012, in FIG. 6J) while a focus selector is at a second location in the messaging user interface that corresponds to the activatable menu item for initiating a payment action with the first other user (e.g., activatable menu action 3884-6 for a payment, in FIG. 6J). For example, the device detects a gesture by a contact on a touch-sensitive display at the location of the activatable menu item for initiating a payment action with the first other user, or detects a gesture by a contact on a touch-sensitive surface while a cursor or other pointer is at the location of the activatable menu item for initiating a payment action with the first other user.

In response to detecting the second user input, the device displays (6610) a user interface configured to initiate sending of a payment to, and/or requesting a payment from, the first other user. For example, in response to detecting an input including contact 4012 on activatable payment action 3884-6, in FIG. 6J, device 100-1 displays payment user interface 4014, in FIG. 6K.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 6800) are also applicable in an analogous manner to method 6600 described above with respect to FIG. 7. For example, the contacts, gestures, user interface objects, tactile outputs, intensity thresholds, focus selectors, and animations described above with reference to method 6600 optionally have one or more of the characteristics of the contacts, gestures, user interface objects, tactile outputs, intensity thresholds, focus selectors, and animations described herein with reference to other methods described herein (e.g., method 6800). For brevity, these details are not repeated here.

Figure 8:
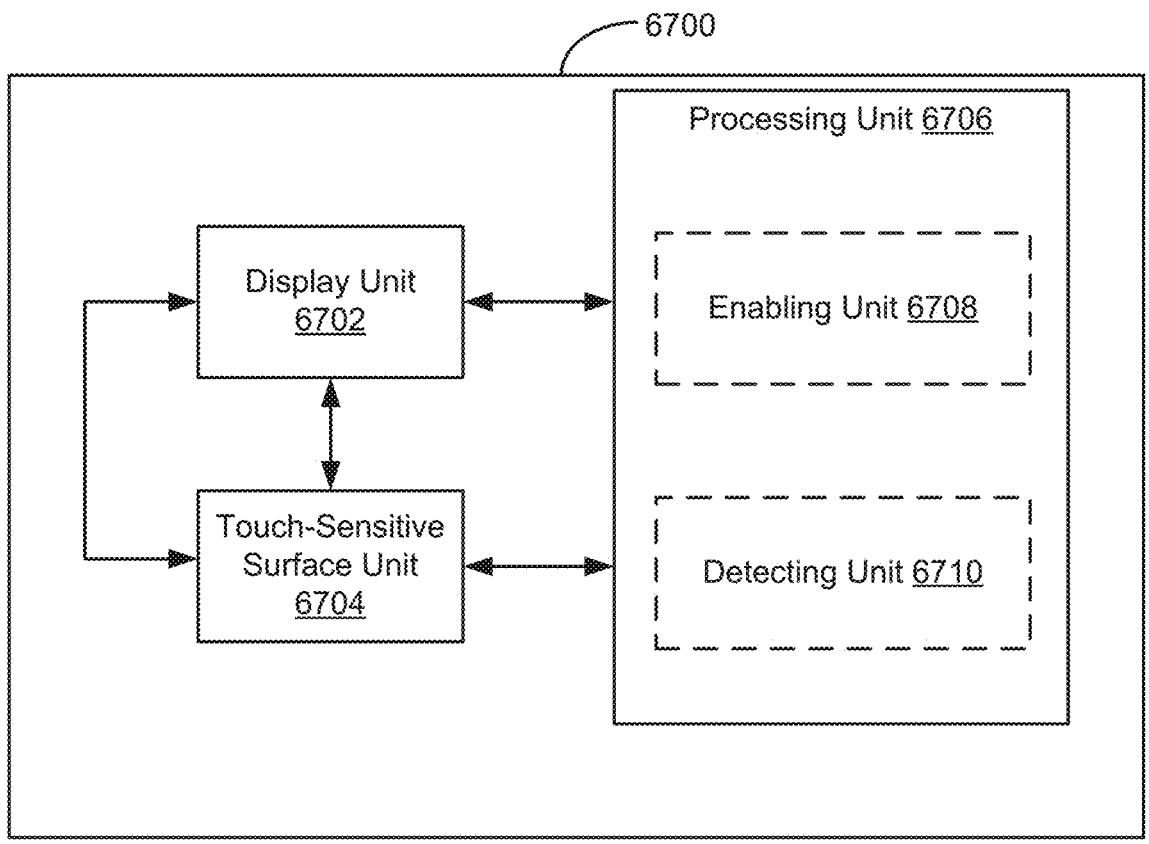
FIG. 8 is a functional block diagram of an electronic device in accordance with some embodiments.

In accordance with some embodiments, FIG. 8 shows a functional block diagram of an electronic device 6700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 8 are, optionally, combined or separated into sub-blocks to implement the principles of the various described embodiments. Therefore, the description herein optionally supports any possible combination or separation or further definition of the functional blocks described herein.

As shown in FIG. 8, an electronic device 6700 includes a display unit 6702 configured to display user interfaces; a touch-sensitive surface unit 6704 configured to detect contacts; and a processing unit 6706 coupled with the display unit 6702 and the touch-sensitive surface unit 6704. The processing unit 6706 includes an enabling unit 6708 and a detecting unit 6710.

The processing unit 6706 is configured to enable display of (e.g., with enabling unit 6708) a messaging user interface of a messaging application on the display unit 6702, the messaging user interface including a conversation transcript of a messaging session between a user of the electronic device and at least one other user and a message-input area, wherein each of the other users included in the messaging session has a corresponding avatar. While displaying the messaging user interface, the processing unit 6706 is configured to detect (e.g., with detecting unit 6710) a first user input while a focus selector is at a first location in the messaging user interface that corresponds to an avatar of a first other user included in the messaging session. In response to detecting the first user input, enable display of (e.g., with enabling unit 6708) a menu that contains activatable menu items associated with the first other user overlaid on the messaging user interface, the displayed menu including an activatable menu item for initiating a payment action with the first other user. While displaying the menu that contains activatable menu items associated with the first other user, detect (e.g., with detecting unit 6710) a second user input while a focus selector is at a second location in the messaging user interface that corresponds to the activatable menu item for initiating a payment action with the first other user. In response to detecting the second user input, enable display of (e.g., with enabling unit 6708) a user interface configured to initiate sending of a payment to, and/or requesting a payment from, the first other user.

The operations described above with reference to FIG. 7 are, optionally, implemented by components depicted in FIGS. 1A-1B or FIG. 8. For example, detection operations 6604 and 6608 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Interacting with Avatars in a Group Messaging Session

Figure 9A:
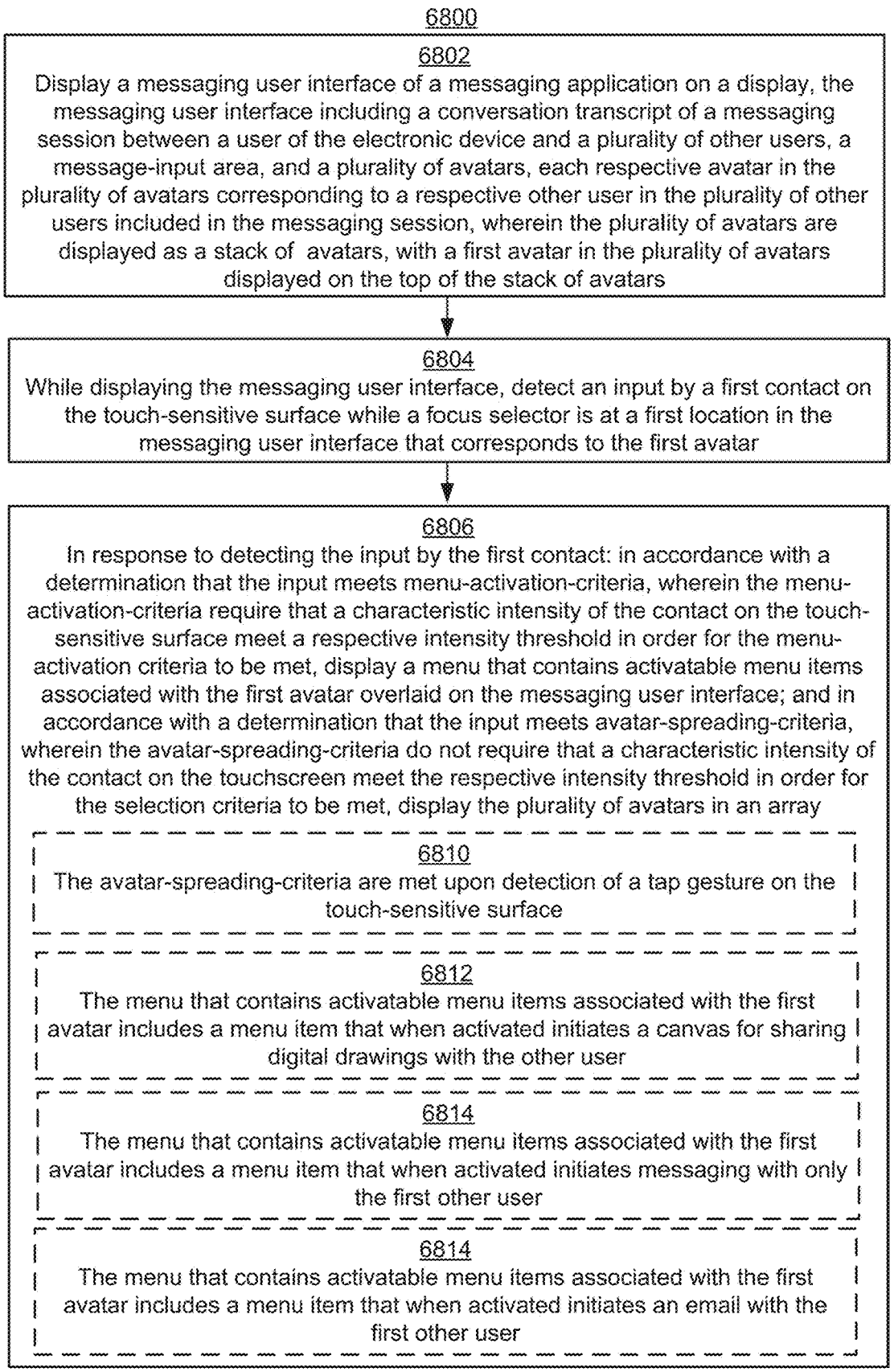

FIGS. 9A-9B are flow diagrams illustrating a method 6800 of interacting with a single user included in a group messaging session in accordance with some embodiments. The method 6800 is performed at an electronic device (e.g., device 300, FIG. 3, or portable multifunction device 100, FIG. 1A) with a display, a touch-sensitive surface, and one or more sensors to detect intensities of contacts with the touch-sensitive surface. In some embodiments, the display is a touch-screen display and the touch-sensitive surface is on or integrated with the display. In some embodiments, the display is separate from the touch-sensitive surface. Some operations in method 6800 are, optionally, combined and/or the order of some operations is, optionally, changed.

As described below, the method 6800 provides an intuitive way to interact with a single user included in a group messaging session. The method reduces the number, extent, and/or nature of the inputs from a user when interacting with a single user included in a group messaging session, thereby creating a more efficient human-machine interface. For battery-operated electronic devices, enabling a user to interact with a single user included in a group messaging session faster and more efficiently conserves power and increases the time between battery charges.

The device displays (6802) a messaging user interface of a messaging application on the display, the messaging user interface including a conversation transcript (e.g., displayed in a first area of the display) of a messaging session between a user of the electronic device and a plurality of other users (e.g., of respective other electronic devices), a message-input area, and a plurality of avatars, each respective avatar in the plurality of avatars corresponding to a respective other user in the plurality of other users included in the messaging session, wherein the plurality of avatars are displayed as a stack of (e.g., overlapping) avatars, with a first avatar in the plurality of avatars displayed on the top of the stack of avatars. For example, messaging user interface 3500, in FIG. 6S, includes conversation transcript 3503 and message-input area 3502. Conversation transcript 3503 includes messages from participants of a corresponding messaging session, including the user of portable multifunction device 100-1 and other users included in the messaging session. Each of the other users included in the messaging transcript are represented by an avatar (e.g., avatar 3510 for "Abe") displayed on top of stack of avatars 4002, in FIG. 6S.

While displaying the messaging user interface, the device detects an input by a first contact on the touch-sensitive surface while a focus selector is at a first location in the messaging user interface that corresponds to the first avatar (e.g., detect a gesture by a contact on a touch-sensitive display at the location of the first avatar, or detect a gesture by a contact on a touch-sensitive surface while a cursor or other pointer is at the location of the first avatar). For example, device 100-1 detects an input including contact 4030 on Abe's avatar (e.g., displayed on top of stack of avatars 4002), in FIG. 6S. In another example, device 100-1 detects an input including contact 4038 on Mary Todd's avatar 4008, in FIG. 6U.

In some embodiments, in response to detecting the input by the first contact, in accordance with a determination that the input meets menu-activation-criteria, wherein the menu-activation-criteria require that a characteristic intensity of the contact on the touch-sensitive surface meet a respective intensity threshold in order for the menu-activation criteria to be met, the device displays (6806) a menu that contains activatable menu items associated with the first avatar overlaid on the messaging user interface. For example, in response to detecting an increase in a characteristic intensity of contact 4038 on Mary Todd's avatar 4008, meeting a predetermined intensity threshold (e.g., $IT_L$ or $IT_D$), between FIGS. 6U and 6V, device 100-1 displays action menu 3882, including actions 3884 for directly interacting with Mary Todd (e.g., interacting only with Mary Todd), in FIG. 6V.

In some embodiments, in response to detecting the input by the first contact, in accordance with a determination that the input meets avatar-spreading-criteria, wherein the avatar-spreading-criteria do not require that a characteristic intensity of the contact on the touchscreen meet the respective intensity threshold in order for the selection criteria to be met, the device displays (6906) the plurality of avatars in an array (e.g., a substantially or completely non-overlapping array). For example, in response to detecting an input including contact 4030 on Abe's avatar 3510, in FIG. 6S, where a characteristic intensity of contact 4030 does not meet a predetermined intensity threshold (e.g., $IT_L$ or $IT_D$), device 100-1 displays an array of avatars in avatar stack 4002—e.g., Abe's avatar 3510, Mary Todd's avatar 4008, Chuck's avatar 4032, Issac's avatar 4034, and Edwin's avatar 4036—in FIG. 6T.

In some embodiments, in accordance with a determination that a characteristic (e.g., a maximum) intensity of the first contact met a predefined intensity threshold (e.g., was between a first intensity threshold and a second intensity threshold), the device replaces display of the first avatar on top of the stack of avatars with display of a second avatar in the plurality of avatars on top of the stack of avatars. For example, in response to detecting an increase in a characteristic intensity of contact 4006 on Abe's avatar 3510, meeting a predetermined intensity threshold (e.g., $IT_L$ or $IT_D$), between FIGS. 6D and 6E, device 100-1 cycles (e.g., switches or shuffles) stack of avatars 4002 to display Mary Todd's avatar 4008 on top of stack of avatars 4002 in FIGS. 6E-6F (e.g., Mary Todd's avatar 4008 replaces Abe's avatar 3510 on top of stack of avatars 4002).

In some embodiments, in accordance with a determination that a characteristic (e.g., a maximum) intensity of the first contact did not meet a predetermined intensity threshold (e.g., was between the second intensity threshold and a third intensity threshold), the device displays a menu that contains activatable menu items associated with the first avatar overlaid on the messaging user interface. For example, in response to detecting an input including contact 4004 on Abe's avatar 3510, in FIG. 6B, where a characteristic intensity of contact 4004 does not meet a predetermined intensity threshold (e.g., $IT_L$ or $IT_D$), device 100-1 displays action menu 3882, including actions 3884 for directly interacting with Abe (e.g., interacting only with Abe), in FIG. 6C.

In some embodiments, the second intensity threshold is above the first intensity threshold and the third intensity threshold is above the second intensity threshold (e.g., tap to cycle through the avatars and light press or deep press to call up a quick action menu for the avatar at the top of the stack).

In some embodiments, the second intensity threshold is below the first intensity threshold and the third intensity threshold is below the second intensity threshold (e.g., deep press or light press to cycle through the avatars and tap to call up the quick action menu for the avatar at the top of the stack).

In some embodiments, the avatar-spreading-criteria are met (6810) upon detection of a tap gesture on the touch-sensitive surface. For example, avatars 3510, 4008, 4032, 4034, and 4036, in avatar stack 4002, displayed in FIG. 6S, are displayed as a spread array (e.g., a substantially or completely non-overlapping array), in FIG. 6T, in response to detecting a tap gesture including contact 4030 on Abe's avatar 3510, in FIG. 6S.

In some embodiments, the menu that contains activatable menu items associated with the first avatar (e.g., action menu 3882 in FIG. 6V) includes (6812) a menu item that when activated initiates a canvas for sharing digital drawings with the other user (e.g., digital touch action 3884-5 in FIG. 6V).

In some embodiments, the menu that contains activatable menu items associated with the first avatar (e.g., action menu 3882 in FIG. 6V) includes (6814) a menu item that when activated initiates messaging with only the first other user (e.g., message action 3884-3 in FIG. 6V).

For example, in some embodiments, selecting a messaging menu item (e.g., activatable action 3884-3) causes the electronic device to display a private messaging user interface between the user of the electronic device and the first other user. For example, in response to detecting an input including contact 3886 on activatable message action 3884-3, in FIG. 38AY of U.S. Patent Publication US2017/0336958A1, which is incorporated by reference, while messaging user interface 3500 is displaying conversation transcript 3503 corresponding to a messaging session between the user of device 100-1 (e.g., "Andrew") and a plurality of other users, each represented by an avatar in the stack of avatars 4002, in FIG. 38AY of U.S. Patent Publication US2017/0336958A1, device 100-1 replaces display of conversation transcript 3503, in FIG. 38AY of U.S. Patent Publication US2017/0336958A1, with conversation transcript 3700, corresponding to a messaging session between only Abe and Andrew, in FIG. 38AZ of U.S. Patent Publication US2017/0336958A1.

In some embodiments, the menu that contains activatable menu items associated with the first avatar (e.g., action menu 3882 in FIG. 6V) includes (6816) a menu item that when activated initiates an email with the first other user (e.g., mail action 3884-4 in FIG. 6V).

In some embodiments, the menu that contains activatable menu items associated with the first avatar (e.g., action menu 3882 in FIG. 6V) includes (6818) a menu item that when activated initiates a call with the first other user (e.g., call action 3884-1 in FIG. 6V).

In some embodiments, the menu that contains activatable menu items associated with the first avatar (e.g., action menu 3882 in FIG. 6V) includes (6820) a menu item that when activated initiates a video conference with the first other user (e.g., video call action 3884-2 in FIG. 6V).

In some embodiments, the menu that contains activatable menu items associated with the first avatar (e.g., action menu 3882 in FIG. 6V) includes (6822) a menu item that when activated initiates a payment action with the first other user (e.g., payment action 3884-6 in FIG. 6V).

It should be understood that the particular order in which the operations in FIGS. 9A-9B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 6600) are also applicable in an analogous manner to method 6800 described above with respect to FIGS. 9A-9B. For example, the contacts, gestures, user interface objects, tactile outputs, intensity thresholds, focus selectors, and animations described above with reference to method 6800 optionally have one or more of the characteristics of the contacts, gestures, user interface objects, tactile outputs, intensity thresholds, focus selectors, and animations described herein with reference to other methods described herein (e.g., method 6600). For brevity, these details are not repeated here.

Figure 10:
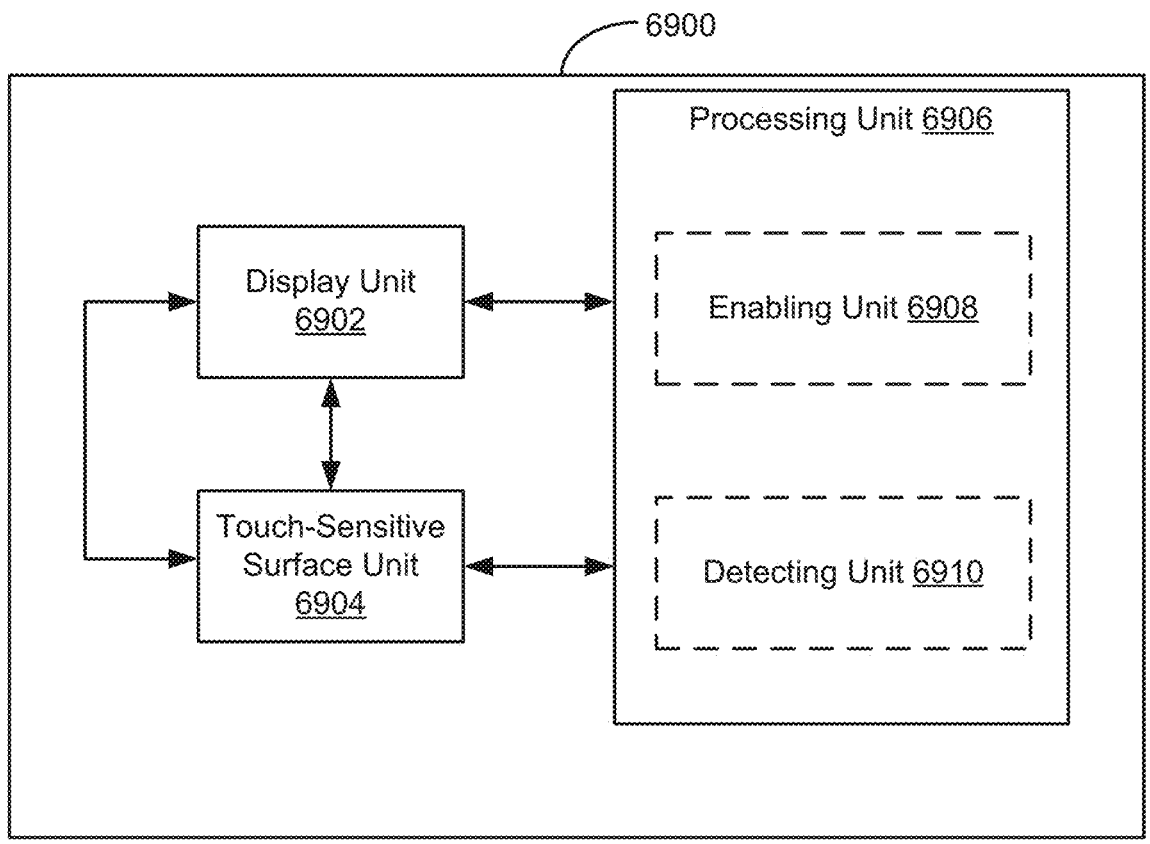
FIG. 10 is a functional block diagram of an electronic device in accordance with some embodiments.

In accordance with some embodiments, FIG. 10 shows a functional block diagram of an electronic device 6900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, an electronic device 6900 includes a display unit 6902 configured to display user interfaces; a touch-sensitive surface unit 6904 configured to detect contacts; and a processing unit 6906 coupled with the display unit 6902 and the touch-sensitive surface unit 6904. The processing unit 6906 including: an enabling unit 6908 and detecting unit 6910.

The processing unit 6906 is configured to: enable display of (e.g., with enabling unit 6908) a messaging user interface of a messaging application on the display unit 6902, the messaging user interface including a conversation transcript of a messaging session between a user of the electronic device and a plurality of other users, a message-input area, and a plurality of avatars, each respective avatar in the plurality of avatars corresponding to a respective other user in the plurality of other users included in the messaging session, wherein the plurality of avatars are displayed as a stack of avatars, with a first avatar in the plurality of avatars displayed on the top of the stack of avatars. While displaying the messaging user interface, the processing unit 6906 is configured to detect (e.g., with detecting unit 6910) an input by a first contact on the touch-sensitive surface unit 6904 while a focus selector is at a first location in the messaging user interface that corresponds to the first avatar. In response to detecting the input by the first contact: in accordance with a determination that the input meets menu-activation-criteria, wherein the menu-activation-criteria require that a characteristic intensity of the contact on the touch-sensitive surface unit 6904 meet a respective intensity threshold in order for the menu-activation criteria to be met, the processing unit 6906 is configured to enable display of (e.g., with enabling unit 6908) a menu that contains activatable menu items associated with the first avatar overlaid on the messaging user interface. In accordance with a determination that the input meets avatar-spreading-criteria, wherein the avatar-spreading-criteria do not require that a characteristic intensity of the contact on the touchscreen meet the respective intensity threshold in order for the selection criteria to be met, the processing unit 6906 is configured to enable display of (e.g., with enabling unit 6908) the plurality of avatars in an array.

In some embodiments, the avatar-spreading-criteria are met upon detection of a tap gesture on the touch-sensitive surface unit.

In some embodiments, the menu that contains activatable menu items associated with the first avatar includes a menu item that when activated initiates a canvas for sharing digital drawings with the other user (corresponding to the first avatar).

In some embodiments, the menu that contains activatable menu items associated with the first avatar includes a menu item that when activated initiates messaging with only the first other user (corresponding to the first avatar).

In some embodiments, the menu that contains activatable menu items associated with the first avatar includes a menu item that when activated initiates an email with the first other user (corresponding to the first avatar).

In some embodiments, the menu that contains activatable menu items associated with the first avatar includes a menu item that when activated initiates a call with the first other user, In some embodiments, the menu that contains activatable menu items associated with the first avatar includes a menu item that when activated initiates a video conference with the first other user (corresponding to the first avatar).

In some embodiments, the menu that contains activatable menu items associated with the first avatar includes a menu item that when activated initiates a payment action with the first other user (corresponding to the first avatar).

The operations described above with reference to FIGS. 9A-9B are, optionally, implemented by components depicted in FIGS. 1A-1B or FIG. 10. For example, detection operation 6804 and display operation 6806 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

What is claimed is:

1. A method, comprising:
   at an electronic device having one or more processors, memory, a touch-sensitive surface, one or more sensors to detect intensities of contacts with the touch-sensitive surface, and a display:
   displaying a messaging user interface of a messaging application on the display, the messaging user interface including a conversation transcript of a messaging session between a user of the electronic device and a plurality of other users, a message-input area, and a plurality of avatars, each respective avatar in the plurality of avatars corresponding to a respective other user in the plurality of other users included in the messaging session, wherein the plurality of avatars are displayed as a stack of avatars, with a first avatar in the plurality of avatars displayed on the top of the stack of avatars;
   while displaying the messaging user interface, detecting an input by a first contact on the touch-sensitive surface while a focus selector is at a first location in the messaging user interface that corresponds to the first avatar;
   in response to detecting the input by the first contact:
   in accordance with a determination that the input meets menu-activation criteria, wherein the menu-activation criteria require that a characteristic intensity of the first contact on the touch-sensitive surface meet a respective intensity threshold in order for the menu-activation criteria to be met, displaying a menu that contains activatable menu items associated with the first avatar overlaid on the messaging user interface; and in accordance with a determination that the input meets avatar-spreading-criteria, wherein the avatar-spreading-criteria do not require that a characteristic intensity of the first contact on the touch-sensitive surface meet the respective intensity threshold in order for the avatar-spreading-criteria to be met, displaying the plurality of avatars in an array.

2. The method of claim 1, wherein the avatar-spreading-criteria are met upon detection of a tap gesture on the touch-sensitive surface.

3. The method of claim 1, wherein the menu that contains activatable menu items associated with the first avatar includes a menu item that when activated initiates a canvas for sharing digital drawings with a first other user, corresponding to the first avatar, of the plurality of other users.

4. The method of claim 1, wherein the menu that contains activatable menu items associated with the first avatar includes a menu item that when activated initiates messaging with only a first other user, corresponding to the first avatar, of the plurality of other users.

5. The method of claim 1, wherein the menu that contains activatable menu items associated with the first avatar includes a menu item that when activated initiates an email with a first other user, corresponding to the first avatar, of the plurality of other users.

6. The method of claim 1, wherein the menu that contains activatable menu items associated with the first avatar includes a menu item that when activated initiates a call with a first other user, corresponding to the first avatar, of the plurality of other users.

7. The method of claim 1, wherein the menu that contains activatable menu items associated with the first avatar includes a menu item that when activated initiates a video conference with a first other user, corresponding to the first avatar, of the plurality of other users.

8. The method of claim 1, wherein the menu that contains activatable menu items associated with the first avatar includes a menu item that when activated initiates a payment action with a first other user, corresponding to the first avatar, of the plurality of other users.

9. An electronic device, comprising:
a display;
a touch-sensitive surface;
one or more sensors to detect intensities of contacts with the touch-sensitive surface;
one or more processors;
memory; and
one or more programs, wherein the one or more programs are stored in the memory and configured to be executed by the one or more processors, the one or more programs including instructions for:
displaying a messaging user interface of a messaging application on the display, the messaging user interface including a conversation transcript of a messaging session between a user of the electronic device and a plurality of other users, a message-input area, and a plurality of avatars, each respective avatar in the plurality of avatars corresponding to a respective other user in the plurality of other users included in the messaging session, wherein the plurality of avatars are displayed as a stack of avatars, with a first avatar in the plurality of avatars displayed on the top of the stack of avatars;

while displaying the messaging user interface, detecting an input by a first contact on the touch-sensitive surface while a focus selector is at a first location in the messaging user interface that corresponds to the first avatar;

in response to detecting the input by the first contact:
in accordance with a determination that the input meets menu-activation criteria, wherein the menu-activation criteria require that a characteristic intensity of the first contact on the touch-sensitive surface meet a respective intensity threshold in order for the menu-activation criteria to be met, displaying a menu that contains activatable menu items associated with the first avatar overlaid on the messaging user interface; and in accordance with a determination that the input meets avatar-spreading-criteria, wherein the avatar-spreading-criteria do not require that a characteristic intensity of the first contact on the touch-sensitive surface meet the respective intensity threshold in order for the avatar-spreading-criteria to be met, displaying the plurality of avatars in an array.

10. The electronic device of claim 9, wherein the avatar-spreading-criteria are met upon detection of a tap gesture on the touch-sensitive surface.

11. The electronic device of claim 9, wherein the menu that contains activatable menu items associated with the first avatar includes a menu item that when activated initiates a canvas for sharing digital drawings with a first other user, corresponding to the first avatar, of the plurality of other users.

12. The electronic device of claim 9, wherein the menu that contains activatable menu items associated with the first avatar includes a menu item that when activated initiates messaging with only a first other user, corresponding to the first avatar, of the plurality of other users.

13. The electronic device of claim 9, wherein the menu that contains activatable menu items associated with the first avatar includes a menu item that when activated initiates an email with a first other user, corresponding to the first avatar, of the plurality of other users.

14. The electronic device of claim 9, wherein the menu that contains activatable menu items associated with the first avatar includes a menu item that when activated initiates a call with a first other user, corresponding to the first avatar, of the plurality of other users.

15. The electronic device of claim 9, wherein the menu that contains activatable menu items associated with the first avatar includes a menu item that when activated initiates a video conference a first other user, corresponding to the first avatar, of the plurality of other users.

16. The electronic device of claim 9, wherein the menu that contains activatable menu items associated with the first avatar includes a menu item that when activated initiates a payment action with a first other user, corresponding to the first avatar, of the plurality of other users.

17. A non-transitory computer readable storage medium storing one or more programs, the one or more programs comprising instructions, which when executed by an electronic device with a display, a touch-sensitive surface, and one or more sensors to detect intensities of contacts with the touch-sensitive surface, cause the electronic device to:
display displaying a messaging user interface of a messaging application on the display, the messaging user interface including a conversation transcript of a messaging session between a user of the electronic device and a plurality of other users, a message-input area, and a plurality of avatars, each respective avatar in the plurality of avatars corresponding to a respective other user in the plurality of other users included in the messaging session, wherein the plurality of avatars are displayed as a stack of avatars, with a first avatar in the plurality of avatars displayed on the top of the stack of avatars;

while displaying the messaging user interface, detecting an input by a first contact on the touch-sensitive surface while a focus selector is at a first location in the messaging user interface that corresponds to the first avatar;

in response to detecting the input by the first contact:
  in accordance with a determination that the input meets menu-activation criteria, wherein the menu-activation criteria require that a characteristic intensity of the first contact on the touch-sensitive surface meet a respective intensity threshold in order for the menu-activation criteria to be met, displaying a menu that contains activatable menu items associated with the first avatar overlaid on the messaging user interface; and
  in accordance with a determination that the input meets avatar-spreading-criteria, wherein the avatar-spreading-criteria do not require that a characteristic intensity of the first contact on the touch-sensitive surface meet the respective intensity threshold in order for the avatar-spreading-criteria to be met, displaying the plurality of avatars in an array.

18. The non-transitory computer readable storage medium of claim 17, wherein the avatar-spreading-criteria are met upon detection of a tap gesture on the touch-sensitive surface.

19. The non-transitory computer readable storage medium of claim 17, wherein the menu that contains activatable menu items associated with the first avatar includes a menu item that when activated initiates a canvas for sharing digital drawings a first other user, corresponding to the first avatar, of the plurality of other users.

20. The non-transitory computer readable storage medium of claim 17, wherein the menu that contains activatable menu items associated with the first avatar includes a menu item that when activated initiates messaging with only a first other user, corresponding to the first avatar, of the plurality of other users.

21. The non-transitory computer readable storage medium of claim 17, wherein the menu that contains activatable menu items associated with the first avatar includes a menu item that when activated initiates an email with a first other user, corresponding to the first avatar, of the plurality of other users.

22. The non-transitory computer readable storage medium of claim 17, wherein the menu that contains activatable menu items associated with the first avatar includes a menu item that when activated initiates a call with a first other user, corresponding to the first avatar, of the plurality of other users.

23. The non-transitory computer readable storage medium of claim 17, wherein the menu that contains activatable menu items associated with the first avatar includes a menu item that when activated initiates a video conference with a first other user, corresponding to the first avatar, of the plurality of other users.

24. The non-transitory computer readable storage medium of claim 17, wherein the menu that contains activatable menu items associated with the first avatar includes a menu item that when activated initiates a payment action with a first other user, corresponding to the first avatar, of the plurality of other users.

* * * * *

UNITED STATES PATENT AND TRADEMARK OFFICE
CERTIFICATE OF CORRECTION

PATENT NO. : 11,126,348 B2  
APPLICATION NO. : 16/789335  
DATED : September 21, 2021  
INVENTOR(S) : Chaudhri et al.

Page 1 of 1

It is certified that error appears in the above-identified patent and that said Letters Patent is hereby corrected as shown below:

On the Title Page

Item (63), Related U.S. Application Data, Lines 6-7, please delete "continuation of application No. 15/272,399" and insert --continuation-in-part of application No. 15/272,399--.

Signed and Sealed this  
Tenth Day of May, 2022

Katherine Kelly Vidal  
*Director of the United States Patent and Trademark Office*